US009171324B2

(12) United States Patent
Al-Herz et al.

(10) Patent No.: US 9,171,324 B2
(45) Date of Patent: *Oct. 27, 2015

(54) HYBRID VIRTUAL ACCOUNT AND TOKEN-BASED DIGITAL CASH PROTOCOLS

(75) Inventors: Ahmed Ibrahim Al-Herz, Dhahran (SA); Lahouari Ghouti, Dhahran (SA); Mohammad K. Ibrahim, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 717 days.

This patent is subject to a terminal disclaimer.

(21) Appl. No.: 13/609,206

(22) Filed: Sep. 10, 2012

(65) Prior Publication Data

US 2014/0074721 A1    Mar. 13, 2014

(51) Int. Cl.
*H04L 9/14* (2006.01)
*G06Q 30/06* (2012.01)
*H04L 9/32* (2006.01)
*H04L 9/30* (2006.01)
*H04L 9/08* (2006.01)
*G06Q 20/06* (2012.01)
*G06Q 20/38* (2012.01)

(52) U.S. Cl.
CPC .............. *G06Q 30/06* (2013.01); *G06Q 20/065* (2013.01); *G06Q 20/3829* (2013.01); *H04L 9/0825* (2013.01); *H04L 9/3263* (2013.01); *H04L 2209/42* (2013.01); *H04L 2209/56* (2013.01)

(58) Field of Classification Search
CPC . G06Q 20/3674; G06Q 20/382; G06Q 20/40; G06Q 20/06; G06Q 20/108; G06Q 20/367; G06Q 20/3672; G06Q 20/3678; G06Q 20/401; G06Q 30/0222; G06Q 40/00; G06Q 20/065; G06Q 20/3829; G06Q 30/06; G06Q 20/38215; G06Q 20/385; G06Q 20/02; G06Q 20/3821
USPC .......................................................... 705/71
See application file for complete search history.

(56) References Cited

U.S. PATENT DOCUMENTS

| | | | |
|---|---|---|---|
| 4,914,698 A | 4/1990 | Chaum | |
| 5,889,862 A | 3/1999 | Ohta et al. | |
| 6,446,052 B1 | 9/2002 | Juels | |
| 7,877,331 B2 | 1/2011 | Al-Herz et al. | |
| 8,160,966 B2 | 4/2012 | Al-Herz et al. | |
| 2002/0010679 A1* | 1/2002 | Felsher | G06F 19/322 705/51 |
| 2003/0145205 A1* | 7/2003 | Sarcanin | G06Q 20/02 713/172 |
| 2003/0158960 A1* | 8/2003 | Engberg | G06Q 20/02 709/237 |
| 2004/0083182 A1* | 4/2004 | Moribatake | G06Q 20/02 705/64 |
| 2009/0048979 A1 | 2/2009 | Al-Herz et al. | |

(Continued)

FOREIGN PATENT DOCUMENTS

WO    WO 2006074611 A1 *  7/2006  ............ H04L 9/3073

*Primary Examiner* — Stephanie M Ziegle
*Assistant Examiner* — Michael W Anderson
(74) *Attorney, Agent, or Firm* — Richard C. Litman

(57) ABSTRACT

The hybrid virtual account and token-based digital cash protocols provide a user with many pairs of secret and public keys. One of the pairs is the master pair, which consists of one master user private key and one master user public key. Other pairs are pseudonym pairs, wherein each consists of one pseudonym user private key and one pseudonym user public key. The use of a master key pair and pseudonym key pairs circumvents the need for blind signatures. None of the invention's protocols require blind signatures. The protocols comprise public key protocols, digital signatures and symmetric key protocols.

19 Claims, 58 Drawing Sheets

Main diagram of the protocol

(56) References Cited

U.S. PATENT DOCUMENTS

| | | | |
|---|---|---|---|
| 2009/0182673 A1* | 7/2009 | Al-Herz | G06Q 20/108 705/66 |
| 2009/0210349 A1 | 8/2009 | Al-Herz et al. | |
| 2011/0099113 A1 | 4/2011 | Al-Herz et al. | |
| 2011/0191251 A1 | 8/2011 | Al-Herz et al. | |
| 2011/0302088 A1 | 12/2011 | Al-Herz et al. | |

* cited by examiner

User Registration Protocol according to the first embodiment

Withdrawal Protocol according to the first embodiment

Withdrawal Digital Cash Token Protocol according to the first embodiment

Payment Protocol according to the first embodiment

User Registration process part1 according to the first embodiment

User Registration process part2 according to the first embodiment

Withdrawal process part1 according to the first embodiment

Withdrawal process part2 according to the first embodiment

Withdrawal process part3 according to the first embodiment

Fig. 12  Payment process part1 according to the first embodiment

Payment process part2 according to the first embodiment

Payment process part3 according to the first embodiment

Payment Protocol according to the second embodiment

Payment process part1 according to the second embodiment

Payment process part2 according to the second embodiment

Payment process part3 according to the second embodiment

Transferring Protocol according to the third embodiment

Dividing Digital Cash Token Protocol according to the third embodiment

Fig. 21 Transferring process part1 according to the third embodiment

Transferring process part2 according to the third embodiment

Transferring process part3 according to the third embodiment

Dividing Digital Cash Token process part1 according to the third embodiment

Withdrawal Protocol according to the fourth, fifth and sixth embodiment

Withdrawal process part1 according to the fourth, fifth and sixth embodiment

Withdrawal process part2 according to the fourth, fifth and sixth embodiment

Withdrawal process part3 according to the fourth, fifth and sixth embodiment

Withdrawal Protocol according to the seventh, eighth and ninth embodiment

Withdrawal process part1 according to the seventh, eighth and ninth embodiment

Withdrawal process part2 according to the seventh, eighth and ninth embodiment

Withdrawal process part3 according to the seventh, eighth and ninth embodiment

Withdrawal process part4 according to the seventh, eighth and ninth embodiment

Withdrawal process part5 according to the seventh, eighth and ninth embodiment

Withdrawal Digital Cash Token Protocol according to the seventh embodiment

Withdrawal Digital Cash Token process part1 according to the seventh embodiment

Fig. 37  Withdrawal Digital Cash Token process part2 according to the seventh embodiment Withdrawal Digital Cash Token process part3 according to the seventh embodiment FIG39. Payment Protocol according to the seventh embodiment Payment process part1 according to the seventh embodiment Payment process part2 according to the seventh embodiment Payment process part3 according to the seventh embodiment Payment process part4 according to the seventh embodiment Payment Protocol according to the eighth embodiment Payment process part1 according to the eighth embodiment Fig. 46    Payment process part2 according to the eighth embodiment Payment process part3 according to the eighth embodiment Payment process part4 according to the eighth embodiment Transferring Protocol according to the ninth embodiment Dividing Digital Cash Token Protocol according to the ninth embodiment Transferring process part1 according to the ninth embodiment Transferring process part2 according to the ninth embodiment Transferring process part3 according to the ninth embodiment Transferring process part4 according to the ninth embodiment Transferring process part5 according to the ninth embodiment Dividing Digital Cash Token process part1 according to the ninth embodiment Fig. 57 Dividing Digital Cash Token process part2 according to the ninth embodiment Dividing Digital Cash Token process part3 according to the ninth embodiment

HYBRID VIRTUAL ACCOUNT AND TOKEN-BASED DIGITAL CASH PROTOCOLS

BACKGROUND OF THE INVENTION

1. Field of the Invention

The present invention relates to digital payment methods, and more particularly to digital cash tokens spendable from virtual accounts using secure protocol methods.

2. Description of the Related Art

In the near future, digital cash will come into wider use, and it is expected that people will use the Internet to make digital cash payments for their purchases. Electronic transactions should be convenient, reliable, accurate, and resistant to fraud. Certain electronic transactions also should protect the privacy of payees. For example, a customer purchasing a service from a vendor over a network should be able to pay for the service in an electronic transaction without revealing their identity.

Some schemes using on-line banking may prevent double spending by checking each coin against reuse during the time of payment on-line, rather than detecting double spending afterwards. However, on-line banking is obviously not suitable for micro-payments of the average consumer. Banks are too few compared with the vast number of small cash transactions that would need to be processed if average consumer transactions were to be supported. Processing on-line requests for such transactions will result in banks becoming serious bottlenecks to handle these transactions.

Blind signature systems that use off-line digital cash techniques have high system complexity. In some other conventional techniques, a coin has a data size that is too big to be economically used, since the coin contains a large number of challenge terms to detect cheating. In addition, some techniques also require using complex challenge-response interactions between the payer and payee for each coin spent. Again, such complex schemes are also not suitable for micro payments.

Some systems have implemented digital coins that are both secure (in the bank's interest) and afford a heightened assurance of consumer privacy by providing some anonymity to users with respect to both merchants and banks. Informally, a digital cash scheme is referred to as unconditionally blind or anonymous if the bank that issues a coin is unable to determine, either at the time of withdrawal or later upon examining circulating or deposited coins, which coin was withdrawn by which user. In an unconditionally blind scheme, the user can withdraw money from the bank, spend it at a merchant, and be confident that when the merchant deposits the money at the bank, the bank will not be able to recognize the money as the same cash given to the user.

However, researchers have observed that unconditional anonymity in payment systems might be exploited to facilitate crimes like blackmail. In addition, there is a fear that such schemes of unconditional anonymity may be abused to perfect crimes of money laundering and kidnapping because this system can make the flow of cash completely untraceable. This observation has spurred research into the idea of making anonymity in payment systems conditional, and, in particular, revocable by a third party. This notion is referred to as a trustee-based coin tracing.

One trustee-based tracing scheme is based on a blind Schnorr-like signature scheme that involves use of interactive proofs between trustees and the bank. Another trustee-based tracing scheme is based on blind RSA signatures, but makes use of a cut-and-choose protocol that results in a scheme that is flexible. Although this scheme may be somewhat flexible, it has rather large coin sizes and computational requirements.

According to another scheme that makes use of a blind signature, a user requests a pseudonym and registration information from a trustee. The user presents this registration information to the bank, and incorporates the information into the coins that are withdrawn.

Another scheme makes use of blind DSS signatures. In this scheme, signing and anonymity revocation may be conducted by differing quorums of trustees. However, the scheme is implemented on-line only and is rather computationally intensive for most operations.

A slightly different approach to trustee-based tracing is a system based on blind Schnorr signatures in which a user transfers funds from a non-anonymous to an anonymous account where a trustee is capable of linking the two accounts. The chief disadvantage of this approach is that once the two accounts are linked, anonymity is eliminated.

Another approach is based on blind Schnorr signatures in which the trustee is off-line. This system is complex and involves well over a dozen modular exponentiations by the user at each coin withdrawal. Later developments have reduced the computational load required in the withdrawal protocol, as well as the database search requirements in owner tracing. However, the withdrawal protocol still requires over a dozen modular exponentiations on the part of the user.

The use of blinding alone that protects the anonymity of the customer is not sufficient to safeguard against certain types of fraud. For example, a customer can submit a blinded nonce (a nonce is a piece of data that, for practical purposes, is used only once, for example, a random number) to the certification authority along with $20, receive the blinded certificate, un-blind it, and then submit the un-blinded certificate as being worth $100. This is possible because the certification authority never really sees the actual certificate it is signing because of the blinding factor. Thus, although blinding alone protects privacy, it does not by itself provide adequate reliability against fraud and misuse.

Another problem of blind signature it is a homomorphism, i.e., $Sign(kx)=Sign(k)Sign(x)$. It is possible to create pairs r, $Sign(r)$ for a random message r. More precisely, anyone can choose $Sign(r)$ at random and then computer as the function Sign-1 which is known publicly. The basic idea is as follows. Customer C chooses a message x which is going to be the coin. C also generates a pair, k and $Sign(k)$, for a random number k. C sends the product kx to a bank B which computes $Sign(kx)$. B then sends $Sign(kx)$ to C, using, for instance, a public encryption scheme provided by C (using some session key exchanged between C and B using a Diffie-Hellman session) or some other form of communication (e.g., delivery on a diskette transported by an armored carrier). C may then compute $Sign(x)$ by dividing Sign (kx) by Sign (k). The pair $(x, Sign(x))$ is now redeemable by B at a value usually determined by the signature being used, and B cannot recognize C when some payee P presents $(x, Sign(x))$ (since the knowledge of kx does not allow practical recognition of x nor of $Sign(x)$).

A problem with this approach is that a signature scheme with such properties is not secure. This scheme provides that (1) it is easy to forge signatures on random messages, and (2) after seeing the signatures on two messages x1 and x2, it is easy to compute the signature on the message $x=x1x2$. In order to overcome this problem, valid messages are required to have a special "structure" (e.g., the message x must be encoded using the PKCS #1 standard for digital signature). The hope is that messages with this structure are sparse and hard to forge even given properties (1) and (2) (since messages with that structure will not appear with a significant probability). However, this is simply a hope and is not a proven mathematical property of the signature scheme or of the encoding. The drawback is that it may be possible to discover an algorithm to forge messages even when we restrict them to this structured sparse set.

Schemes that use virtual accounts have several problems. For example, some virtual accounts do not provide adequate privacy of the user, while others are complex requiring a blind signature to protect the privacy of the user. Still other embodiments have the bank storing encrypted pseudonym corresponding to the user identification which makes linking identity to the pseudonym easy either by cooperation or leakage of the secret key of the issuer. Accordingly, the privacy of all users can be catastrophically destroyed. In addition, there is a problem of proving the ownership of the user identity between the user and the bank.

Thus, a hybrid virtual account and token-based digital cash protocols solving the aforementioned problems is desired.

SUMMARY OF THE INVENTION

The hybrid virtual account and token-based digital cash protocols provide a user with many pairs of secret and public keys. One of the pairs is the master pair, which consists of one master user private key and one master user public key. Other pairs are pseudonym pairs, wherein each pair consists of one pseudonym user private key and one pseudonym user public key. The use of a master key pair and pseudonym key pairs circumvents the need for blind signatures. None of the protocols described hereafter require blind signatures. The protocols comprise public key protocols, digital signatures and symmetric key protocols.

The disclosed protocols can be deployed in off-line and on-line settings. The disclosed hybrid protocols provide strong protection of privacy for the user by separating information about the user's bank accounts identified with the real identity of the user from the information about digital cash of the same user owned under different pseudonyms of the user by using one pair of master keys linked to the real identity of the user, and many pseudonym pairs of keys linked to a the user's pseudonym identity, which owns the digital cash. There is also no link between the different pseudonyms of the same user.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The hybrid virtual account and token-based digital cash protocols provide a user with many pairs of secret and public keys. One of the pairs is the master pair, which consists of one master user private key and one master user public key. Other pairs are pseudonym pairs, wherein each pair consists of one pseudonym user private key and one pseudonym user public key. The use of a master key pair and pseudonym key pairs circumvents the need for blind signatures. None of the protocols described hereafter require blind signatures. The protocols comprise public key protocols, digital signatures and symmetric key protocols.

The following notation is used in the following description. PKy denotes the public key of the entity y, Sky denotes the private key of the entity y, mPKy and mSKy denotes the master public and private key of entity y respectively, pPKy and pSKy denotes the pseudonym public and private key of entity y respectively, PKy(.) indicates that the quantity between brackets is encrypted using the public key of entity y, Sky(.) indicates that the quantity between brackets is encrypted using the private key of entity y, [.]SKy indicates that the quantity between square brackets is signed by the private key of entity y.

Figure 1:
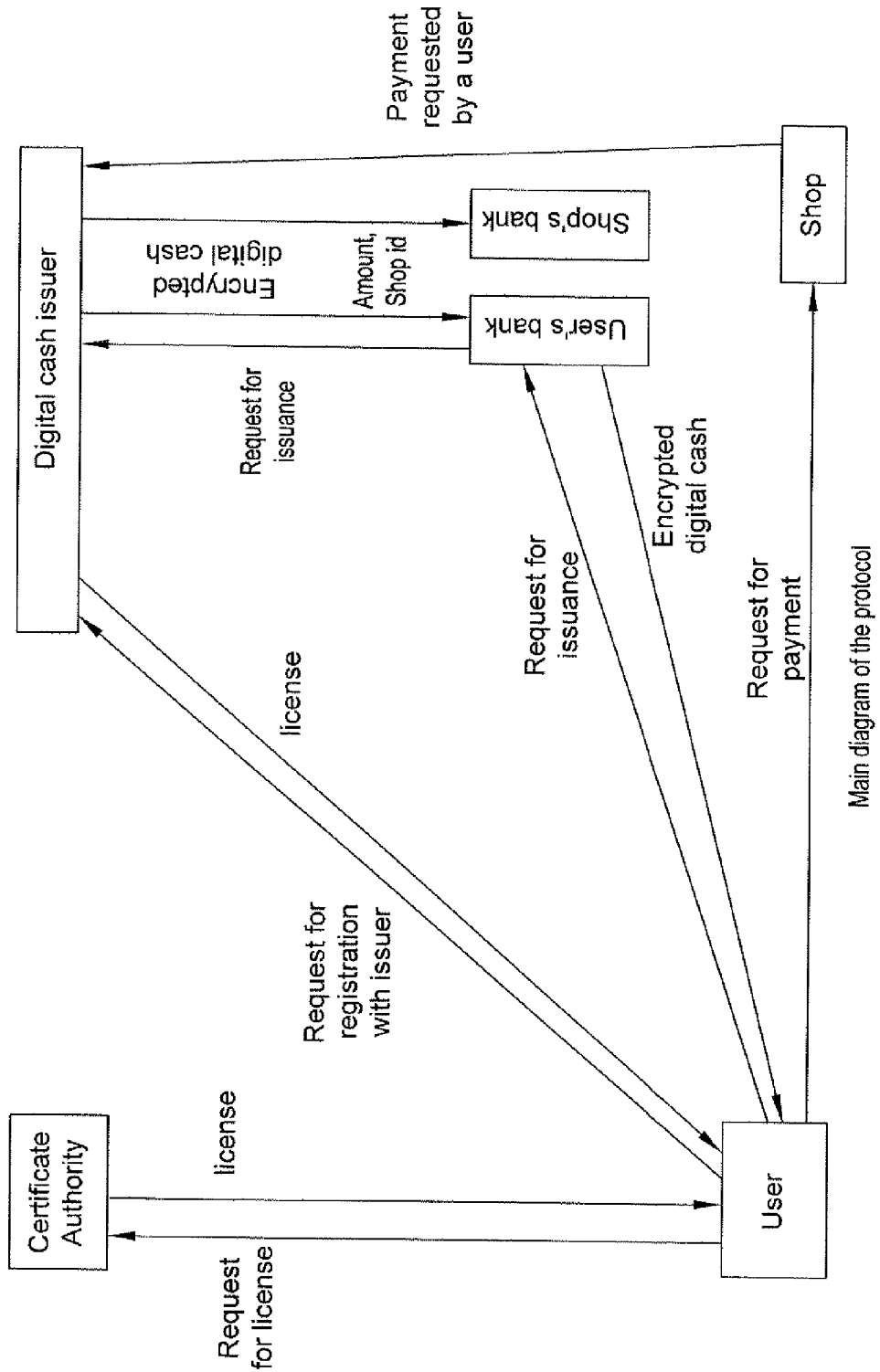
FIG. 1 is an exemplary block diagram of a system for implementing hybrid virtual accounts and token-based digital cash protocols according to the present invention.

FIG. 1 shows the entities that are involved in the virtual account and token-based new digital cash protocols method and how they relate to each other. Each of these entities may send and receive data via any number of communications paths. Each entity may include one or more processing devices, such as, for example, a general or special-purpose computer, such as a processor, a microprocessor, a microcomputer, a personal computer ("PC"), a workstation, a mainframe, a server, a laptop, a mobile communications device/phone, a personal digital assistant ("PDA"), an on-board (i.e., vehicle-mounted) computer, or a combination of two or more of these devices capable of responding to, generating, and/or executing instructions in a defined manner. The processing device may include or be associated with any number of other devices, components, and/or peripherals, such as additional computing devices, memory/storage devices, input devices, output devices, user interfaces, and/or communications interfaces.

Each entity also may include one or more software applications including, for example, encryption decryption software, signature generating software, key generating software, random number generating software, signature verification software, in addition to other system and operating system software loaded to command and direct the processing device. Software applications may be implemented as a computer program, a piece of code, an instruction, or some combination thereof, for independently or collectively instructing the processing device to interact and operate as desired.

The applications may be embodied permanently or temporarily in any type of machine, component, physical or virtual equipment, or non-transitory storage medium capable of providing instructions to the processing device. In particular, the applications may be stored on a storage medium or device including volatile and non-volatile (e.g., a read only memory (ROM), a random access memory (RAM), a flash memory, a floppy disk, a hard disk, a tape, a DROM, a flip-flop, a register, an SRAM, DRAM, PROM, EPROM, OPTROM, EEPROM, NOVRAM, or RAMBUS), such that if the storage medium or device is read by the processing device, the specified steps, processes, and/or instructions are performed.

The processing device also may include one or more communications interfaces that allow the processing device to send and receive information using the communications paths. The communications paths may be configured to send and receive signals (e.g., electrical, electromagnetic, or optical) that convey or carry data streams representing various types of analog and/or digital data. For example, the communications paths may be implemented using various communications media and one or more networks comprising one or more network devices (e.g., servers, routers, switches, hubs, repeaters, and storage devices). The one or more networks may include a local area network (LAN), a wide area network (WAN), a plain old telephone service (POTS) network, a digital subscriber line (DSL) network, an integrated services digital network (ISDN), a synchronous optical network (SONNET), or a combination of two or more of these networks. In addition, the communications paths may include one or more wireless links (e.g., cellular, mobile, GSM, CDMA, TDMA, and satellite) that transmit and receive electromagnetic signals, such as, for example, radio, infrared, and microwave signals, to convey information. Because the communications paths may cover any number of networks and media, generally, they are considered unsecured.

The user may be any entity (person, group, business, government and/or organization) that requires the issuance of digital cash for use a payment to a shop. The certificate authority comprises a storage device, a signature verifying program, an encryption program, a decryption program, and a signature generating program. The user may include a processing device, a storage device, an encryption program, a decryption program, a signature verifying program and a key generating program and a signature generating program.

First Embodiment

Figure 2:
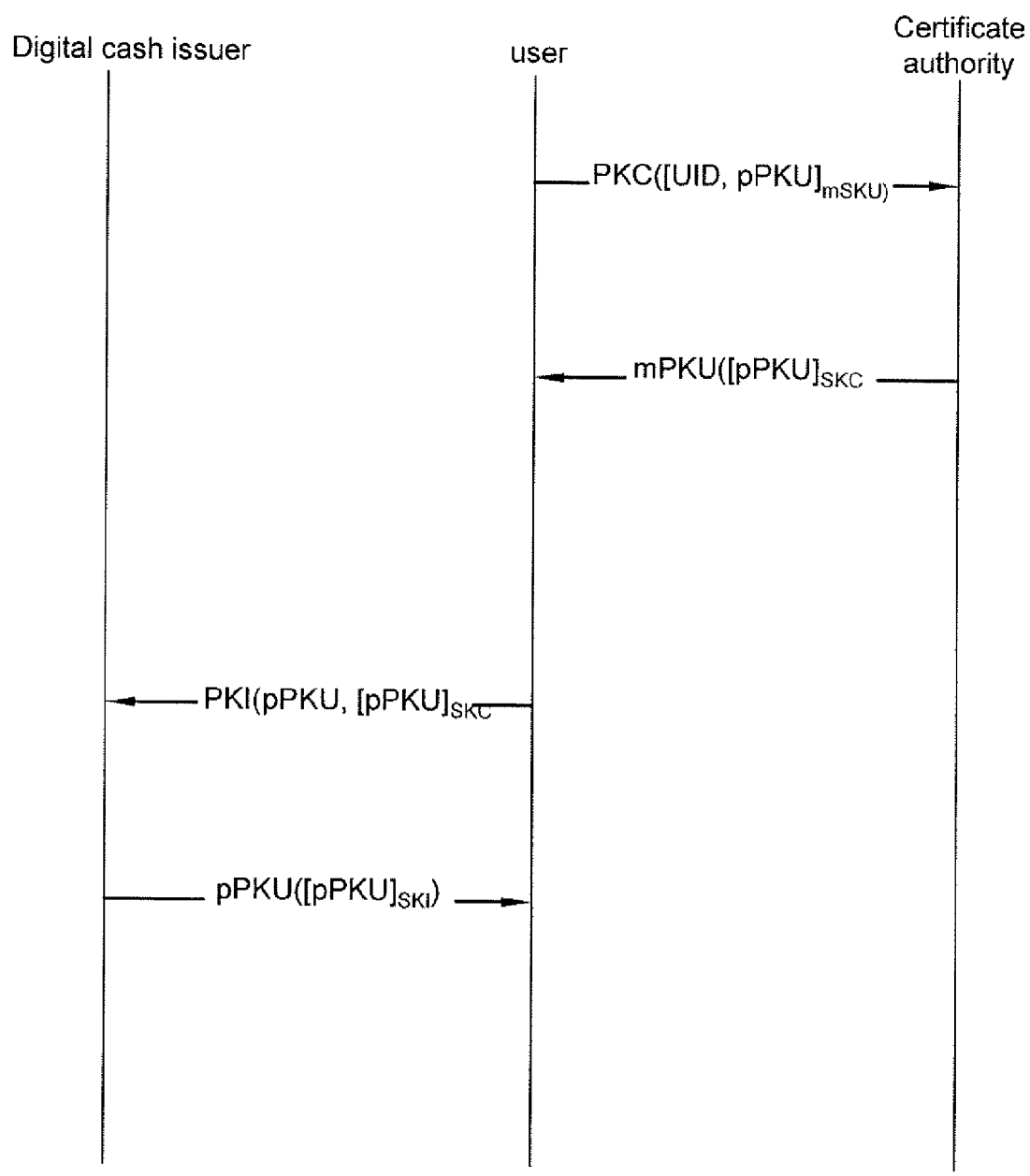
FIG. 2 is an exemplary user registration protocol according to a first embodiment.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Figure 6:
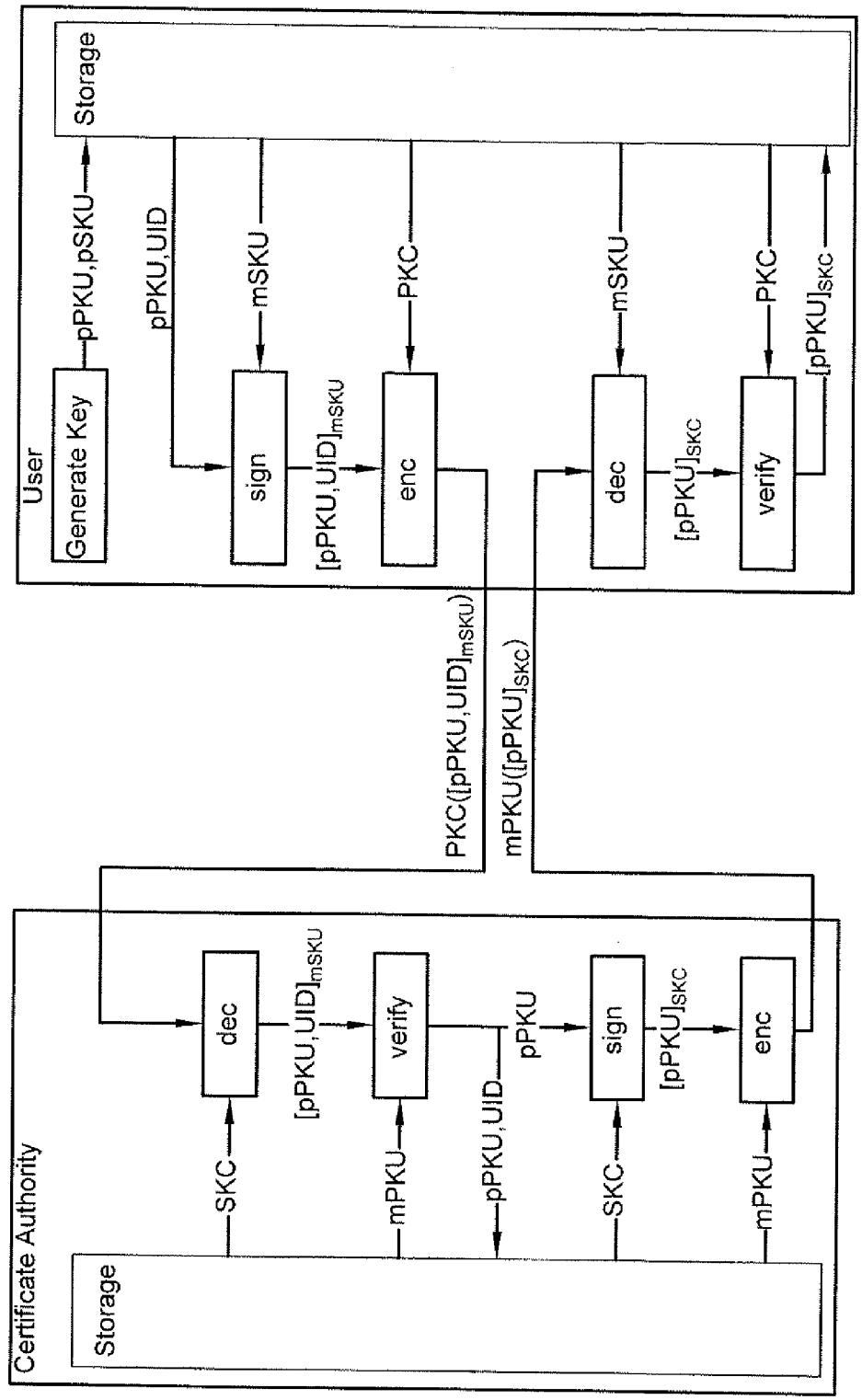
FIG. 6 is an exemplary user registration process part 1 according to the first embodiment.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID,pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU]SKC) to the user.

The user receives the encrypted license mPKU([pPKU]SKC) then decrypts it by decryption program using the user's master secret key mSKU then verifies the validity of the license [pPKU]SKC by the signature verifying program using the public key of the certificate authority PKC, if it is valid stores the license in the storage device.

Figure 7:
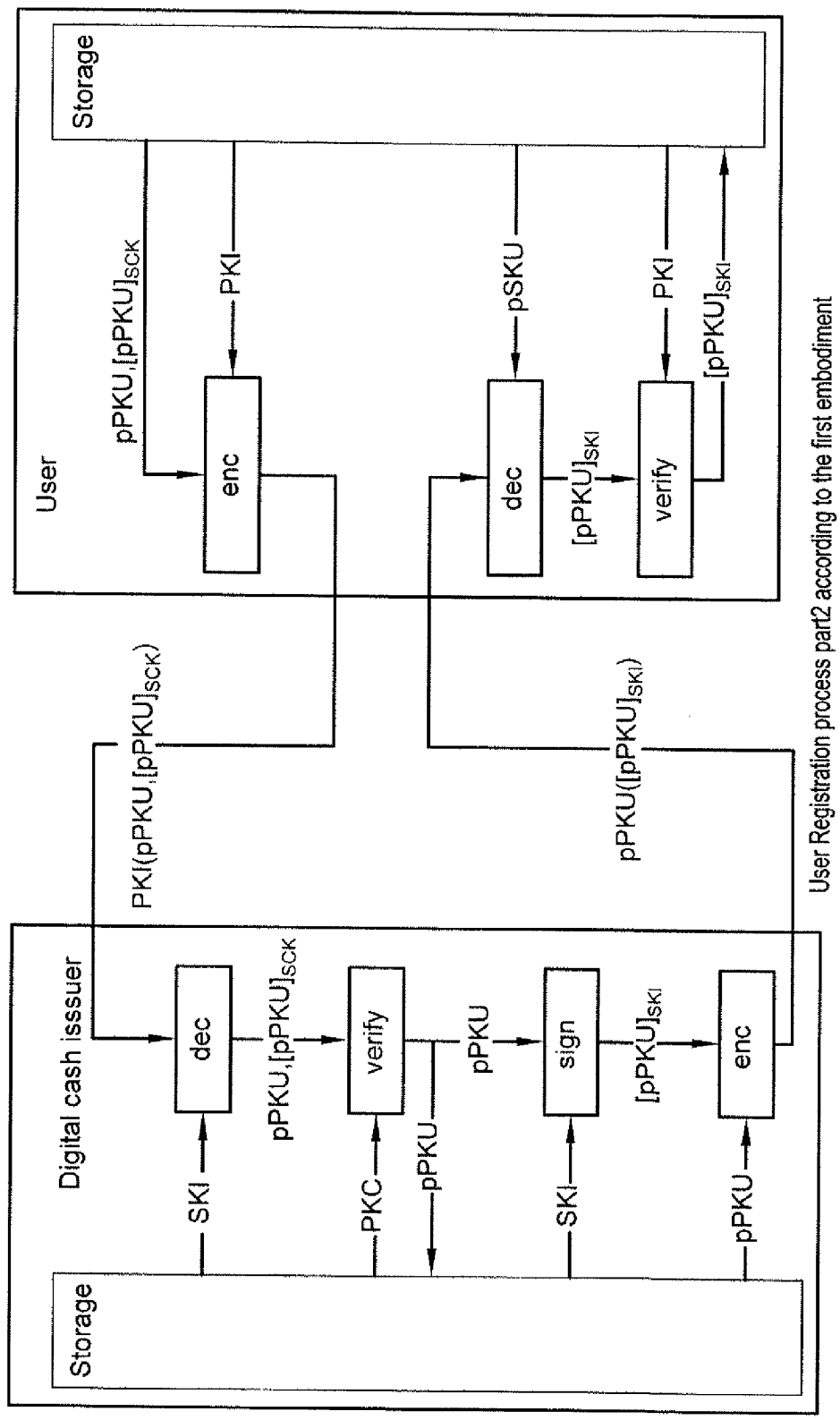
FIG. 7 is an exemplary user registration process part 2 according to the first embodiment.

Referring to FIG. 7, the user encrypts the license [pPKU]SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU]SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

Figure 3:
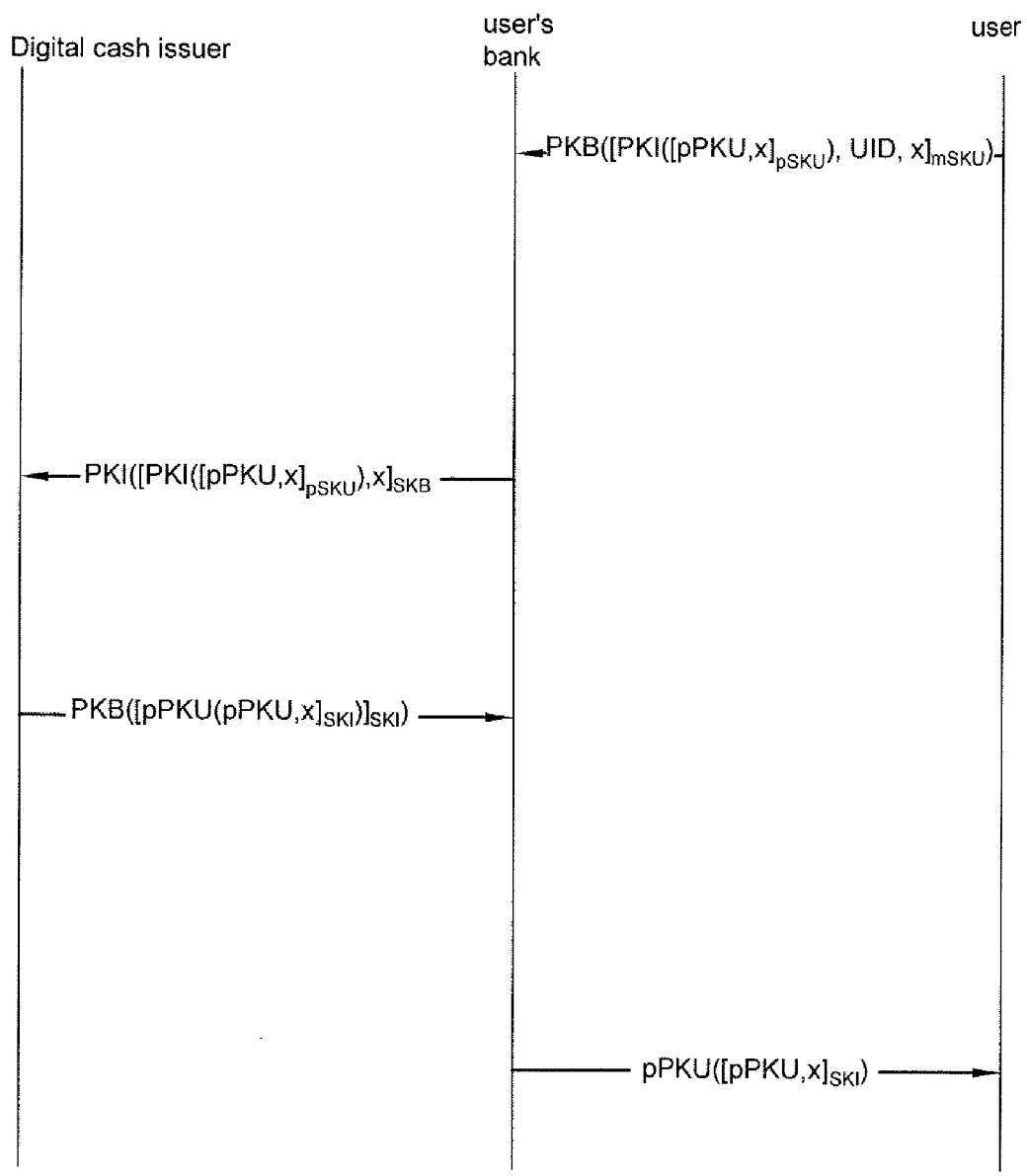
FIG. 3 is an exemplary withdrawal protocol according to the first embodiment.

FIG. 3 shows the diagrammatic representation of the withdrawal protocol. The user's bank comprises a storage device, a signature verifying program encryption program, decryption program and a signature generating program. The bank's public key PKB are known to all entities.

Figure 8:
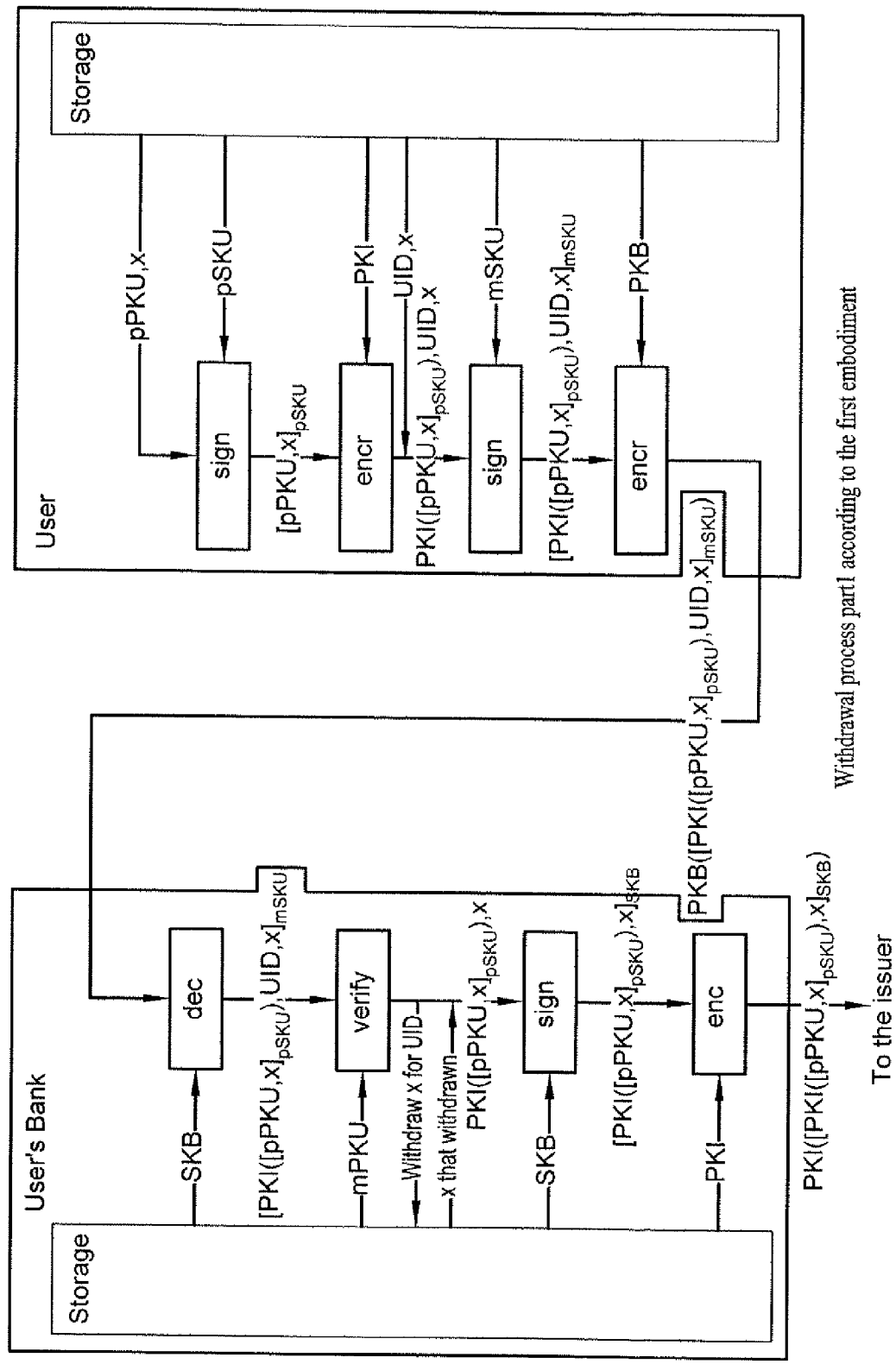
FIG. 8 is an exemplary withdrawal process part 1 according to the first embodiment.

Referring to FIG. 8, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and signs the user real identification UID, the amount of money to be withdrawn x, the encrypted signed user's pseudonym public key and the amount of digital cash PKI([pPKU,x]pSKU) by the signature generating program using the user's master secret key mSKU and encrypts the information by encryption program using the public key of the bank PKB then sends PKB([PKI([pPKU,x]pSKU),UID,x]mSKU) to the user's bank.

The bank decrypts PKB([PKI([pPKU,x]pSKU),UID,x]mSKU) by decryption program using the user's bank's secret key SKB and verifies the validity of the signature for authentication by the signature verifying program with the master public key of the user mPKU, if it is valid withdraw the amount of money x from the user account and signs the encrypted signed user's pseudonym public key and the amount of digital cash PKI([pPKU,x]pSKU and the withdrawn amount of money x by the signature generating program using the bank's secret key SKB, then encrypts the information by encryption program using the public key of the digital cash issuer PKI then sends PKI([PKI([pPKU,x]pSKU),x]SKB) to the digital cash issuer.

Figure 9:
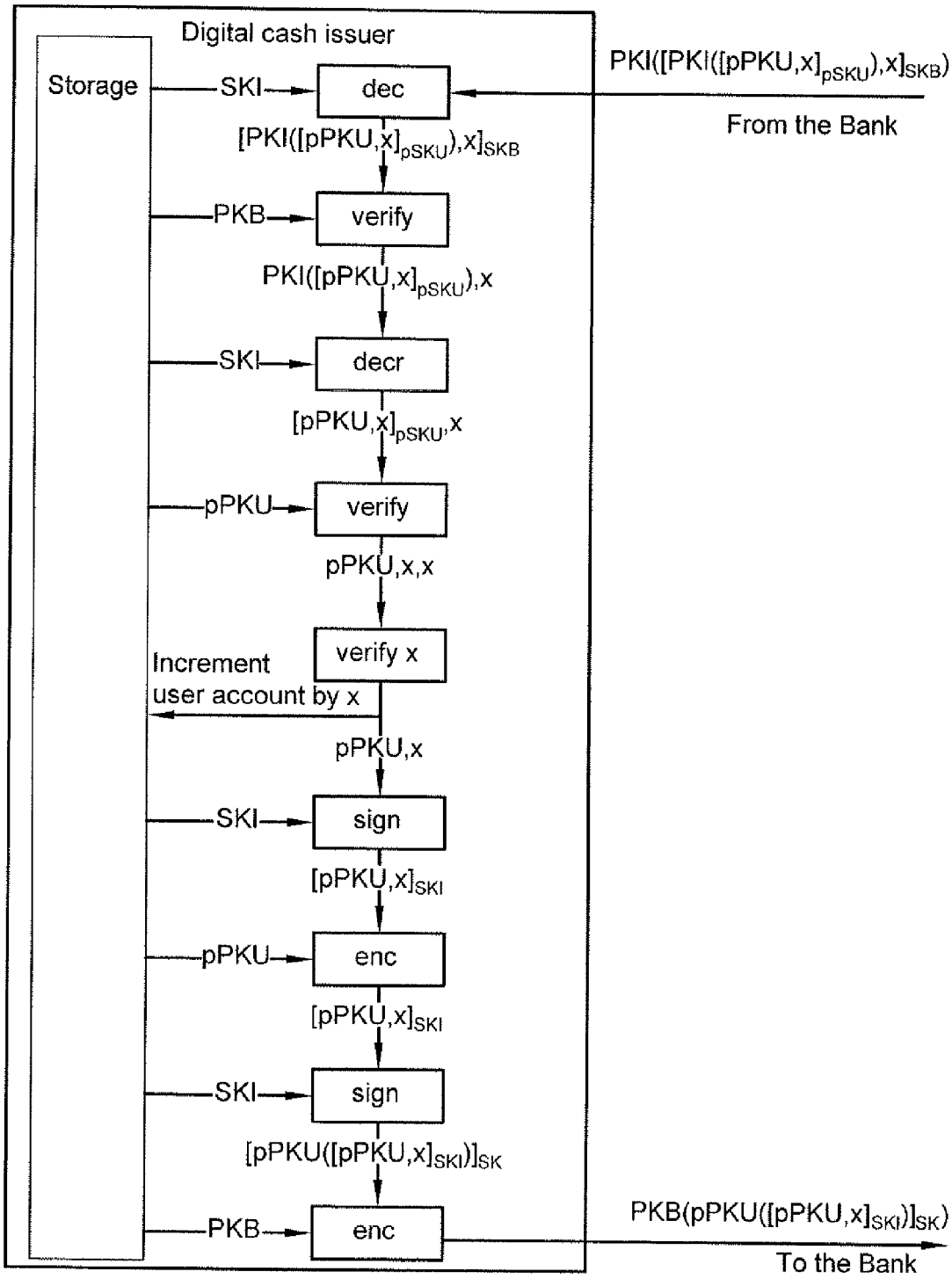
FIG. 9 is an exemplary withdrawal process part 2 according to the first embodiment.

Referring to FIG. 9, the digital cash issuer receives PKI([PKI([pPKU,x]pSKU),x]SKB), then decrypts the information by decryption program using the digital cash issuer's secret key SKI and verifies the signature of the bank by signature verifying program using the public key of the user's bank PKB if it is valid the digital cash issuer decrypts PKI([pPKU,x]pSKU) by decryption program using the digital cash issuer's secret key and verifies the signature of the user by signature verifying program using the user's pseudonym public key pPKU, to authenticate the user, if it is valid, the issuer verifies the equality of the two amounts x if they are not equal the real identity of the user will be revealed by sending pPKU to the certificate authority, if they are equals, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then signs the pPKU([pPKU,x]SKI) by the signature generating program using the digital cash issuer's secret key SKI then encrypts [pPKU([pPKU,x]SKI)]SKI using encryption program using the public key of the bank PKB then sends PKB([pPKU([pPKU,x]SKI)]SKI) to the user's bank.

Figure 10:
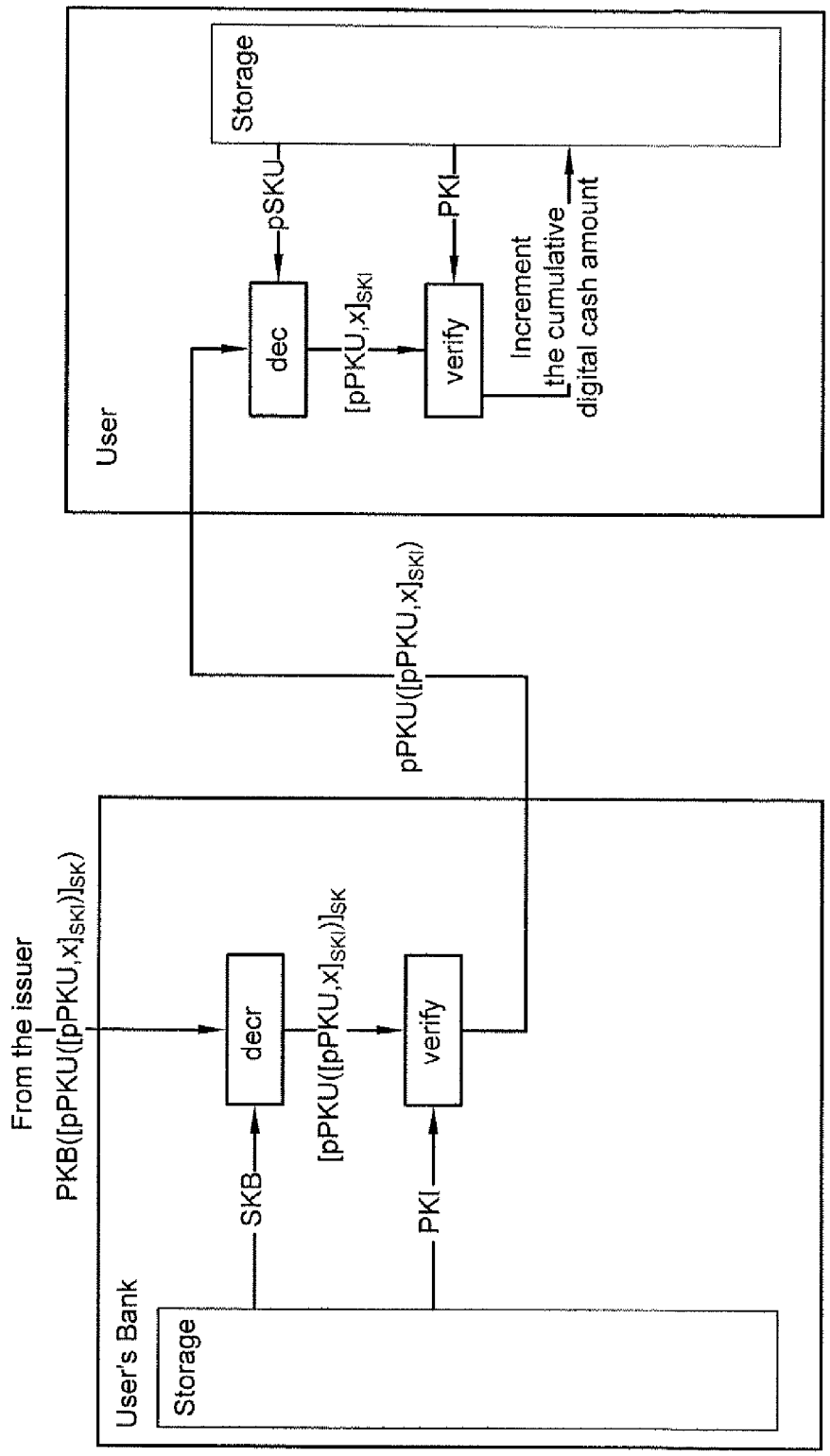
FIG. 10 is an exemplary withdrawal process part 3 according to the first embodiment.

Referring to FIG. 10, the user's bank then receives the information PKB([pPKU([pPKU,x]SKI)]SKI) and decrypts it by the decryption program using the user's bank secret key SKIS and verifies the digital cash issuer signature by the signature verifying program using the public key of the digital cash issuer PKI if it is valid sends pPKU([pPKU,x]SKI) to the user.

The user receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user.

Figure 4:
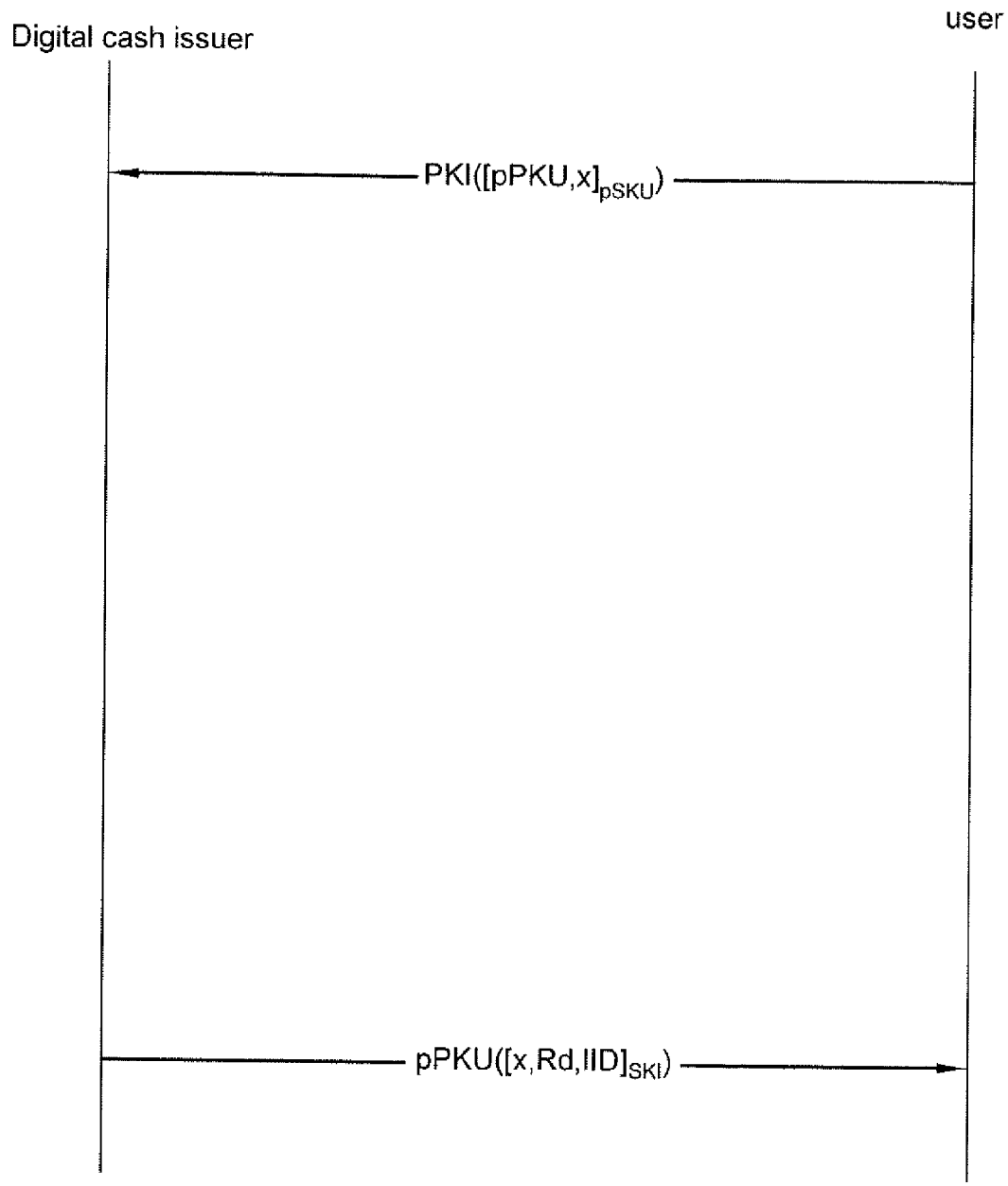
FIG. 4 is an exemplary digital cash token protocol according to the first embodiment.
Figure 11:
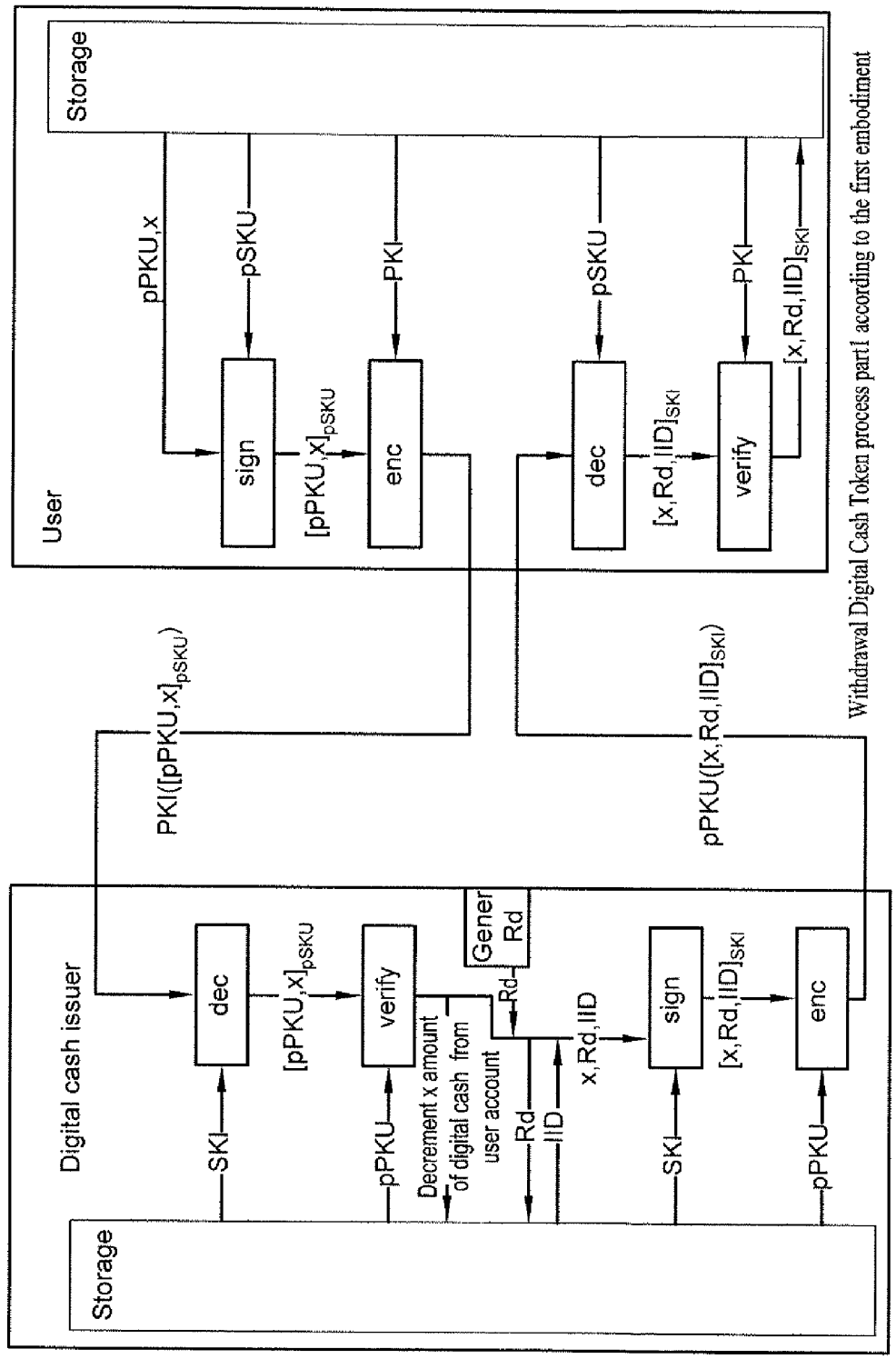
FIG. 11 is an exemplary withdrawal digital cash token process part 1 according to the first embodiment.

FIG. 4 shows the diagrammatic representation of the digital cash token withdrawal protocol. Referring to FIG. 11, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU then decrements the user's virtual account by x then sends pPKU([x,Rd,IID]SKI) to the user.

The user receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user stores the digital cash token [x,Rd,IID]SKI and the cumulative amount of digital cash is decremented by the amount of the digital cash token x then stores the new cumulative amount of digital cash in the storage device by the user.

Figure 5:
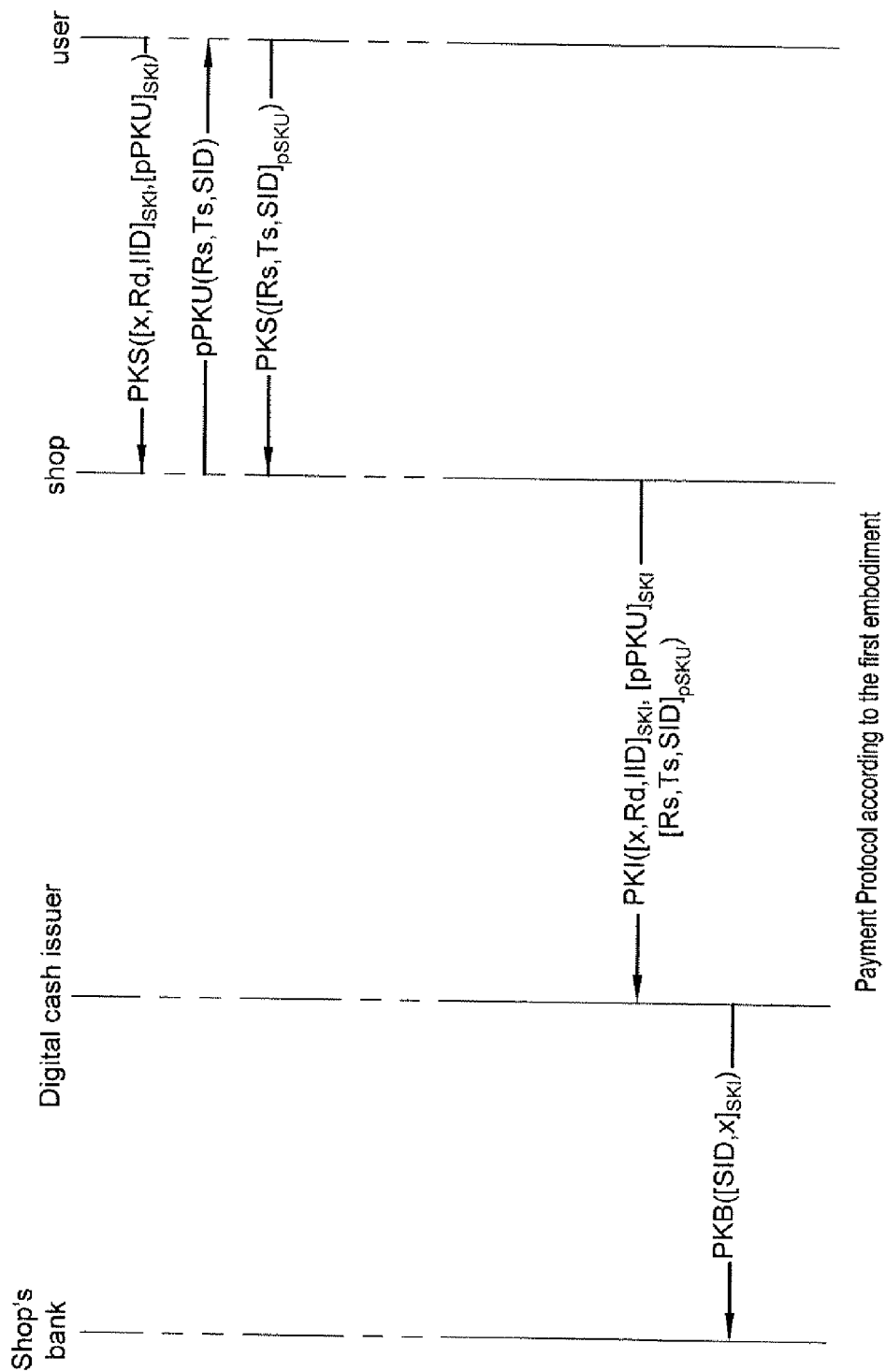
FIG. 5 is an exemplary payment protocol according to the first embodiment.

FIG. 5 shows the diagrammatic representation of the payment protocol. The shop comprises a storage device, a signature verifying program encryption program, decryption program, a signature generating program, a random number generating program and a time generating program the shop public key PKS is known to all entities.

Figure 12:
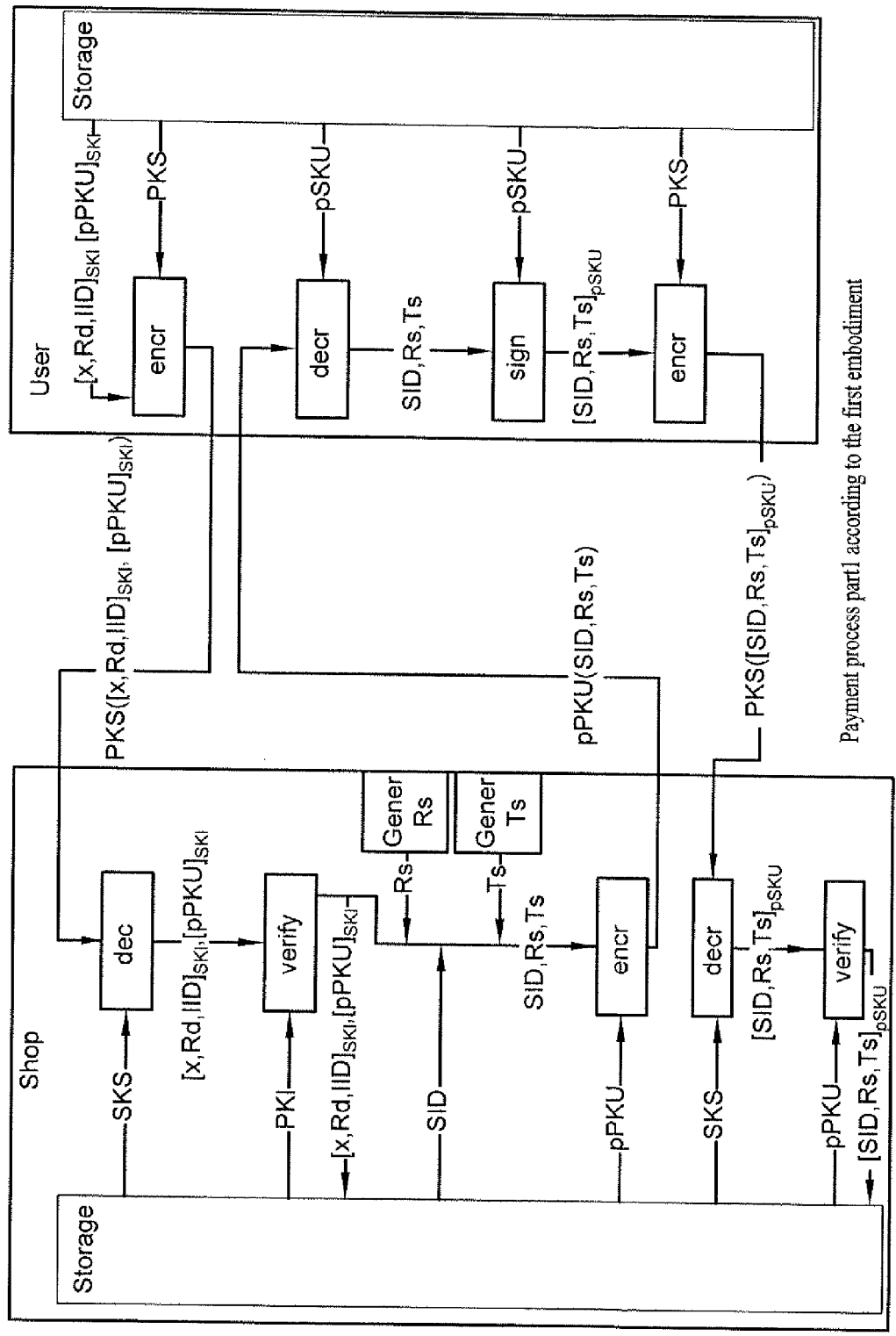
FIG. 12 is an exemplary payment process part 1 according to the first embodiment.

Referring to FIG. 12, the user encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, and the shop identification SID by encryption program using the user's pseudonym public key pPKU and sends pPKU(Rs,Ts,SID) to the user.

The user receives pPKU(Rs,Ts,SID) and decrypts it by decryption program using the user's pseudonym secret key pSKU and signs the random number Rs, the time Ts, and the shop identification SID by signature generating program using the user's pseudonym secret key pSKU and encrypts the information by encryption program using the public key of the shop PKS then sends PKS([Rs,Ts,SID]pSKU) to the shop.

The shop receives the information PKS([Rs,Ts,SID]pSKU) and decrypts it by decryption program using the shop's secret key SKS and verifies the signature by signature verifying program using the user's pseudonym public key pPKU if it is valid the shop stores the challenge and the shop regards the payment as valid.

Figure 13:
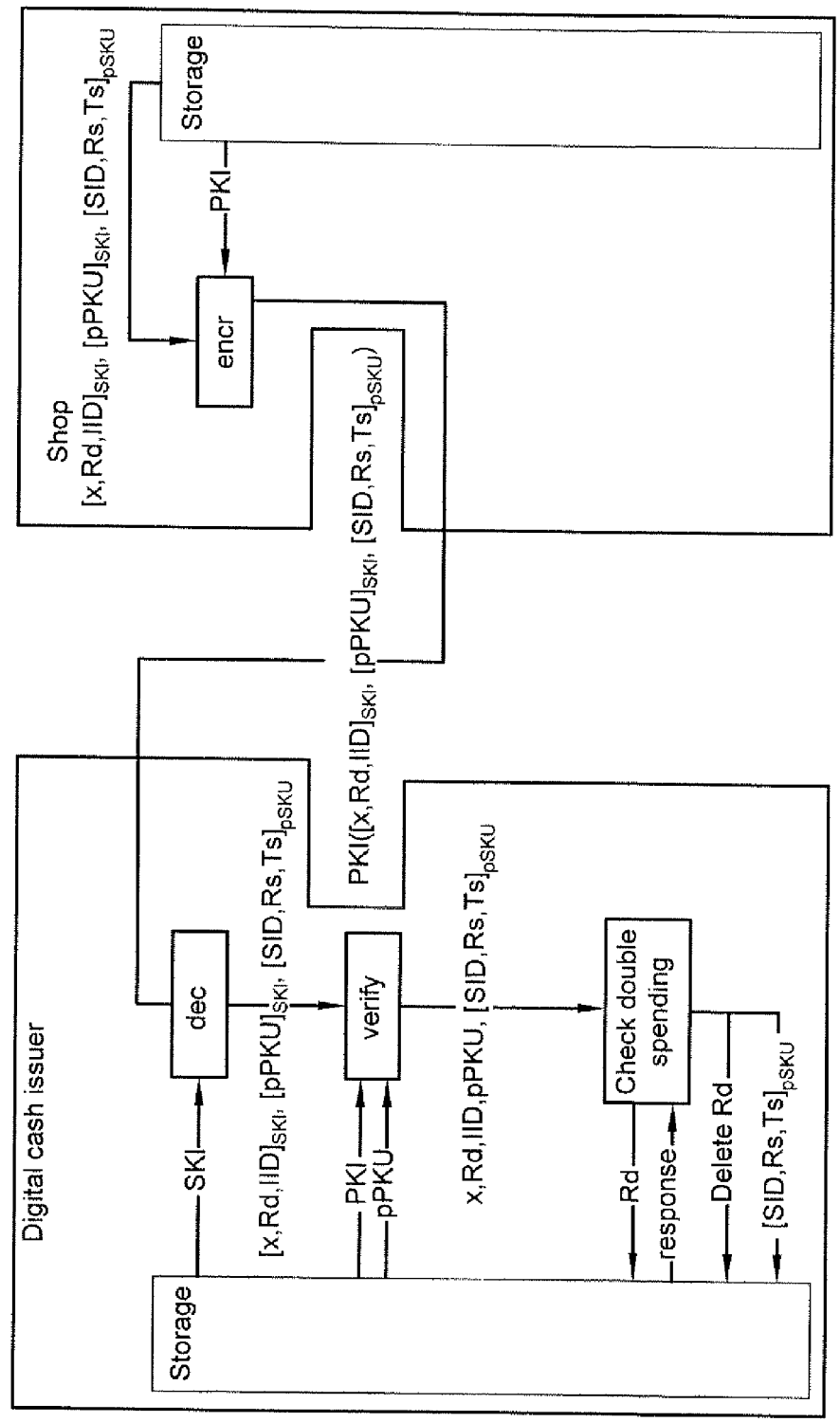
FIG. 13 is an exemplary payment process part 2 according to the first embodiment.

Referring to FIG. 13, after a period of time, the shop encrypts the information that contains the challenge that was signed by the user [Rs,Ts,SID]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by x then the digital cash issuer stores the challenge [Rs,Ts,SID]pSKU in the storage device.

Figure 14:
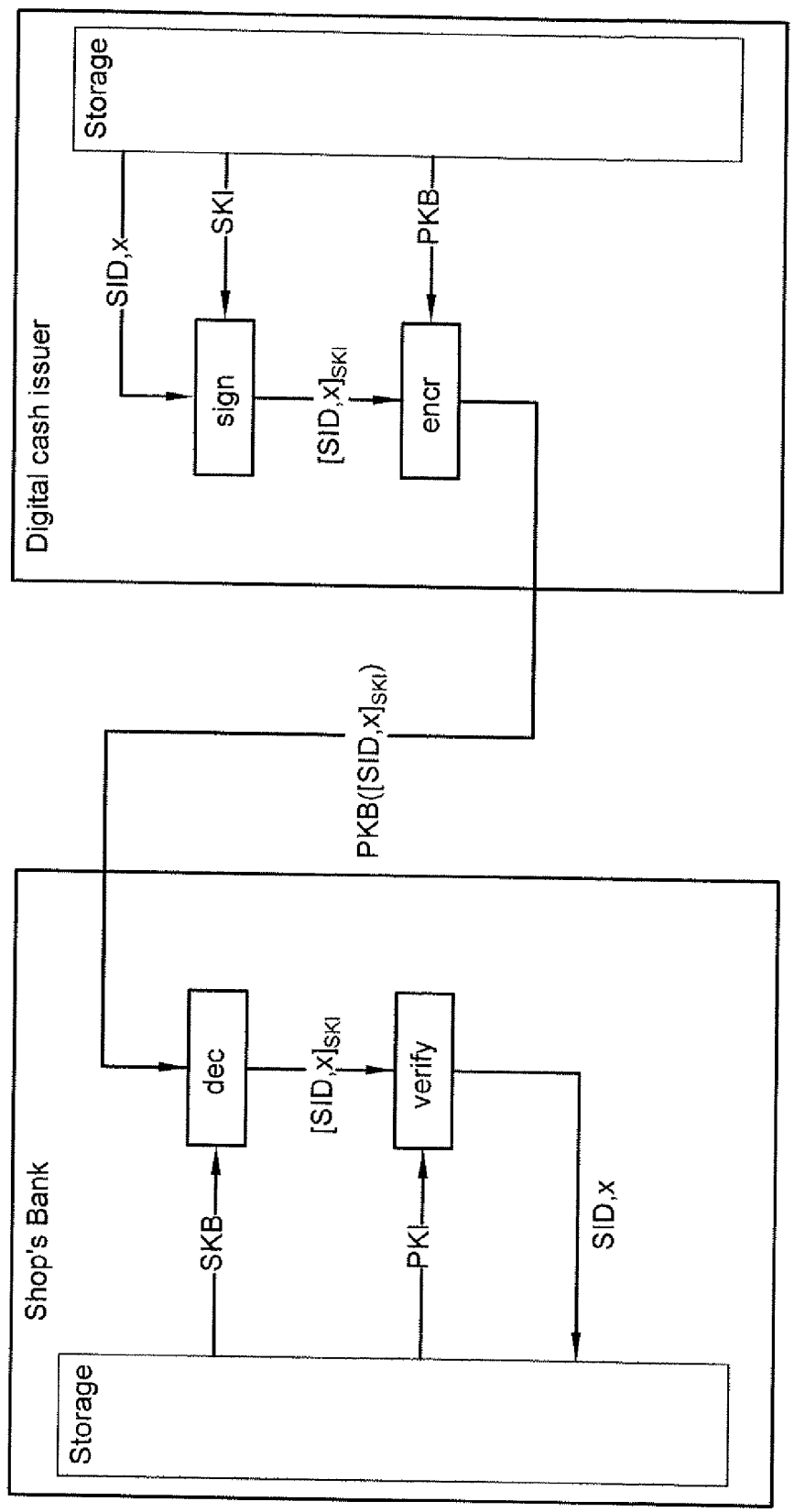
FIG. 14 is an exemplary payment process part 3 according to the first embodiment.

Referring to FIG. 14, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKT) and decrypts the information by decryption program using the secret key SKB and verifies the signature by signature verifying program with the public key of the issuer PKI if the signature is valid the shop's bank will add x amount of money in the shop account.

Second Embodiment

The previous embodiment assumes that the price of goods is equal to the value of the digital cash token. To add more flexibility, the second embodiment allows the user to spend a digital cash token having a value more than the price of the goods. The digital cash issuer credits the difference in the user's virtual account.

FIG. 2 shows the diagrammatic representation of the registration protocol.

The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU]SKC) to the user.

The user receives the encrypted license mPKU([pPKU]SKC) then decrypts it by decryption program using the user's master secret key mSKU then verifies the validity of the license [pPKU]SKC by the signature verifying program using the public key of the certificate authority PKC, if it is valid stores the license in the storage device.

Referring to FIG. 7, the user encrypts the license [pPKU]SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU]SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

FIG. 3 shows the diagrammatic representation of the withdrawal protocol. The user's bank comprises a storage device, a signature verifying program encryption program, decryption program and a signature generating program. The bank's public key PKB are known to all entities.

Referring to FIG. 8, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and signs the user real identification UID, the amount of money to be withdrawn x, the encrypted signed user's pseudonym public key and the amount of digital cash. PKI([pPKU,x]pSKU) by the signature generating program using the user's master secret key mSKU and encrypts the information by encryption program using the public key of the bank PKB then sends PKB([PKI([pPKU,x]pSKU),UID,x]mSKU) to the user's bank.

The bank decrypts PKB([PKI([pPKU,x]pSKU),UID,x]mSKU) by decryption program using the user's bank's secret key SKB and verifies the validity of the signature for authentication by the signature verifying program with the master public key of the user mPKU, if it is valid withdraw the amount of money x from the user account and signs the encrypted signed user's pseudonym public key and the amount of digital cash PKI([pPKU,x]pSKU and the withdrawn amount of money x by the signature generating program using the bank's secret key SKB, then encrypts the information by encryption program using the public key of the digital cash issuer PKI then sends PKI([PKI([pPKU,x]pSKU),x]SKB) to the digital cash issuer.

Referring to FIG. 9, the digital cash issuer receives PKI([PKI([pPKU,x]pSKU),x]SKB), then decrypts the information by decryption program using the digital cash issuer's secret key SKI and verifies the signature of the bank by signature verifying program using the public key of the user's bank PKB if it is valid the digital cash issuer decrypts PKI([pPKU,x]pSKU) by decryption program using the digital cash issuer's secret key and verifies the signature of the user by signature verifying program using the user's pseudonym public key pPKU, to authenticate the user, if it is valid, the issuer verifies the equality of the two amounts x if they are not equal the real identity of the user will be revealed by sending pPKU to the certificate authority, if they are equals, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then signs the pPKU([pPKU,x]SKI) by the signature generating program using the digital cash issuer's secret key SKI then encrypts [pPKU([pPKU,x]SKI)]SKI using encryption program using the public key of the bank PKB then sends PKB([pPKU([pPKU,x]SKI)]SKI) to the user's bank.

Referring to FIG. 10, the user's bank then receives the information PKB([pPKU([pPKU,x]SKI)]SKI) and decrypts it by the decryption program using the user's bank secret key SKB and verifies the digital cash issuer signature by the signature verifying program using the public key of the digital cash issuer PKI if it is valid sends pPKU([pPKU,x]SKI) to the user.

The user receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user.

FIG. 4 shows the diagrammatic representation of the digital cash token withdrawal protocol. Referring to FIG. 11, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU then decrements the user's virtual account by x then sends pPKU([x,Rd,IID]SKI) to the user.

The user receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user stores the digital cash token [x,Rd,IID]SKI and the cumulative amount of digital cash is decremented by the amount of the digital cash token x then stores the new cumulative amount of digital cash in the storage device by the user.

Figure 15:
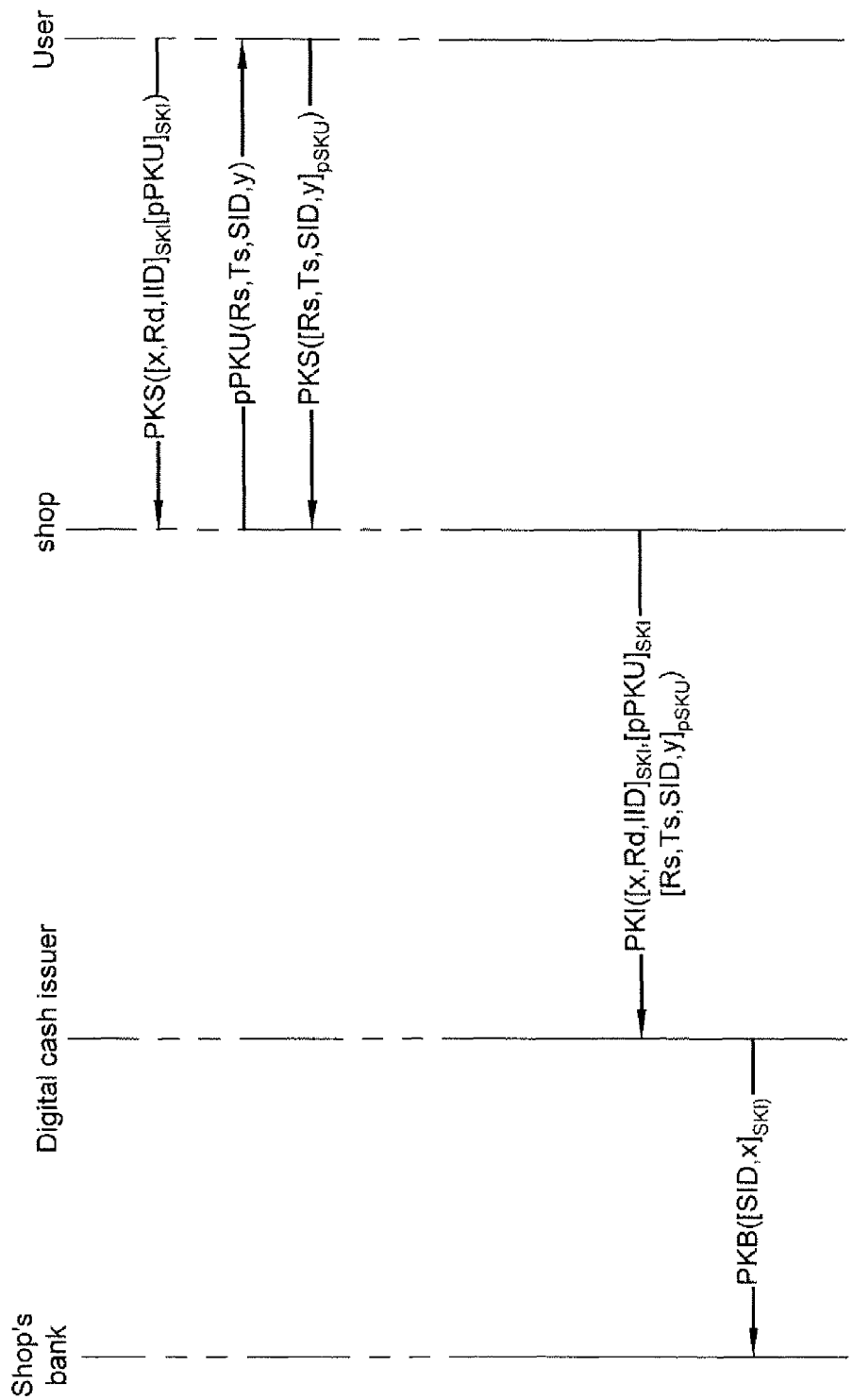
FIG. 15 is an exemplary payment protocol according to the second embodiment.

FIG. 15 shows the diagrammatic representation of the payment protocol. The shop comprises a storage device, a signature verifying program encryption program, decryption program, a signature generating program, a random number generating program and a time generating program the shop public key PKS is known to all entities.

Figure 16:
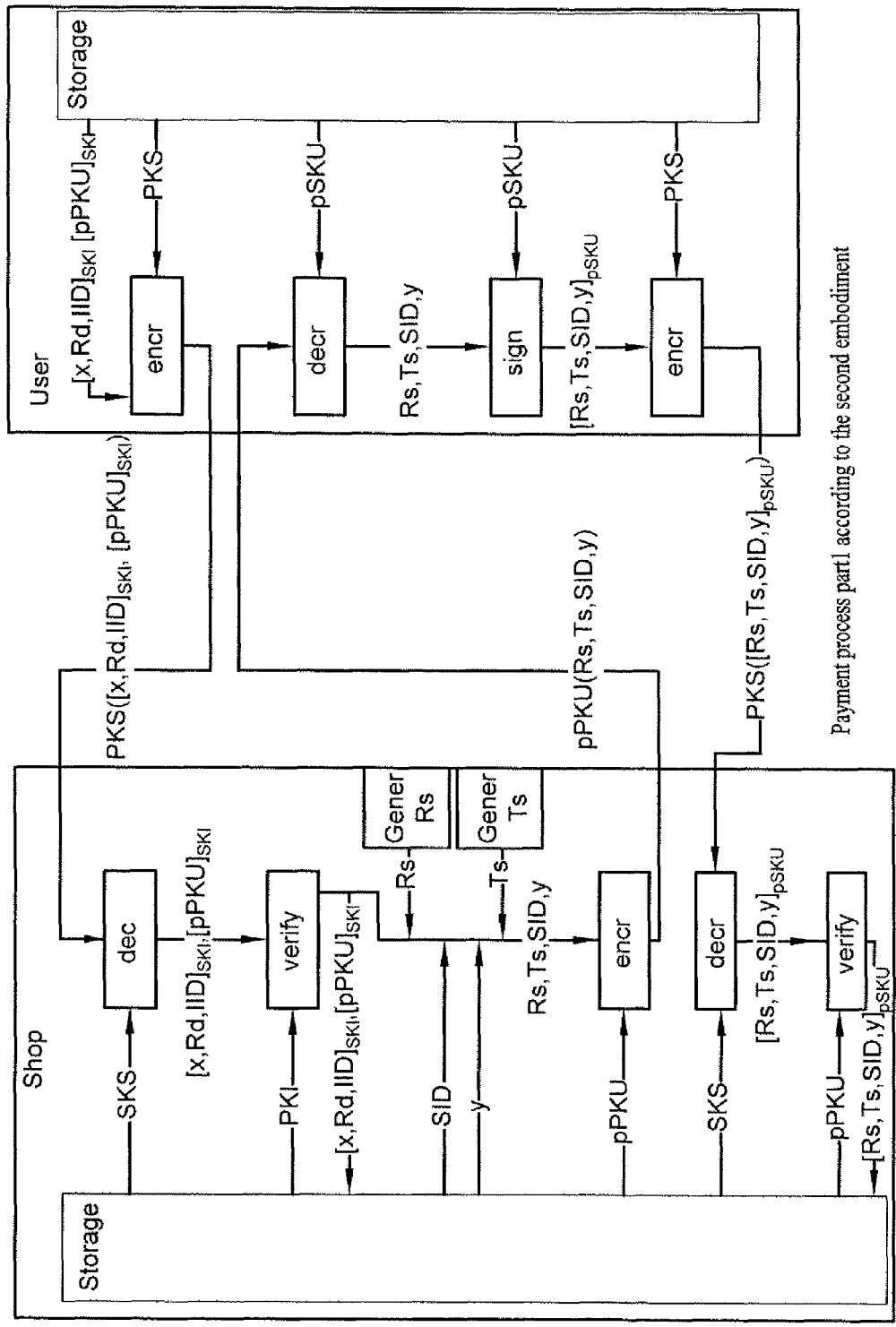
FIG. 16 is an exemplary payment process part 1 according to the second embodiment.

Referring to FIG. 16, the user encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, the shop identification SID and the price of the good y by encryption program using the user's pseudonym public key pPKU and sends pPKU(Rs,Ts,SID,y) to the user.

The user receives pPKU(Rs,Ts,SID,y) and decrypts it by decryption program using the user's pseudonym secret key pSKU and signs the random number Rs, the time Ts, the shop identification SID and the price of the good y by signature generating program using the user's pseudonym secret key pSKU and encrypts the information by encryption program using the public key of the shop PKS then sends PKS([Rs,Ts,SID,y]pSKU) to the shop.

The shop receives the information PKS([Rs,Ts,SID,u]pSKU) and decrypts it by decryption program using the shop's secret key SKS and verifies the signature by signature verifying program using the user's pseudonym public key pPKU if it is valid the shop stores the challenge and the shop regards the payment as valid.

Figure 17:
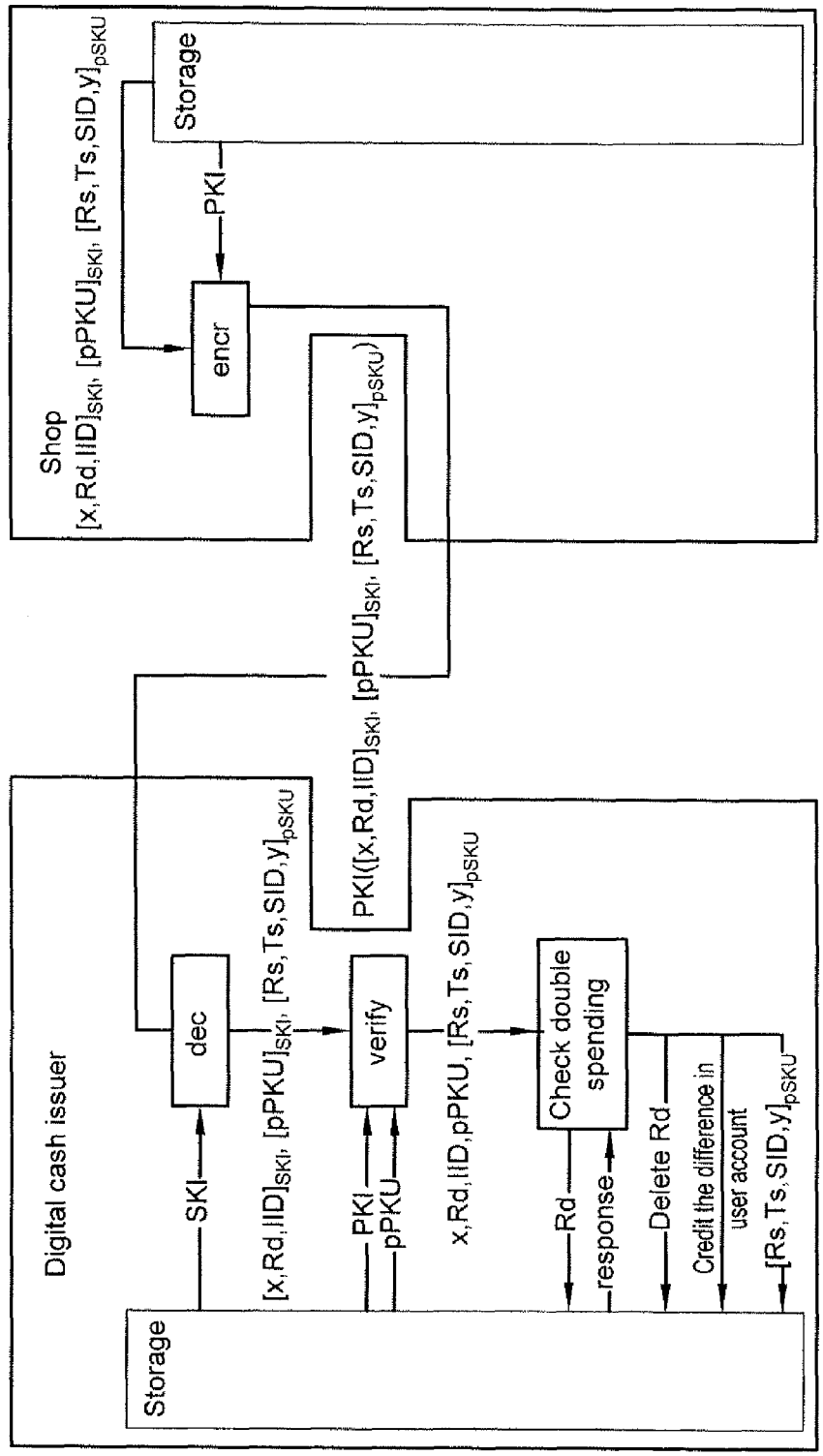
FIG. 17 is an exemplary payment process part 2 according to the second embodiment.

Referring to FIG. 17, after a period of time, the shop encrypts the information that contains the challenge that was signed by the user [Rs,Ts,SID,y]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID,y]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU in the storage device.

Figure 18:
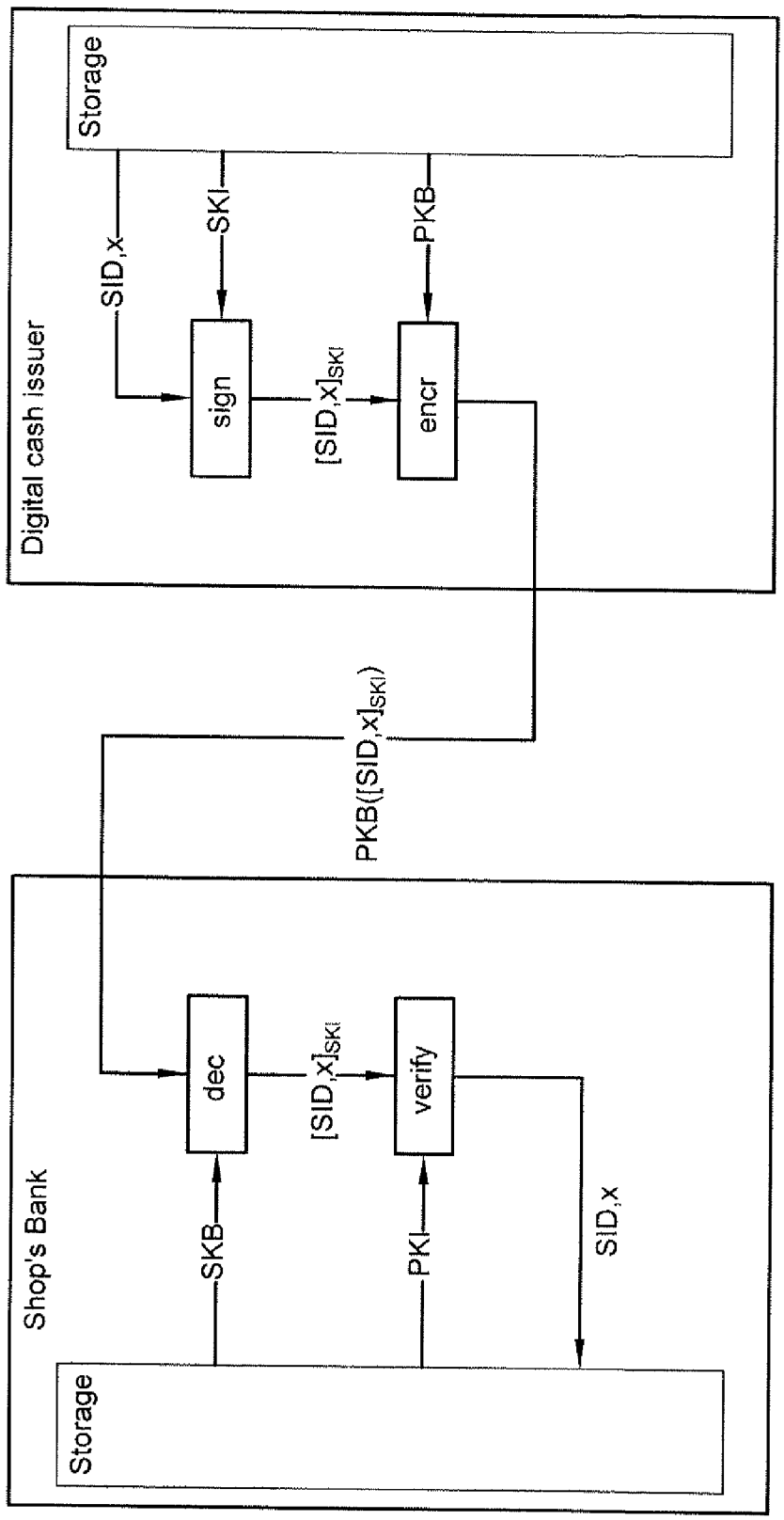
FIG. 18 is an exemplary payment process part 3 according to the second embodiment.

Referring to FIG. 18, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will add x amount of money in the shop account.

Third Embodiment

To add more flexibility, in the third embodiment, the user can transfer digital cash between two virtual accounts opened by different digital cash issuers and divide a digital cash token to smaller tokens as needed.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer1 and the issuer2 comprises a storage device, an encryption program, a decryption program, a signature generating program, a signature verifying program, and a random number generating program. The public key PKI1 and PKI2 is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU1]mSKU by encryption program using the public key of the certificate authority and sends PKC([UID,pPKU1]mSKU) to the certificate authority as a request for certified pseudonym public key (a request for the issuance of a license).

The certificate authority receives the request (PKC([UID, pPKU1]mSKU)) then decrypts it by decryption program using the secret key of the certificate authority SKC and verifies the validity of the user signature by the signature verifying program using the user's master public key mPKU. If it is valid the certificate authority generates a signature (license) [pPKU1]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU1]SKC by encryption program using the user's master public key mPKU then sends mPKU([pPKU1]SKC) to the user.

The user receives the encrypted license mPKU([pPKU1]SKC) then decrypts it by decryption program using the user's master secret key mSKU then verifies the validity of the license [pPKU1]SKC by the signature verifying program using the public key of the certificate authority PKC, if it is valid stores the license in the storage device.

Referring to FIG. 7, the user encrypts the license [pPKU1]SKC, pseudonym public key pPKU1 by the encryption program using the public key of the digital cash issuer1 PKI1 then sends PKI1([pPKU1]SKC,pPKU1) to the digital cash issuer1 as a request for registration in the digital cash issuer1 and for the digital cash issuer license.

The digital cash issued receives PKI([pPKU1]SKC, pPKU1) and decrypts this information by decryption program using the secret key of the digital cash issuer1 SKI1. The digital cash issuer1 searches for pPKU1 in the storage, this will prevents the uses of other users' pseudonym public key, if this user's pseudonym public key pPKU1 is not already registered the digital cash issuer verifies the validity of the license [pPKU1]SKC by the signature verifying program using the certificate authority's public key PKC, if it is valid the digital cash issuer1 sets an empty space storage to the user and stores the user's pseudonym public key pPKU1 in the storage device. The digital cash issuer1 signs the user's pseudonym public key pPKU1 by the signature generating program using the secret key of the digital cash issuer1 SKI1 and encrypts the information by encryption program using the user's pseudonym public key pPKU1 then sends pPKU1([pPKU1]SKI1) as a license to the user.

The user receives pPKU1([pPKU1]SKI1), and decrypts this information by the decryption program using the user's pseudonym secret key pSKU1 then verifies the validity of the digital cash issuer signature by the signature verifying program using the digital cash issuer1's public key PKI1 if it is valid, store the license [pPKU1]SKI1 in the storage device.

The user registers using a second pseudonym public key pPKU2 with the second digital cash issuer2 by the same procedures described above.

FIG. 3 shows the diagrammatic representation of the withdrawal protocol. The user's bank comprises a storage device, a signature verifying program encryption program, decryption program and a signature generating program. The bank's public key PKB are known to all entities.

Referring to FIG. 8, the user signs the user's pseudonym public key pPKU1 and the amount of digital cash x by the signature generating program using the user's pseudonym secret key pSKU1 then encrypts the signed user's pseudonym public key and the amount of digital cash [pPKU1,x]pSKU1 by encryption program using the digital cash issuer1's public key PKI1, and signs the user real identification UID, the amount of money to be withdrawn x, the encrypted signed user's pseudonym public key and the amount of digital cash PKI1([pPKU1,x]pSKU1) by the signature generating program using the user's master secret key mSKU and encrypts the information by encryption program using the public key of the bank PKB then sends PKB([PKI1([pPKU1,x]pSKU1),UID,x]mSKU) to the user's bank.

The bank decrypts PKB([PKI1([pPKU1,x]pSKU1),UID,x]mSKU) by decryption program using the user's bank's secret key SKB and verifies the validity of the signature for authentication by the signature verifying program with the master public key of the user mPKU, if it is valid withdraw the amount of money x from the user account and signs the encrypted signed user's pseudonym public key and the amount of digital cash PKI1([pPKU1,x]pSKU1 and the withdrawn amount of money x by the signature generating program using the bank's secret key SKB, then encrypts the information by encryption program using the public key of the digital cash issuer1 PKI1 then sends PKI1([PKI1([pPKU1,x]pSKU1),x]SKB) to the digital cash issuer1.

Referring to FIG. 9, the digital cash issuer1 receives PKI1([PKI1([pPKU1,x]pSKU1),x]SKB), then decrypts the information by decryption program using the digital cash issuer1's secret key SKI1 and verifies the signature of the bank by signature verifying program using the public key of the user's bank PKB if it is valid the digital cash issuer1 decrypts PKI1([pPKU1,x]pSKU1) by decryption program using the digital cash issuer1's secret key and verifies the signature of the user by signature verifying program using the user's pseudonym public key pPKU1, to authenticate the user, if it is valid, the issuer verifies the equality of the two amounts x if they are not equal the real identity of the user will be revealed by sending pPKU1 to the certificate authority, if they are equals, the digital cash issuer1 will increments the user's virtual account by the amount x of digital cash, then signs the pseudonym public key pPKU1, digital cash amount x, by the signature generating program using the digital cash issuer1's secret key SKI1 then encrypts the signed pseudonym public key and the amount of the digital cash [pPKU1,x]SKI1 by encryption program using the user's pseudonym public key pPKU1 then signs the pPKU1([pPKU1,x]SKI1) by the signature generating program using the digital cash issuer1's secret key SKI1 then encrypts [pPKU1([pPKU1,x]SKI1)]SKI1 using encryption program using the public key of the bank PKB then sends PKB([pPKU1([pPKU1,x]SKI1)]SKI1) to the user's bank.

Referring to FIG. 10, the user's bank then receives the information PKB([pPKU1([pPKU1,x]SKI1)]SKI1) and decrypts it by the decryption program using the user's bank secret key SKIS and verifies the digital cash issuer signature by the signature verifying program using the public key of the digital cash issuer1 PKI1 if it is valid sends pPKU1([pPKU1,x]SKI1) to the user.

The user receives pPKU1([pPKU1,x]SKI1), then decrypts the information by the decryption program using the user's pseudonym secret key then verifies the validity of the digital cash issuer1 signature by the signature verifying program with the digital cash issuer1's public key PKI1. If the signature is valid, the cumulative amount of digital cash is incremented by the amount of digital cash x then stores the new cumulative amount of digital cash in the storage device by the user.

FIG. 4 shows the diagrammatic representation of the digital cash token withdrawal protocol.

Referring to FIG. 11, the user signs the user's pseudonym public key pPKU1 and the amount of digital cash x by the signature generating program using the user's pseudonym secret key pSKU1 then encrypts the signed user's pseudonym public key and the amount of digital cash [pPKU1,x]pSKU1 by encryption program using the digital cash issuer1's public key PKI1, and then sends PKI1([pPKU1,x]pSKU1) to the digital cash issuer1.

The digital cash issuer1 receives PKI1([pPKU1,x]pSKU1), then decrypts PKI1([pPKU1,x]pSKU1) by decryption program using the digital cash issuer1's secret key and verifies the signature of the user by signature verifying program using the user's pseudonym public key pPKU1, to authenticate the user, if it is valid, the digital cash issuer will issues digital cash token which contains the following information: (i) digital cash amount, (ii) random number, (iii) the issuer identity, the digital cash issuer1 generates random number Rd and stores it in the storage device, then signs digital cash amount x, random number Rd and the issuer identity IID1 by signature generating program using the digital cash issuer1's secret key SKI1 and encrypts the information by encryption program using the user's pseudonym public key pPKU1 then decrements the user's virtual account by x then sends pPKU1([x,Rd,IID1]SKI1) to the user.

Figure 19:
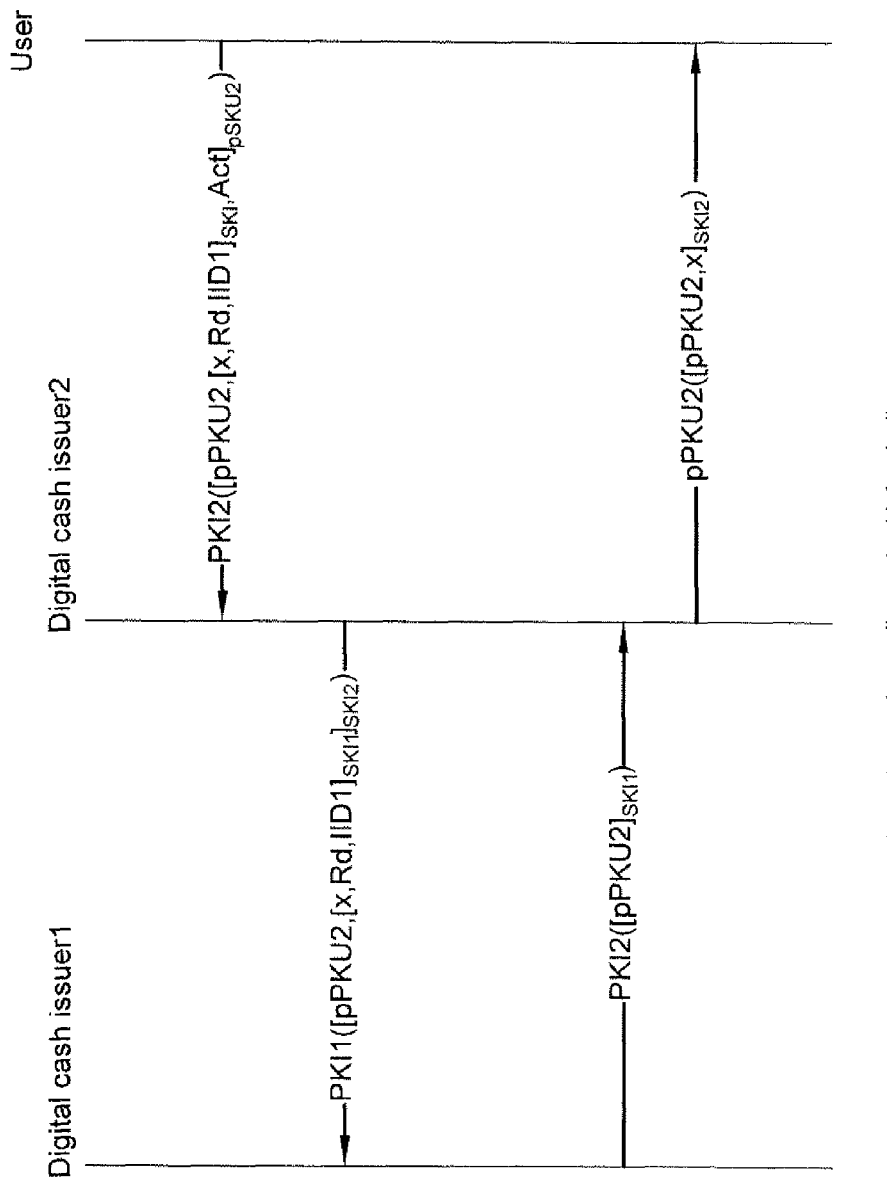
FIG. 19 is an exemplary transferring protocol according to the third embodiment.
Figure 21:
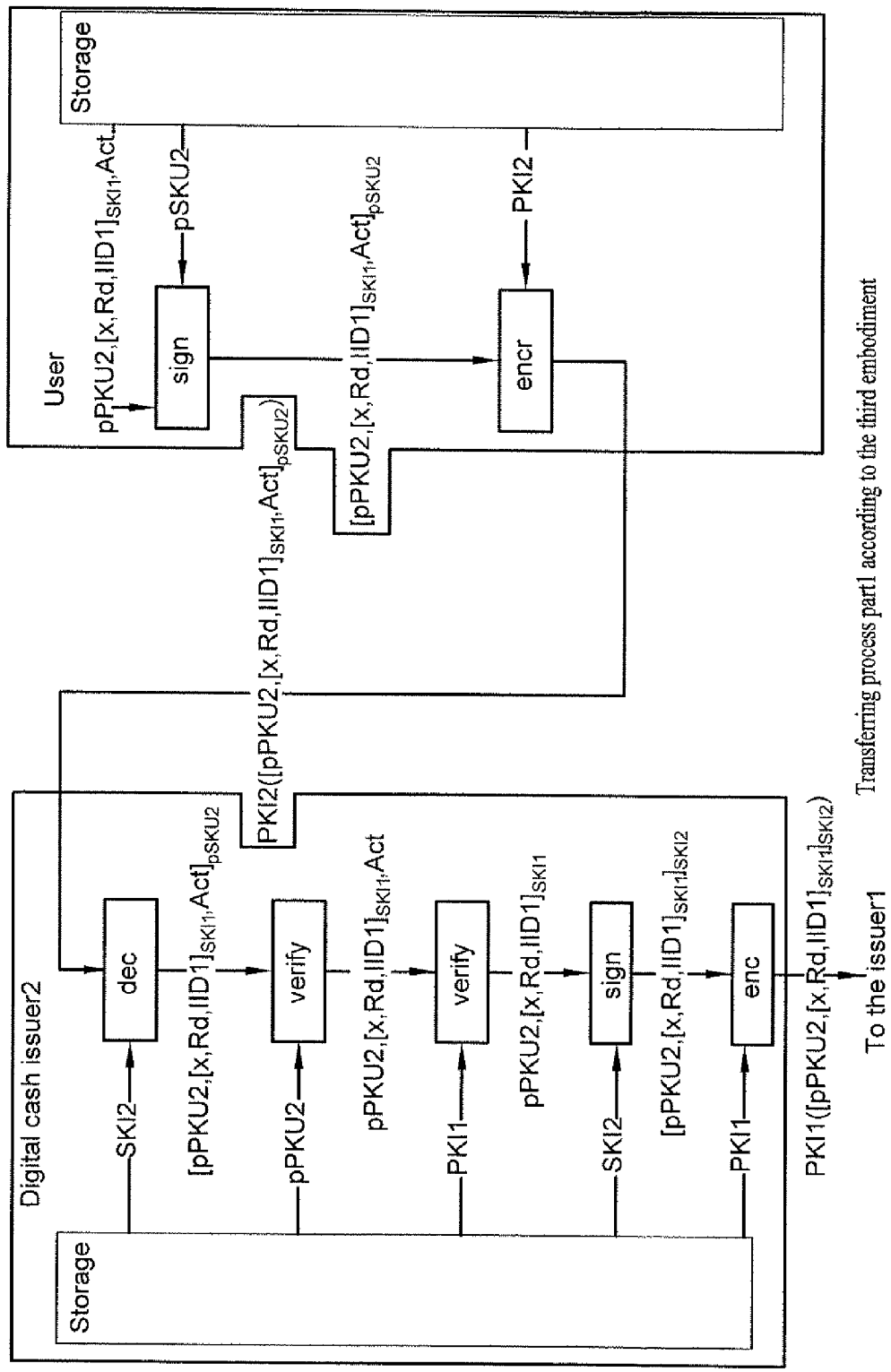
FIG. 21 is an exemplary transferring process part 1 according to the third embodiment.

FIG. 19 shows the diagrammatic representation of the transferring protocol. Referring to FIG. 21, the user signs the user's pseudonym public key pPKU2, the digital cash token [x,Rd,IID1]SKI1 and the action to be taken Act by signature generating program using the user's secret pseudonym key pSKU2 then encrypts [pPKU2, [x,Rd,IID1]SKI1,Act] pSKU2 by encryption program using the public key of the digital cash issuer2 PKI2 then sends it to the digital cash issuer2 as request for transfer digital cash.

The digital cash issuer2 receives PKI2([pPKU2,[x,Rd, IID1]SKI1,Act]pSKU2), then decrypts the information by decryption program using the digital cash issuer2's secret key and verifies the signature of the user by signature verifying program using the user's pseudonym public key pPKU2, to authenticate the user, if it is valid, the digital cash issuer2 signs the user's pseudonym public key pPKU2 and the digital cash token [x,Rd,IID1]SKI1 by signature generating program using the digital cash issuer2 secret key SKI2 then encrypts [pPKU2,[x,Rd,IID1]SKI1]SKI2 by encryption program using the digital cash issuer1's public key PKI1 then sends PKI1([pPKU2,[x,Rd,IID1]SKI1]SKI2) to the digital cash issuer1.

Figure 22:
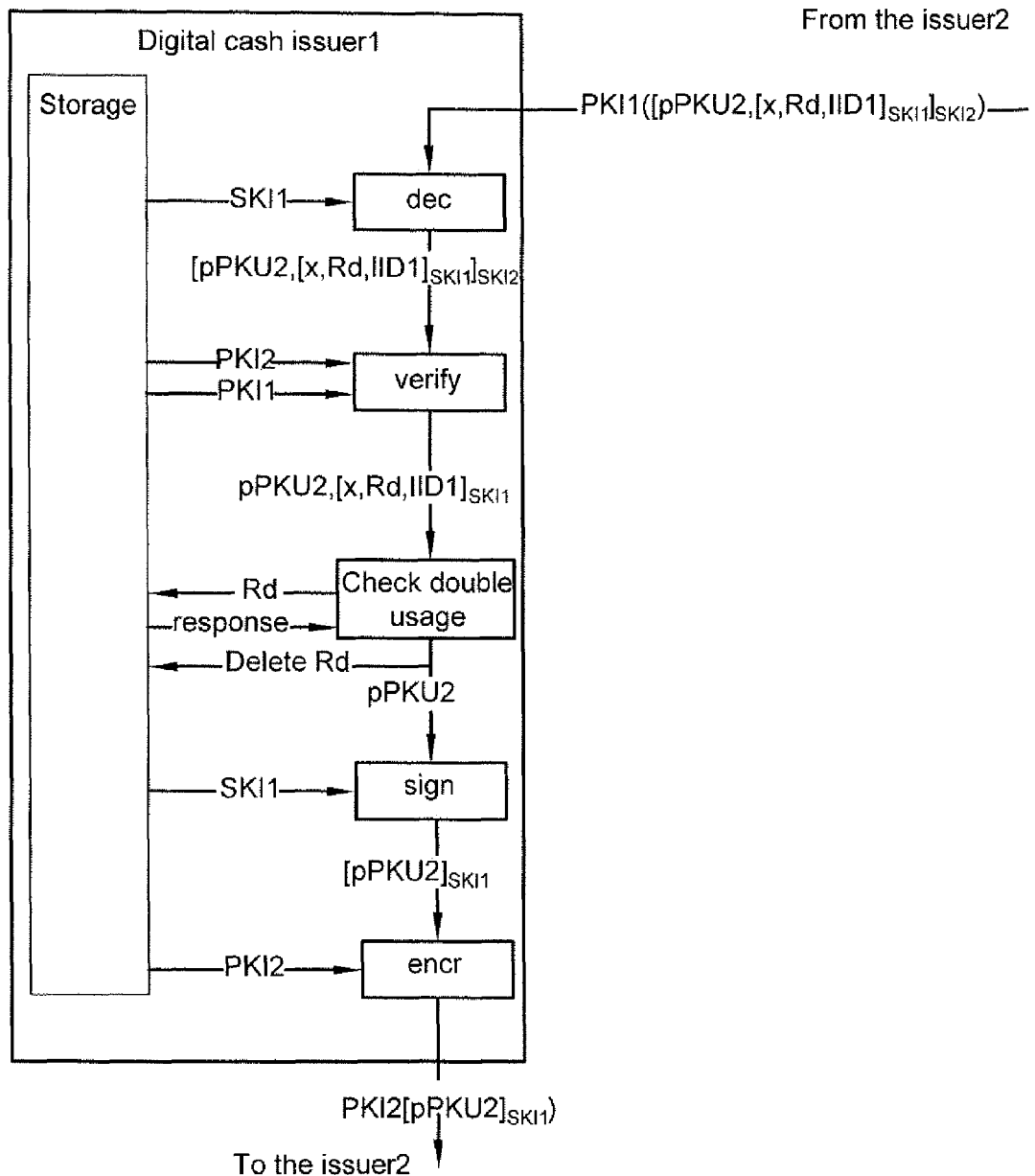
FIG. 22 is an exemplary transferring process part 2 according to the third embodiment.

Referring to FIG. 22, the digital cash issuer1 receives PKI1 ([pPKU2,[x,Rd,IID1]SKI1]SKI2) and decrypts it by decryption program using the digital cash issuer1 secret key SKI1 and verifies the digital cash issuer2 signature by signature verifying program using the digital cash issuer2's public key PKI2 if it is valid, check the Rd if the random number Rd does not exist, this mean there is double spending and the real identity will be revealed by sending the user's pseudonym public key pPKU2 to the certificate authority, if it is not, the digital cash issuer1 signs the pseudonym public key pPKU2 by signature generating program using the digital cash issuer1's secret key SKIT then encrypts [pPKU2]SKI1 by encryption program using the digital cash issuer2's public key PKI2 and sends it to the digital cash issuer2.

Figure 23:
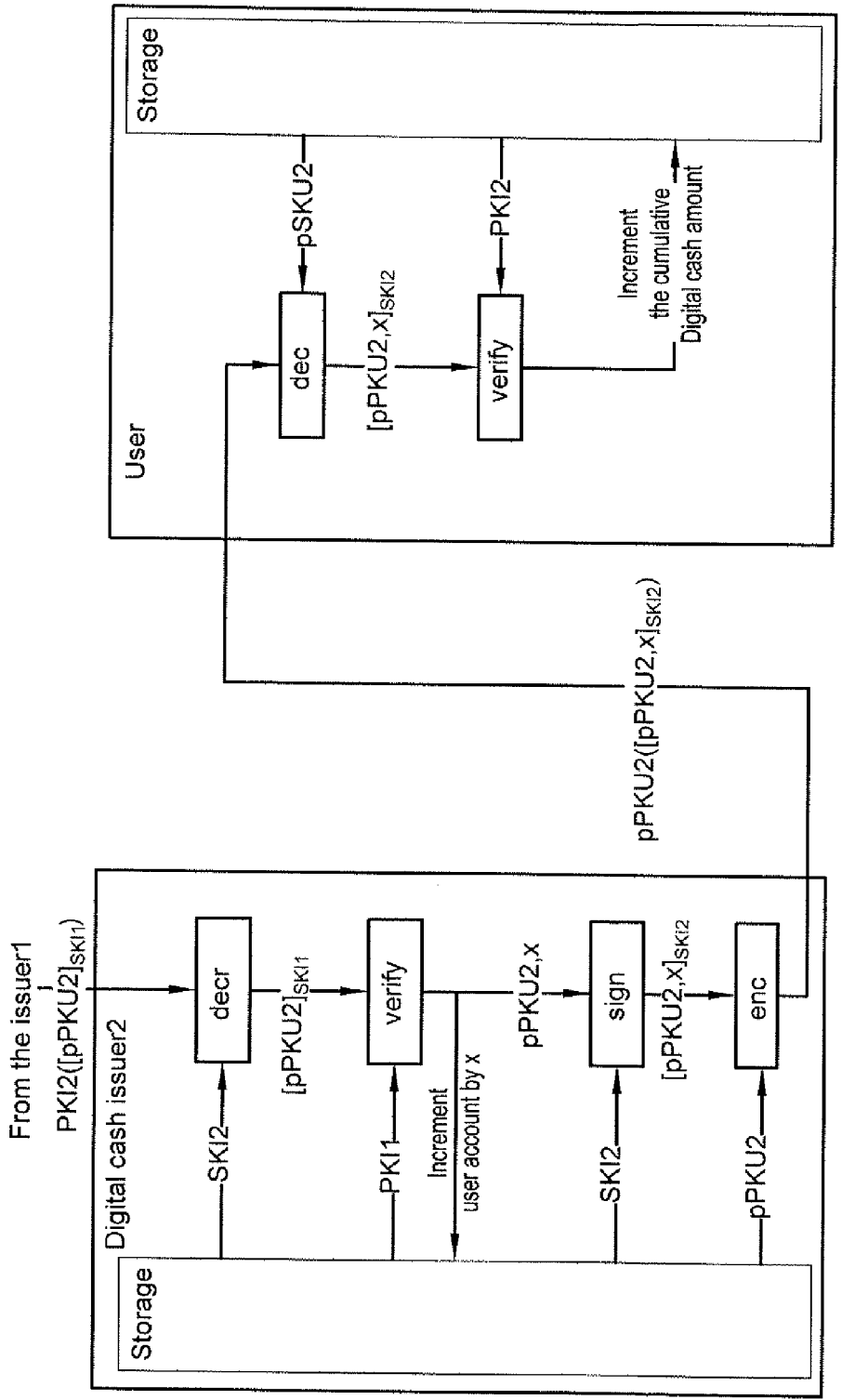
FIG. 23 is an exemplary transferring process part 3 according to the third embodiment.

Referring to FIG. 23, the digital cash issuer2 receives PKI2 ([pPKU2]SKI1) and decrypts it by decryption program using the digital cash issuer2 secret key SKI2 and verifies the digital cash issuer1 signature by signature verifying program using the digital cash issuer1's public key PKI1 if it is valid, the digital cash issuer2 increments the user's virtual account by the amount x of digital cash, then signs the pseudonym public key pPKU2, digital cash amount x, by the signature generating program using the digital cash issuer2's secret key SKI2 then encrypts [pPKU2,x]SKI2 by encryption program using the user's pseudonym public key pPKU2 then sends pPKU2 ([pPKU2,x]SKI2) to the user.

The user receives pPKU2([pPKU2,x]SKI2), then decrypts the information by the decryption program using the user's pseudonym secret key then verifies the validity of the digital cash issuer2 signature by the signature verifying program with the digital cash issuer2's public key PKI2. If the signature is valid, the cumulative amount of digital cash is incremented by the amount of digital cash x then stores the new cumulative amount of digital cash in the storage device by the user.

Figure 20:
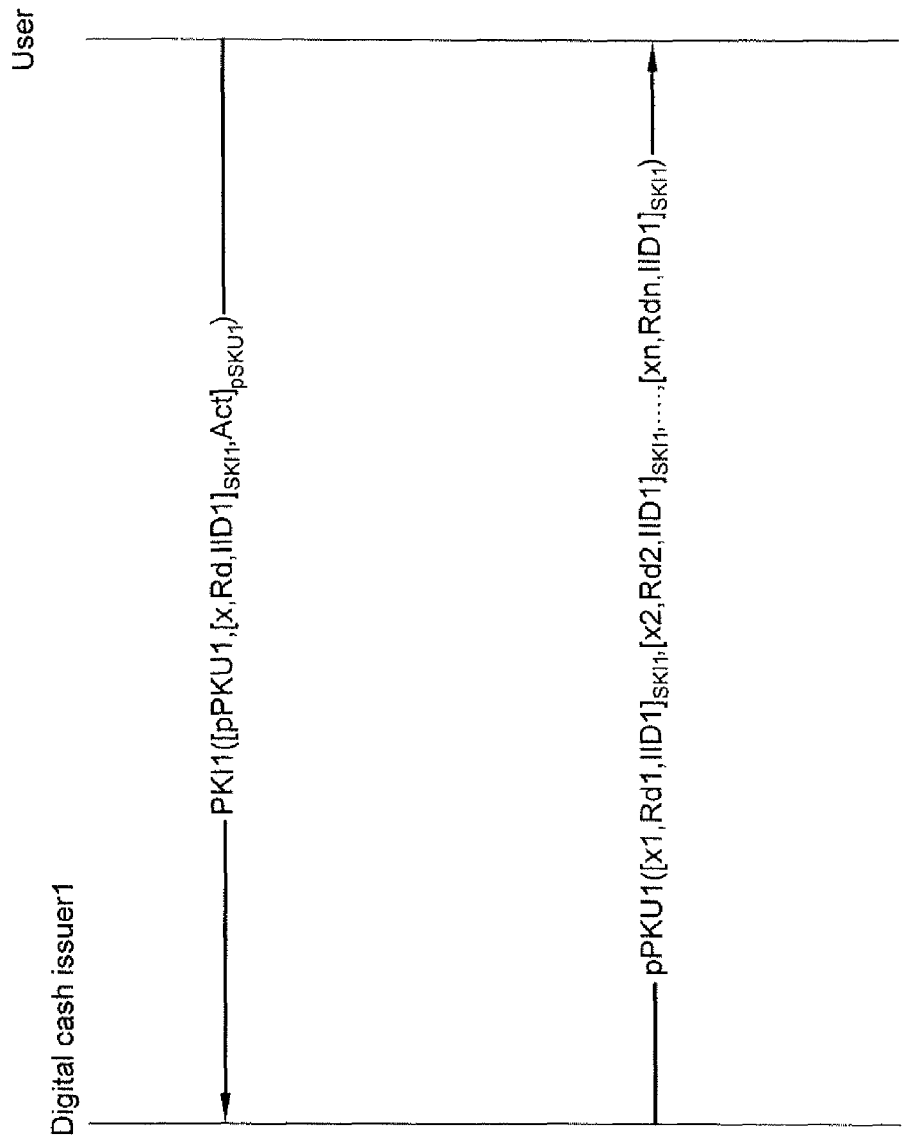
FIG. 20 is an exemplary dividing digital cash token protocol according to the third embodiment.
Figure 24:
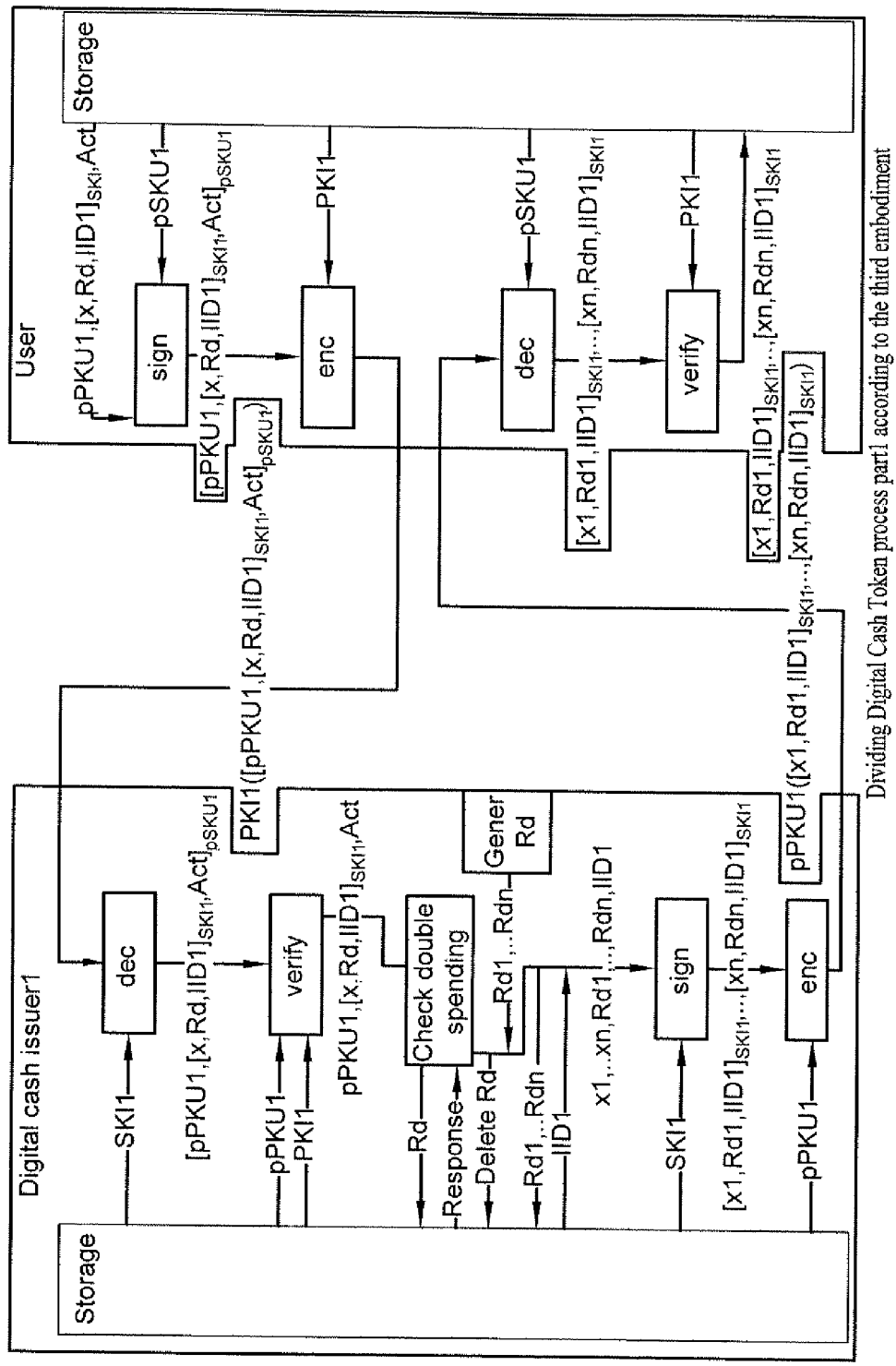
FIG. 24 is an exemplary dividing digital cash token process part 1 according to the third embodiment.

FIG. 20 shows the diagrammatic representation of the dividing digital cash token protocol. Referring to FIG. 24, the user signs the user's pseudonym public key pPKU1, the digital cash token [x,Rd,IID1]SKI1 and the action to be taken Act by signature generating program using the user's secret pseudonym key pSKU1 then encrypts [pPKU1, [x,Rd,IID1] SKI1,Act]pSKU1 by encryption program using the public key of the digital cash issuer1 PKI1 then sends it to the digital cash issuer1 as request for transfer digital cash.

The digital cash issuer1 receives PKI1([pPKU1,[x,Rd, IID1]SKI1,Act]pSKU1), then decrypts the information by decryption program using the digital cash issuer1's secret key and verifies the signature of the user by signature verifying program using the user's pseudonym public key pPKU1, to authenticate the user, if it is valid, the digital cash issuer1 check the Rd if the random number Rd does not exist, this mean there is double spending and the real identity will be revealed by sending the user's pseudonym public key pPKU1 to the certificate authority, if it is not, the digital cash issuer1 deletes the random number Rd and will issues smaller digital cash tokens which contains the following information: (i) digital cash amount, (ii) random number, (iii) the issuer identity, the digital cash issued generates random numbers Rd1, Rd2, . . . Rdn and stores them in the storage device, then signs digital cash amounts x1, x2, . . . , xn, random numbers Rd1, Rd2, . . . Rdn and the issuer identity IID1 by signature generating program using the digital cash issuer1's secret key SKI1 and encrypts the information by encryption program using the user's pseudonym public key pPKU1 then sends pPKU1([x1,Rd1,IID1]SKI1, [x2,Rd2,IID1]SKI1, . . . , [xn, Rdn,IID1]SKI1) to the user.

The user receives pPKU1([x1,Rd1,IID1]SKI1, [x2,Rd2, IID1]SKI1, . . . , [xn,Rdn,IID1]SKI1), then decrypts the information by the decryption program using the user's pseudonym secret key then verifies the validity of the digital cash issued signature by the signature verifying program with the digital cash issuer1's public key PKI1. If the signature is valid, the user stores the digital cash tokens [x1,Rd1,IID1] SKI1, [x2,Rd2,IID1]SKI1, . . . , [xn,Rdn,IID1]SKI1) in the storage device.

FIG. 15 shows the diagrammatic representation of the payment protocol. The shop comprises a storage device, a signature verifying program encryption program, decryption program, a signature generating program, a random number generating program and a time generating program the shop public key PKS is known to all entities.

Referring to FIG. 16, the user encrypts the digital cash token [x,Rd,IID1]SKI1 and the digital cash issuer license [pPKU1]SKI1 by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer1 license PKS([x,Rd,IID1]SKI1, [pPKU1] SKI1) by decryption program using the shop's secret key SKS then verify the signature of the issuer by the signature verifying program with the digital cash issuer1 public key PKI1 if the signatures are valid the shop stores the user's digital cash issuer1 license, the digital cash token and generates a random number Rs by random number generating program and generates the time Ts by the time generating program then encrypt Rs,Ts, the shop identification SID and the price of the good y by encryption program using the user's pseudonym public key pPKU1 and sends pPKU1 (Rs,Ts,SID, y) to the user.

The user receives pPKU1(Rs,Ts,SID,y) and decrypts it by decryption program using the user's pseudonym secret key pSKU1 and signs the random number Rs, the time Ts, the shop identification SID and the price of the good y by signature generating program using the user's pseudonym secret key pSKU1 and encrypts the information by encryption program using the public key of the shop PKS then sends PKS ([Rs,Ts,SID,y]pSKU1) to the shop.

The shop receives the information PKS([Rs,Ts,SID,u] pSKU1) and decrypts it by decryption program using the shop's secret key SKS and verifies the signature by signature verifying program using the user's pseudonym public key pPKU1 if it is valid the shop stores the challenge and the shop regards the payment as valid.

Referring to FIG. 17, after a period of time, the shop encrypts the information that contains the challenge that was signed by the user [Rs,Ts,SID,y]pSKU1, the digital cash token [x,Rd,IID1]SKI1, and the user's digital cash issuer1 license [pPKU1]SKI1, by encryption program using the public key of the digital cash issuer1 PKI1 and sends the information to the digital cash issuer1.

The digital cash issuer1 decrypts PKI([Rs,Ts,SID,y] pSKU1, [x,Rd,IID1]SKI1, [pPKU1]SKI1) by decryption program using the digital cash issuer1's secret key SKI1 and verifies the signature by the signature verifying program using the digital cash issuer1's public key PKI1 and the user's pseudonym public key pPKU1, if the signatures are valid the issued check the Rd if the random number Rd does not exist, this mean there is double spending and the real identity will be revealed by sending the user's pseudonym public key pPKU1 to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU1 in the storage device.

Referring to FIG. 18, the digital cash issuer1 signs the shop identification SID, and the amount x to be deposited for the shop by the signature generating program with the digital cash issuer1's secret key SKI1 and encrypts the information by encryption program using the public key of the shop's bank PKB then sends PKB([SID,x1]SKI1) to the shop's bank.

The shop's bank receives PKB([SID,x]SKI1) and decrypts the information by decryption program using the secret key SKB and verifies the signature by signature verifying program with the public key of the issuer1 PKI1 if the signature is valid the shop's bank will add x amount of money in the shop account.

Fourth Embodiment

In the previous embodiment, there is common data, which is the key pointer between the digital cash issuer and the bank, which gives a chance to link the user's real identification and the user's pseudonym public key, for stronger protection for privacy, the digital cash issuer has cryptographic coprocessor, so the user encrypts the key pointer using the public key of cryptographic coprocessor, in this way the bank cannot get any shared data between the user's real identification and the user's pseudonym public key. Also, using the cryptographic coprocessor to encrypt is more powerful in sense that whenever the data is encrypted nobody can decrypt it without the coprocessor, in contrast the public key of said the issuer can be leaked outside the issuer and can be misused.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU]SKC) to the user.

The user receives the encrypted license mPKU([pPKU] SKC) then decrypts it by decryption program using the user's master secret key mSKU then verifies the validity of the license [pPKU]SKC by the signature verifying program using the public key of the certificate authority PKC, if it is valid stores the license in the storage device.

Referring to FIG. 7, the user encrypts the license [pPKU] SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU] SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

Figure 25:
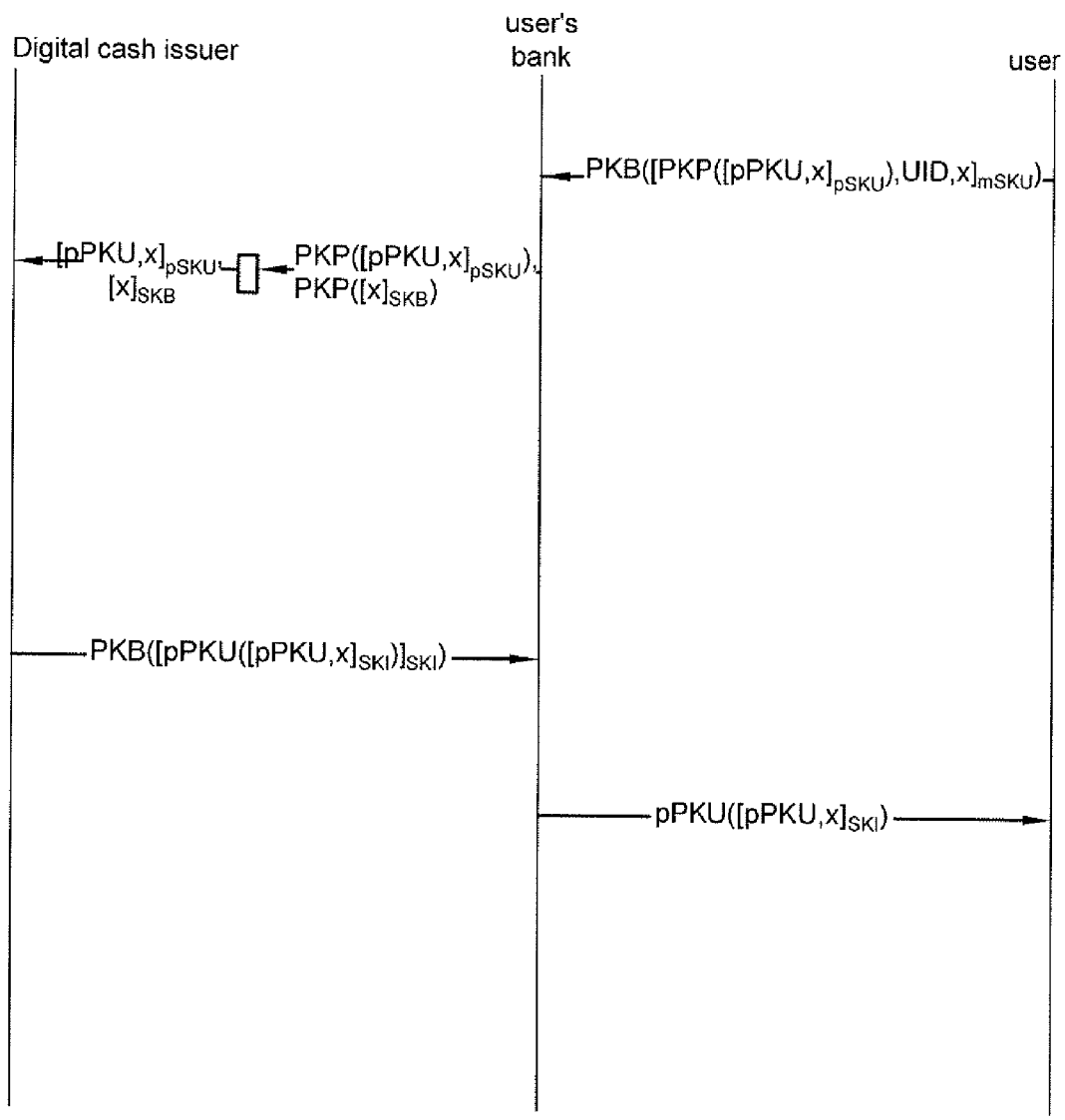
FIG. 25 is an exemplary withdrawal protocol according to the fourth embodiment.

FIG. 25 shows the diagrammatic representation of the withdrawal protocol. The user's bank comprises a storage device, a signature verifying program encryption program, decryption program and a signature generating program. The bank's public key PKB are known to all entities.

Figure 26:
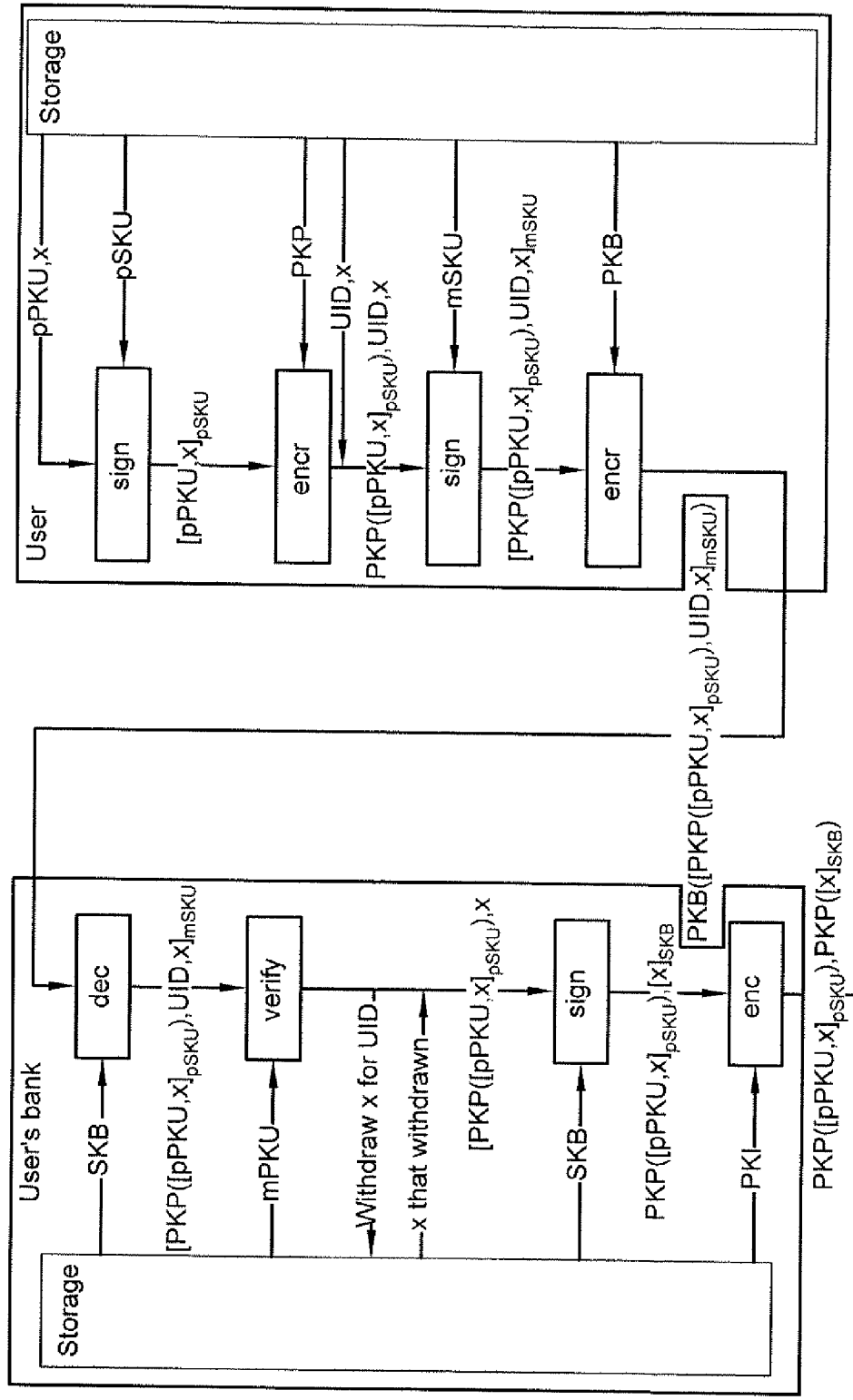
FIG. 26 is an exemplary withdrawal process part 1 according to the fourth, fifth and sixth embodiment.

Referring to FIG. 26, the user signs the user's pseudonym public key pPKU and the amount of digital cash x by the signature generating program using the user's pseudonym secret key pSKU and encrypts the signed user's pseudonym public key and the amount of digital cash [pPKU,x]pSKU by encryption program using the public key of a cryptographic coprocessor PKP and signs the user real identification UID, the amount of money to be withdrawn x, and PKP([pPKU,x] pSKU) by the signature generating program using the user's master secret key mSKU and encrypts the information by encryption program using the public key of the user's bank PKB then sends PKB([PKP([pPKU,x]pSKU),UID,x] mSKU) to the user's bank.

The user's bank decrypts PKB([PKP([pPKU,x]pSKU), UID,x]mSKU) by decryption program using the bank's secret key and verifies the validity of the signature for authentication by the signature verifying program with the master public key of the user mPKU, if it is valid withdraw the amount of money x from the user account and signs the amount x that is withdrawn from the user account by the signature generating program using the user's bank's secret key SKB and encrypts [x]SKB by encryption program using the public key of the cryptographic coprocessor PKP, then sends information PKP([pPKU,x]pSKU) and PKP([x]SKB) to the digital cash issuer.

Figure 27:
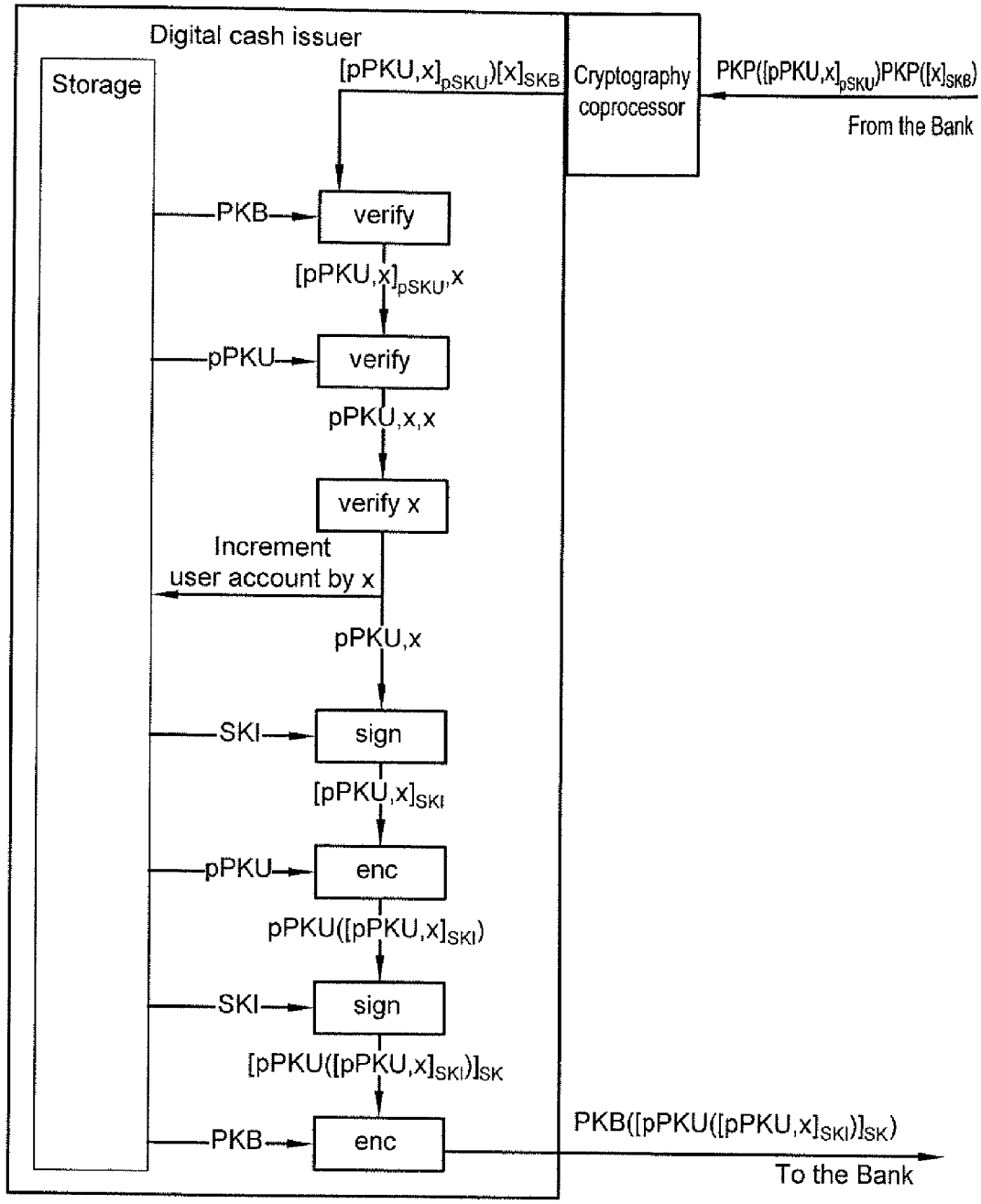
FIG. 27 is an exemplary withdrawal process part 2 according to the fourth, fifth and sixth embodiment.
Figure 28:
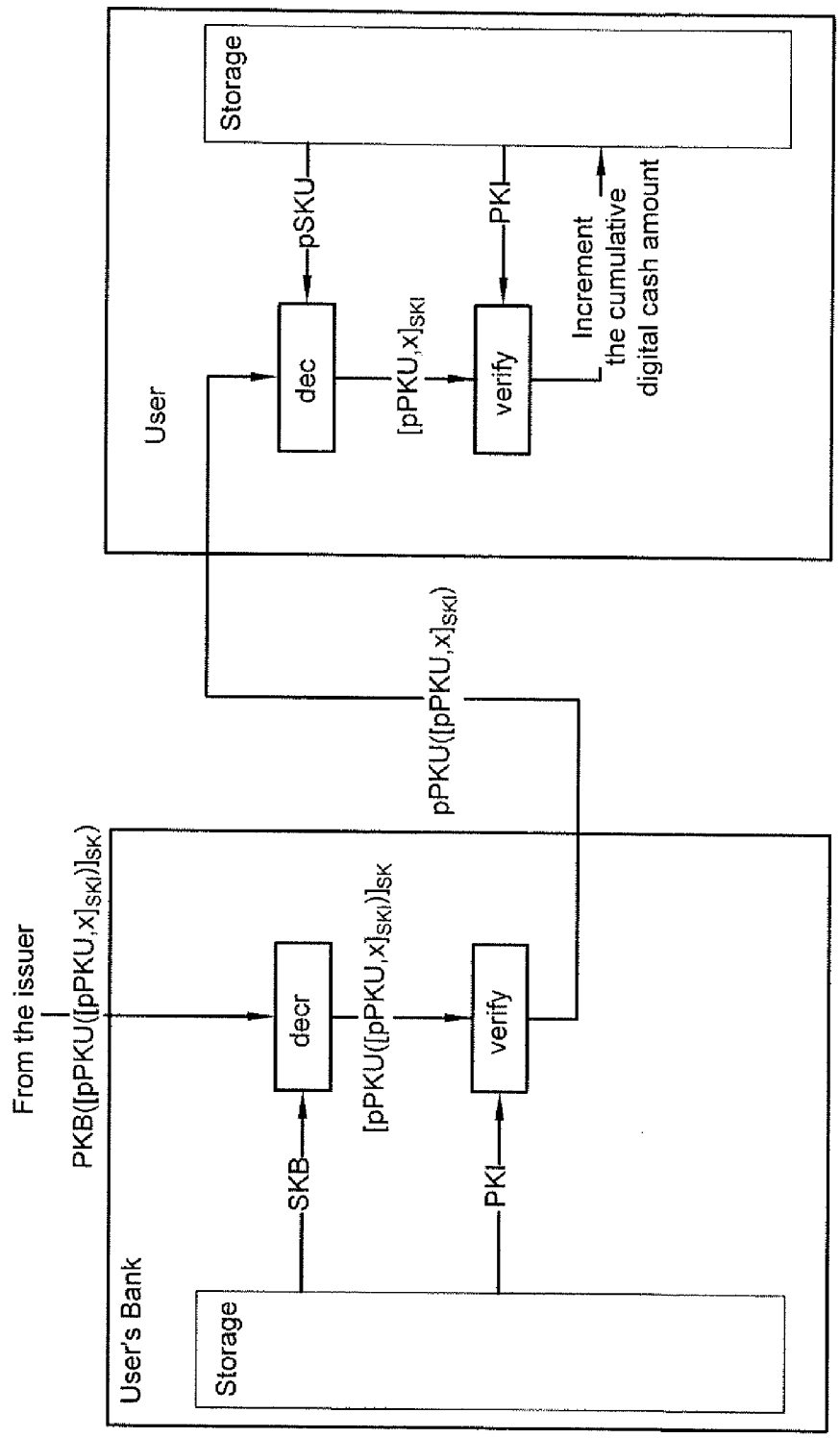
FIG. 28 is an exemplary withdrawal process part 2 according to the fourth, fifth and sixth embodiment.

Referring to FIG. 27, the digital cash issuer receives PKP ([pPKU,x]pSKU) and PKP([x]SKB), then decrypts the information using the secret key of the cryptographic coprocessor, to obtains the signed user's pseudonym public key and the amount of digital cash [pPKU,x]pSKU and the signed amount of withdrawn money from the user account [x]SKB then verifies the signature of the bank by signature verifying program using the public key of the bank PKB if it is valid the digital cash issuer verifies the user's signature [pPKU,x] pSKU by signature verifying program using the user's pseudonym ptiblic key pPKU to authenticate the user, if it is valid, the issuer verifies the equality of the two amounts x if they are not equal the real identity of the user will be revealed by sending pPKU to the certificate authority, if they are equals, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then signs the pPKU([pPKU,x]SKI) by the signature generating program using the digital cash issuer's secret key SKI then encrypts [pPKU([pPKU,x]SKI)]SKI using encryption program using the public key of the bank PKB then sends PKB ([pPKU([pPKU,x]SKI)]SKI) to the user's bank. Referring to FIG. 28, the user's bank then receives the information PKB ([pPKU([pPKU,x]SKI)]SKI) and decrypts it by the decryption program using the user's bank secret key SKB and verifies the digital cash issuer signature by the signature verifying program using the public key of the digital cash issuer PKI if it is valid sends pPKU([PKU,x]SKI) to the user.

The user receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user.

FIG. 4 shows the diagrammatic representation of the digital cash token withdrawal protocol. Referring to FIG. 11, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI ([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity HD by signature generating program using the digital cash issuer's secret key SKI and encrypts the information by encryption program using the user's pseudonym public key pPKU then decrements the user's virtual account by x then sends pPKU([x, Rd,IID]SKI) to the user.

The user receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user stores the digital cash token [x,Rd,IID]SKI and the cumulative amount of digital cash is decremented by the amount of the digital cash token x then stores the new cumulative amount of digital cash in the storage device by the user.

FIG. 5 shows the diagrammatic representation of the payment protocol. The shop comprises a storage device, a signature verifying program encryption program, decryption program, a signature generating program, a random number generating program and a time generating program the shop public key PKS is known to all entities.

Referring to FIG. 12, the user encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, and the shop identification SID by encryption program using the user's pseudonym public key pPKU and sends pPKU(Rs,Ts,SID) to the user.

The user receives pPKU(Rs,Ts,SID) and decrypts it by decryption program using the user's pseudonym secret key pSKU and signs the random number Rs, the time Ts, and the shop identification SID by signature generating program using the user's pseudonym secret key pSKU and encrypts the information by encryption program using the public key of the shop PKS then sends PKS([Rs,Ts,SID]pSKU) to the shop.

The shop receives the information PKS([Rs,Ts,SID] pSKU) and decrypts it by decryption program using the shop's secret key SKS and verifies the signature by signature verifying program using the user's pseudonym public key pPKU if it is valid the shop stores the challenge and the shop regards the payment as valid.

Referring to FIG. 13, after a period of time, the shop encrypts the information that contains the challenge that was signed by the user [Rs,Ts,SID]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by x then the digital cash issuer stores the challenge [Rs,Ts,SID]pSKU in the storage device.

Referring to FIG. 14, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will add x amount of money in the shop account.

Fifth Embodiment

In the fifth embodiment, there is cryptographic coprocessor that is used between the bank and the digital cash issuer, and the digital cash token can be more than the price of the goods.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU]SKC) to the user.

The user receives the encrypted license mPKU([pPKU] SKC) then decrypts it by decryption program using the user's master secret key mSKU then verifies the validity of the license [pPKU]SKC by the signature verifying program using the public key of the certificate authority PKC, if it is valid stores the license in the storage device.

Referring to FIG. 7, the user encrypts the license [pPKU] SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU] SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

FIG. 25 shows the diagrammatic representation of the withdrawal protocol. The user's bank comprises a storage device, a signature verifying program encryption program, decryption program and a signature generating program. The bank's public key PKB is known to all entities.

Referring to FIG. 26, the user signs the user's pseudonym public key pPKU and the amount of digital cash x by the signature generating program using the user's pseudonym secret key pSKU and encrypts the signed user's pseudonym public key and the amount of digital cash [pPKU,x]pSKU by encryption program using the public key of a cryptographic coprocessor PKP and signs the user real identification UID, the amount of money to be withdrawn x, and PKP([pPKU,x] pSKU) by the signature generating program using the user's master secret key in mSKU and encrypts the information by encryption program using the public key of the user's bank PKB then sends PKB([PKP([pPKU,x]pSKU),UID,x] mSKU) to the user's bank.

The user's bank decrypts PKB([PKP([pPKU,x]pSKU), UID,x]mSKU) by decryption program using the bank's secret key and verifies the validity of the signature for authentication by the signature verifying program with the master public key of the user mPKU, if it is valid withdraw the amount of money x from the user account and signs the amount x that is withdrawn from the user account by the signature generating program using the user's bank's secret key SKB and encrypts [x]SKB by encryption program using the public key of the cryptographic coprocessor PKP, then sends information PKP([pPKU,x]pSKU) and PKP([x]SKB) to the digital cash issuer.

Referring to FIG. 27, the digital cash issuer receives PKP ([pPKU,x]pSKU) and PKP([x]SKB), then decrypts the information using the secret key of the cryptographic coprocessor, to obtains the signed user's pseudonym public key and the amount of digital cash [pPKU,x]pSKU and the signed amount of withdrawn money from the user account [x]SKB then verifies the signature of the bank by signature verifying program using the public key of the bank PKB if it is valid the digital cash issuer verifies the user's signature [pPKU,x] pSKU by signature verifying program using the user's pseudonym public key pPKU if it is valid, the issuer verifies the equality of the two amounts x if they are not equal the real identity of the user will be revealed by sending pPKU to the certificate authority, if they are equals, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then signs the pPKU([pPKU, x]SKI) by the signature generating program using the digital cash issuer's secret key SKI then encrypts [pPKU([pPKU,x] SKI)]SKI using encryption program using the public key of the bank PKB then sends PKB([pPKU([pPKU,x]SKI)]SKI) to the user's bank.

Referring to FIG. 28, the user's bank then receives the information PKB([pPKU([pPKU,x]SKI)]SKI) and decrypts it by the decryption program using the user's bank secret key SKB and verifies the digital cash issuer signature by the signature verifying program using the public key of the digital cash issuer PKI if it is valid sends pPKU([pPKU,x]SKI) to the user.

The user receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user.

FIG. 4 shows the diagrammatic representation of the digital cash token withdrawal protocol. Referring to FIG. 11, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI ([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU then decrements the user's virtual account by x then sends pPKU([x, Rd,IID]SKI) to the user.

The user receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user stores the digital cash token [x,Rd,IID]SKI and the cumulative amount of digital cash is decremented by the amount of the digital cash token x then stores the new cumulative amount of digital cash in the storage device by the user.

FIG. 15 shows the diagrammatic representation of the payment protocol. The shop comprises a storage device, a signature verifying program encryption program, decryption program, a signature generating program, a random number generating program and a time generating program the shop public key PKS is known to all entities.

Referring to FIG. 16, the user encrypts the digital cash token [x,Rd,IID]SKI and the digital cash issuer license

[pPKU]SKI by encryption program using the public key of the shop PKS then sends it to the shop as request for payment.

The user can send a payment request using another certified pseudonym public key, because the pseudonym is not associated with digital cash token. This gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, the shop identification SID and the price of the good y by encryption program using the user's pseudonym public key pPKU and sends pPKU(Rs,Ts,SID,y) to the user.

The user receives pPKU(Rs,Ts,SID,y) and decrypts it by decryption program using the user's pseudonym secret key pSKU and signs the random number Rs, the time Ts, the shop identification SID and the price of the good y by signature generating program using the user's pseudonym secret key pSKU and encrypts the information by encryption program using the public key of the shop PKS then sends PKS([Rs,Ts,SID,y]pSKU) to the shop.

The shop receives the information PKS([Rs,Ts,SID,u]pSKU) and decrypts it by decryption program using the shop's secret key SKS and verifies the signature by signature verifying program using the user's pseudonym public key pPKU if it is valid the shop stores the challenge and the shop regards the payment as valid.

Referring to FIG. 17, after period of time the shop encrypts the information that contains the challenge that was signed by the user [Rs,Ts,SID,y]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID,y]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU in the storage device.

Referring to FIG. 18, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will acid x amount of money in the shop account.

Sixth Embodiment

In this embodiment, there is cryptographic coprocessor that is used between the bank and the digital cash issuer, and the digital cash token can be more than the price of the goods, and the user can transfer digital cash between two virtual accounts opened by different digital cash issuers to divide a digital cash token into smaller tokens as needed.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer1 and the issuer2 comprises a storage device, an encryption program, a decryption program, a signature generating program, a signature verifying program, and a random number generating program. The public key PKI1 and PKI2 is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU1]mSKU by encryption program using the public key of the certificate authority and sends PKC([UID,pPKU1]mSKU) to the certificate authority as a request for certified pseudonym public key (a request for the issuance of a license).

The certificate authority receives the request (PKC([UID, pPKU1]mSKU)) then decrypts it by decryption program using the secret key of the certificate authority SKC and verifies the validity of the user signature by the signature verifying program using the user's master public key mPKU. If it is valid the certificate authority generates a signature (license) [pPKU1]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU1]SKC by encryption program using the user's master public key mPKU then sends mPKU([pPKU1]SKC) to the user.

The user receives the encrypted license in mPKU([pPKU1]SKC) then decrypts it by decryption program using the user's master secret key mSKU then verifies the validity of the license [pPKU1]SKC by the signature verifying program using the public key of the certificate authority PKC, if it is valid stores the license in the storage device.

Referring to FIG. 7, the user encrypts the license [pPKU1]SKC, pseudonym public key pPKU1 by the encryption program using the public key of the digital cash issuer1 PKI1 then sends PKI1([pPKU1]SKC,pPKU1) to the digital cash issuer1 as a request for registration in the digital cash issuer1 and for the digital cash issuer license.

The digital cash issuer1 receives PKI([pPKU1]SKC, pPKU1) and decrypts this information by decryption program using the secret key of the digital cash issuer1 SKI1. The digital cash issuer1 searches for pPKU1 in the storage, this will prevents the uses of other users' pseudonym public key, if this user's pseudonym public key pPKU1 is not already registered the digital cash issuer verifies the validity of the license [pPKU1]SKC by the signature verifying program using the certificate authority's public key PKC, if it is valid the digital cash issuer1 sets an empty space storage to the user and stores the user's pseudonym public key pPKU1 in the storage device. The digital cash issuer1 signs the user's pseudonym public key pPKU1 by the signature generating program using the secret key of the digital cash issuer1 SKI1 and encrypts the information by encryption program using the user's pseudonym public key pPKU1 then sends pPKU1 ([pPKU1]SKI1) as a license to the user.

The user receives pPKU1([pPKU1]SKI1), and decrypts this information by the decryption program using the user's pseudonym secret key pSKU1 then verifies the validity of the digital cash issuer signature by the signature verifying program using the digital cash issuer1's public key PKI1 if it is valid, store the license [pPKU1]SKI1 in the storage device.

The user registers using a second pseudonym public key pPKU2 with the second digital cash issuer2 by the same procedures described above.

FIG. 25 shows the diagrammatic representation of the withdrawal protocol. The user's bank comprises a storage device, a signature verifying program encryption program, decryption program and a signature generating program. The bank's public key PKB are known to all entities.

Referring to FIG. 26, the user signs the user's pseudonym public key pPKU1 and the amount of digital cash x by the signature generating program using the user's pseudonym secret key pSKU1 and encrypts the signed user's pseudonym public key and the amount of digital cash [pPKU1,x]pSKU1 by encryption program using the public key of a cryptographic coprocessor PKP and signs the user real identification UID, the amount of money to be withdrawn x, and PKP ([pPKU1,x]pSKU1) by the signature generating program using the user's master secret key mSKU and encrypts the information by encryption program using the public key of the user's bank PKB then sends PKB([PKP([pPKU1,x] pSKU1),UID,x]mSKU) to the user's bank.

The user's bank decrypts PKB([PKP([pPKU1,x]pSKU1), UID,x]mSKU) by decryption program using the bank's secret key and verifies the validity of the signature for authentication by the signature verifying program with the master public key of the user mPKU, if it is valid withdraw the amount of money x from the user account and signs the amount x that is withdrawn from the user account by the signature generating program using the user's bank's secret key SKB and encrypts [x]SKB by encryption program using the public key of the cryptographic coprocessor PKP, then sends information PKP([pPKU1,x]pSKU1) and PKP([x] SKB) to the digital cash issuer1.

Referring to FIG. 27, the digital cash issuer1 receives PKP ([pPKU1,x]pSKU1) and PKP([x]SKB), then decrypts the information using the secret key of the cryptographic coprocessor, to obtains the signed user's pseudonym public key and the amount of digital cash [pPKU1,x]pSKU1 and the signed amount of withdrawn money from the user account [x]SKB then verities the signature of the bank by signature verifying program using the public key of the bank PKB if it is valid the digital cash issuer1 verifies the user's signature [pPKU1,x] pSKU1 by signature verifying program using the user's pseudonym public key pPKU1 if it is valid, the issuer1 verifies the equality of the two amounts x if they are not equal the real identity of the user will be revealed by sending pPKU1 to the certificate authority, if they are equals, the digital cash issuer1 will increments the user's virtual account by the amount x of digital cash, then signs the pseudonym public key pPKU1, digital cash amount x, by the signature generating program using the digital cash issuer1's secret key SKI1 then encrypts the signed pseudonym public key and the amount of the digital cash [pPKU1,x]SKI1 by encryption program using the user's pseudonym public key pPKU1 then signs the pPKU1([pPKU1,x]SKI1) by the signature generating program using the digital cash issuer1's secret key SKI1 then encrypts [pPKU1([pPKU1,x]SKI1)]SKI1 using encryption program using the public key of the bank PKB then sends PKB([pPKU1([pPKU1,x]SKI1)]SKI1) to the user's bank.

Referring to FIG. 28, the user's bank then receives the information PKB([pPKU1([pPKU1,x]SKI1)]SKI1) and decrypts it by the decryption program using the user's bank secret key SKB and verifies the digital cash issuer signature by the signature verifying program using the public key of the digital cash issuer1 PKI1 if it is valid sends pPKU1([pPKU1, x]SKI1) to the user.

The user receives pPKU1([pPKU1,x]SKI1), then decrypts the information by the decryption program using the user's pseudonym secret key then verifies the validity of the digital cash issuer1 signature by the signature verifying program with the digital cash issuer1's public key PKI1. If the signature is valid, the cumulative amount of digital cash is incremented by the amount of digital cash x then stores the new cumulative amount of digital cash in the storage device by the user.

FIG. 3 shows the diagrammatic representation of the withdrawal protocol. The user's bank comprises a storage device, a signature verifying program encryption program, decryption program and a signature generating program. The bank's public key PKB are known to all entities.

Referring to FIG. 8, the user signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and signs the user real identification UID, the amount of money to be withdrawn x, the encrypted signed user's pseudonym public key and the amount of digital cash PKI([pPKU, x]pSKU) by the signature generating program using the user's master secret key mSKU and encrypts the information by encryption program using the public key of the bank PKB then sends PKB([PKI([pPKU,x]pSKU),UID,x]mSKU) to the user's bank.

The bank decrypts PKB([PKI([pPKU,x]pSKU),UID,x] mSKU) by decryption program using the user's bank's secret key SKB and verifies the validity of the signature for authentication by the signature verifying program with the master public key of the user mPKU, if it is valid withdraw the amount of money x from the user account and signs the encrypted signed user's pseudonym public key and the amount of digital cash PKI([pPKU,x]pSKU and the withdrawn amount of money x by the signature generating program using the bank's secret key SKB, then encrypts the information by encryption program using the public key of the digital cash issuer PKI then sends PKI([PKI([pPKU,x] pSKU),x]SKB) to the digital cash issuer.

Referring to FIG. 9, the digital cash issuer receives PKI ([PKI([pPKU,x]pSKU),x]SKB), then decrypts the information by decryption program using the digital cash issuer's secret key SKI and verifies the signature of the bank by signature verifying program using the public key of the user's bank PKB if it is valid the digital cash issuer decrypts PKI ([pPKU,x]pSKU) by decryption program using the digital cash issuer's secret key and verifies the signature of the user by signature verifying program using the user's pseudonym public key pPKU, to authenticate the user, if it is valid, the issuer verifies the equality of the two amounts x if they are not equal the real identity of the user will be revealed by sending pPKU to the certificate authority, if they are equals, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then signs the pPKU ([pPKU,x]SKI) by the signature generating program using the digital cash issuer's secret key SKI then encrypts [pPKU ([pPKU,x]SKI)]SKI using encryption program using the public key of the bank PKB then sends PKB([pPKU([pPKU, x]SKI)]SKI) to the user's bank.

Referring to FIG. 10, the user's bank then receives the information PKB([pPKU([pPKU,x]SKI)]SKI) and decrypts it by the decryption program using the user's bank secret key SKB and verifies the digital cash issuer signature by the signature verifying program using the public key of the digital cash issuer PKI if it is valid sends pPKU([pPKU,x]SKI) to the user.

The user receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user.

FIG. 4 shows the diagrammatic representation of the digital cash token withdrawal protocol. Referring to FIG. 11, the user signs the user's pseudonym public key pPKU1 and the amount of digital cash x by the signature generating program using the user's pseudonym secret key pSKU1 then encrypts the signed user's pseudonym public key and the amount of digital cash [pPKU1,x]pSKU1 by encryption program using the digital cash issuer1's public key PKI1, and then sends PKI1([pPKU1,x]pSKU1) to the digital cash issuer1.

The digital cash issuer1 receives PKI1([pPKU1,x] pSKU1), then decrypts PKI1([pPKU1,x]pSKU1) by decryption program using the digital cash issuer1's secret key and verifies the signature of the user by signature verifying program using the user's pseudonym public key pPKU1, to authenticate the user, if it is valid, the digital cash issuer will issues digital cash token which contains the following information: (i) digital cash amount, (ii) random number, (iii) the issuer identity, the digital cash issuer1 generates random number Rd and stores it in the storage device, then signs digital cash amount x, random number Rd and the issuer identity IID1 by signature generating program using the digital cash issuer1's secret key SKI1 and encrypts the information by encryption program using the user's pseudonym public key pPKU1 then decrements the user's virtual account by x then sends pPKU1([x,Rd,IID1]SKI1) to the user.

The user receives pPKU1([x,Rd,IID1]SKI1), then decrypts the information by the decryption program using the user's pseudonym secret key then verities the validity of the digital cash issued signature by the signature verifying program with the digital cash issuer1's public key PKI1. If the signature is valid, the user stores the digital cash token [x,Rd, IID1]SKI1 and the cumulative amount of digital cash is decremental by the amount of the digital cash token x then stores the new cumulative amount of digital cash in the storage device by the user.

FIG. 19 shows the diagrammatic representation of the transferring protocol. Referring to FIG. 21, the user signs the user's pseudonym public key pPKU2, the digital cash token [x,Rd,IID1]SKI1 and the action to be taken Act by signature generating program using the user's secret pseudonym key pSKU2 then encrypts [pPKU2, [x,Rd,IID1]SKI1,Act] pSKU2 by encryption program using the public key of the digital cash issuer2 PKI2 then sends it to the digital cash issuer2 as request for transfer digital cash.

The digital cash issuer2 receives PKI2([pPKU2,[x,Rd, IID1]SKI1,Act]pSKU2), then decrypts the information by decryption program using the digital cash issuer2's secret key and verifies the signature of the user by signature verifying program using the user's pseudonym public key pPKU2, to authenticate the user, if it is valid, the digital cash issuer2 signs the user's pseudonym public key pPKU2 and the digital cash token [x,Rd,IID1]SKI1 by signature generating program using the digital cash issuer2 secret key SKI2 then encrypts [pPKU2,[x,Rd,IID1]SKI1]SKI2 by encryption program using the digital cash issuer1's public key PKI1 then sends PKI1([pPKU2,[x,Rd,IID1]SKI1]SKI2) to the digital cash issuer1.

Referring to FIG. 22, the digital cash issuer1 receives PKI1 ([pPKU2,[x,Rd,IID1]SKI1]SKI2) and decrypts it by decryption program using the digital cash issuer1 secret key SKI1 and verifies the digital cash issuer2 signature by signature verifying program using the digital cash issuer2's public key PKI2 if it is valid, check the Rd if the random number Rd does not exist, this mean there is double spending and the real identity will be revealed by sending the user's pseudonym public key pPKU2 to the certificate authority, if it is not, the digital cash issued signs the pseudonym public key pPKU2 by signature generating program using the digital cash issuer1's secret key SKI1 then encrypts [pPKU2]SKI1 by encryption program using the digital cash issuer2's public key PKI2 and sends it to the digital cash issuer2.

Referring to FIG. 23, the digital cash issuer2 receives PKI2 ([pPKU2]SKI1) and decrypts it by decryption program using the digital cash issuer2 secret key SKI2 and verifies the digital cash issuer 1 signature by signature verifying program using the digital cash issuer1's public key PKI1 if it is valid, the digital cash issuer2 increments the user's virtual account by the amount x of digital cash, then signs the pseudonym public key pPKU2, digital cash amount x, by the signature generating program using the digital cash issuer2's secret key SKI2 then encrypts [pPKU2,x]SKI2 by encryption program using the user's pseudonym public key pPKU2 then sends pPKU2 ([pPKU2,x]SKI2) to the user.

The user receives pPKU2([pPKU2,x]SKI2), then decrypts the information by the decryption program using the user's pseudonym secret key then verifies the validity of the digital cash issuer2 signature by the signature verifying program with the digital cash issuer2's public key PKI2. If the signature is valid, the cumulative amount of digital cash is incremented by the amount of digital cash x then stores the new cumulative amount of digital cash in the storage device by the user.

FIG. 20 shows the diagrammatic representation of the dividing digital cash token protocol. Referring to FIG. 24, the user signs the user's pseudonym public key pPKU1, the digital cash token [x,Rd,IID1]SKI1 and the action to be taken Act by signature generating program using the user's secret pseudonym key pSKU1 then encrypts [pPKU1, [x,Rd,IID1] SKI1,Act]pSKU1 by encryption program using the public key of the digital cash issued PKI1 then sends it to the digital cash issuer1 as request for transfer digital cash.

The digital cash issuer1 receives PKI1([pPKU1,[x,Rd, IID1]SKI1,Act]pSKU1), then decrypts the information by decryption program using the digital cash issuer1's secret key and verifies the signature of the user by signature verifying program using the user's pseudonym public key pPKU1, to authenticate the user, if it is valid, the digital cash issued check the Rd if the random number Rd does not exist, this mean there is double spending and the real identity will be revealed by sending the user's pseudonym public key pPKU1 to the certificate authority, if it is not, the digital cash issuer1 deletes the random number Rd and will issues smaller digital cash tokens which contains the following information: (i) digital cash amount, (ii) random number, (iii) the issuer identity, the digital cash issuer1 generates random numbers Rd1, Rd2, . . . Rdn and stores them in the storage device, then signs digital cash amounts x1, x2, . . . , xn, random numbers Rd1, Rd2, . . . Rdn and the issuer identity IID1 by signature generating program using the digital cash issuer1's secret key SKI1 and encrypts the information by encryption program using the user's pseudonym public key pPKU1 then sends pPKU1([x1,Rd1,IID1]SKI1,[x2,Rd2,IID1]SKI1, . . . , [xn, Rdn,IID1]SKI1) to the user.

The user receives pPKU1([x1,Rd1,IID1]SKI1, [x2,Rd2, IID1]SKI1,..., [xn,Rdn,IID1]SKI1), then decrypts the information by the decryption program using the user's pseudonym secret key then verifies the validity of the digital cash issued signature by the signature verifying program with the digital cash issuer1's public key PKI1. If the signature is valid, the user stores the digital cash tokens [x1,Rd1,IID1] SKI1, [x2,Rd2,IID1]SKI1, . . . , [xn,Rdn,IID1]SKI1) in the storage device.

FIG. 15 shows the diagrammatic representation of the payment protocol. The shop comprises a storage device, a signature verifying program encryption program, decryption program, a signature generating program, a random number generating program and a time generating program the shop public key PKS is known to all entities.

Referring to FIG. 16, the user encrypts the digital cash token [x,Rd,IID1]SKI1 and the digital cash issuer license [pPKU1]SKI1 by encryption program using the public key of the shop PKS then sends it to the shop as request for payment.

The user can send a payment request using another certified pseudonym public key, because the pseudonym is not associated with digital cash token, this gives the flexibility to change the pseudonym at the payment time.

The shop decrypts the encrypted digital cash token and the digital cash issuer1 license PKS([x,Rd,IID1]SKI1, [pPKU1]SKI1) by decryption program using the shop's secret key SKS then verify the signature of the issuer by the signature verifying program with the digital cash issuer1 public key PKI1 if the signatures are valid the shop stores the user's digital cash issuer1 license, the digital cash token and generates a random number Rs by random number generating program and generates the time Ts by the time generating program then encrypt Rs,Ts, the shop identification. SID and the price of the good y by encryption program using the user's pseudonym public key pPKU1 and sends pPKU1(Rs,Ts,SID, y) to the user.

The user receives pPKU 1 (Rs,Ts,SID,y) and decrypts it by decryption program using the user's pseudonym secret key pSKU1 and signs the random number Rs, the time Ts, the shop identification SID and the price of the good y by signature generating program using the user's pseudonym secret key pSKU1 and encrypts the information by encryption program using the public key of the shop PKS then sends PKS ([Rs,Ts,SID,y]pSKU1) to the shop.

The shop receives the information PKS([Rs,Ts,SID,u] pSKU1) and decrypts it by decryption program using the shop's secret key SKS and verifies the signature by signature verifying program using the user's pseudonym public key pPKU1 if it is valid the shop stores the challenge and the shop regards the payment as valid.

Referring to FIG. 17, after period of time the shop encrypts the information that contains the challenge that was signed by the user [Rs,Ts,SID,y]pSKU1, the digital cash token [x,Rd, IID1]SKI1, and the user's digital cash issuer1 license [pPKU1]SKI1, by encryption program using the public key of the digital cash issuer1 PKT1 and sends the information to the digital cash issuer1.

The digital cash issuer1 decrypts PKI([Rs,Ts,SID,y] pSKU1, [x,Rd,IID1]SKI1, [pPKU1]SKI1) by decryption program using the digital cash issuer1's secret key SKI1 and verifies the signature by the signature verifying program using the digital cash issuer1's public key PKI1 and the user's pseudonym public key pPKU1, if the signatures are valid the issuer1 check the Rd if the random number Rd does not exist, this mean there is double spending and the real identity will be revealed by sending the user's pseudonym public key pPKU1 to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU1 in the storage device.

Referring to FIG. 18, the digital cash issuer1 signs the shop identification SID, and the amount x to be deposited for the shop by the signature generating program with the digital cash issuer1's secret key SKI1 and encrypts the information by encryption program using the public key of the shop's bank PKB then sends PKB([SID,x]SKI1) to the shop's bank.

The shop's bank receives PKB([SID,x]SKI1) and decrypts the information by decryption program using the secret key SKB and verifies the signature by signature verifying program with the public key of the issuer1 PKI1 if the signature is valid the shop's bank will add x amount of money in the shop account.

Seventh Embodiment

In the previous embodiments, the processes are done in fixed station, so the user has to go to the fixed station to buy or to get digital cash. For more convenience and accessibility for the user, the user uses mobile-based device to buy and to get digital cash. The mobile-based device has the minimum requirement to protect the security and privacy because of the limit on storage and computational power.

FIG. 2 shows the diagrammatic representation of the registration protocol.

The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU]SKC by encryption program using the user's master public key mPKU then sends mPKU([pPKU]SKC) to the user.

The user receives the encrypted license mPKU([pPKU]SKC) then decrypts it by decryption program using the user's master secret key in mSKU then verifies the validity of the license [pPKU]SKC by the signature verifying program using the public key of the certificate authority PKC, if it is valid stores the license in the storage device.

Referring to FIG. 7, the user encrypts the license [pPKU]SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU]SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

Figure 29:
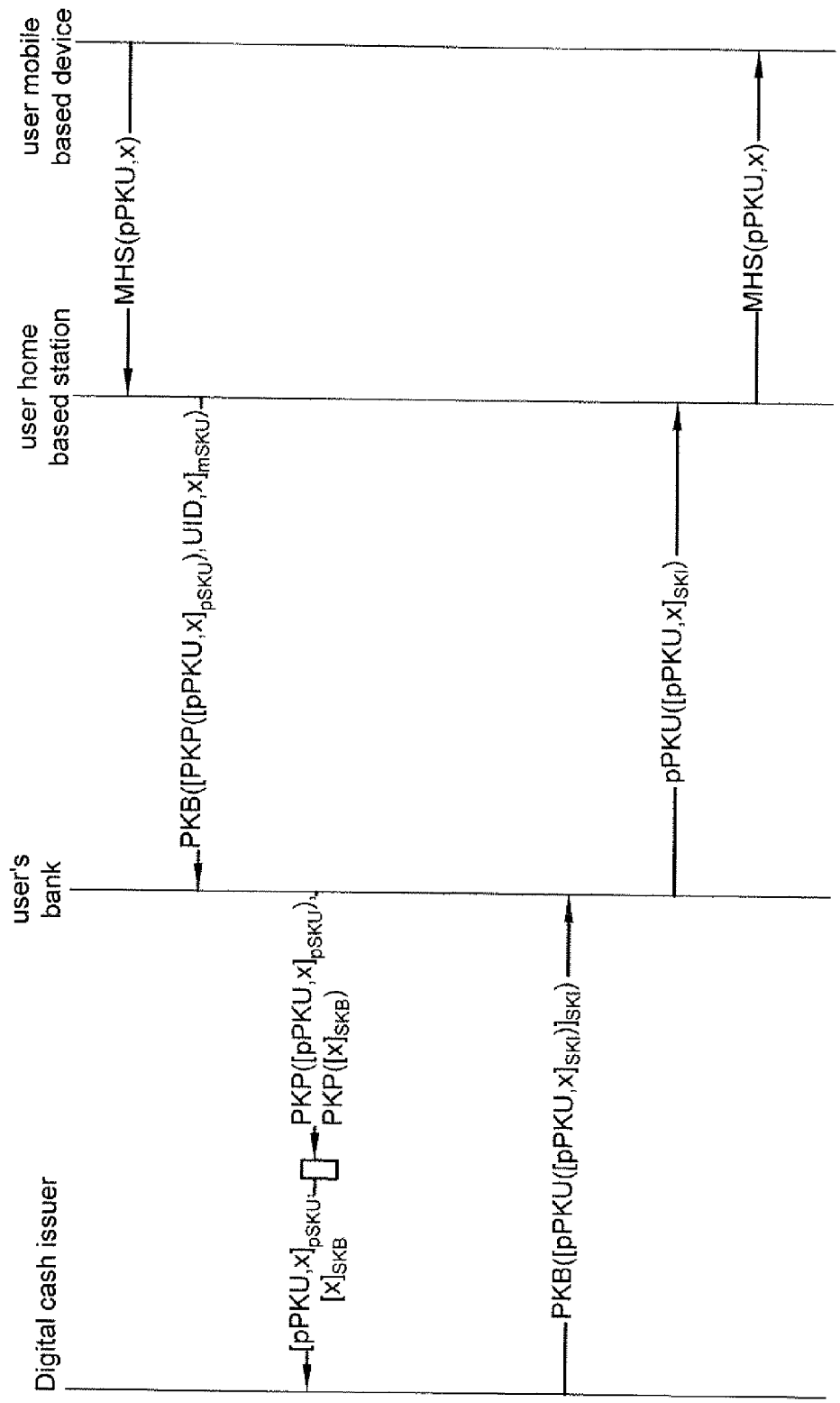
FIG. 29 is an exemplary withdrawal protocol according to the seventh, eighth, and ninth embodiment.

FIG. 29 shows the diagrammatic representation of the withdrawal protocol.

The user's bank comprises a storage device, a signature verifying program encryption program, decryption program and a signature generating program. The bank's public key PKB are known to all entities.

Figure 30:
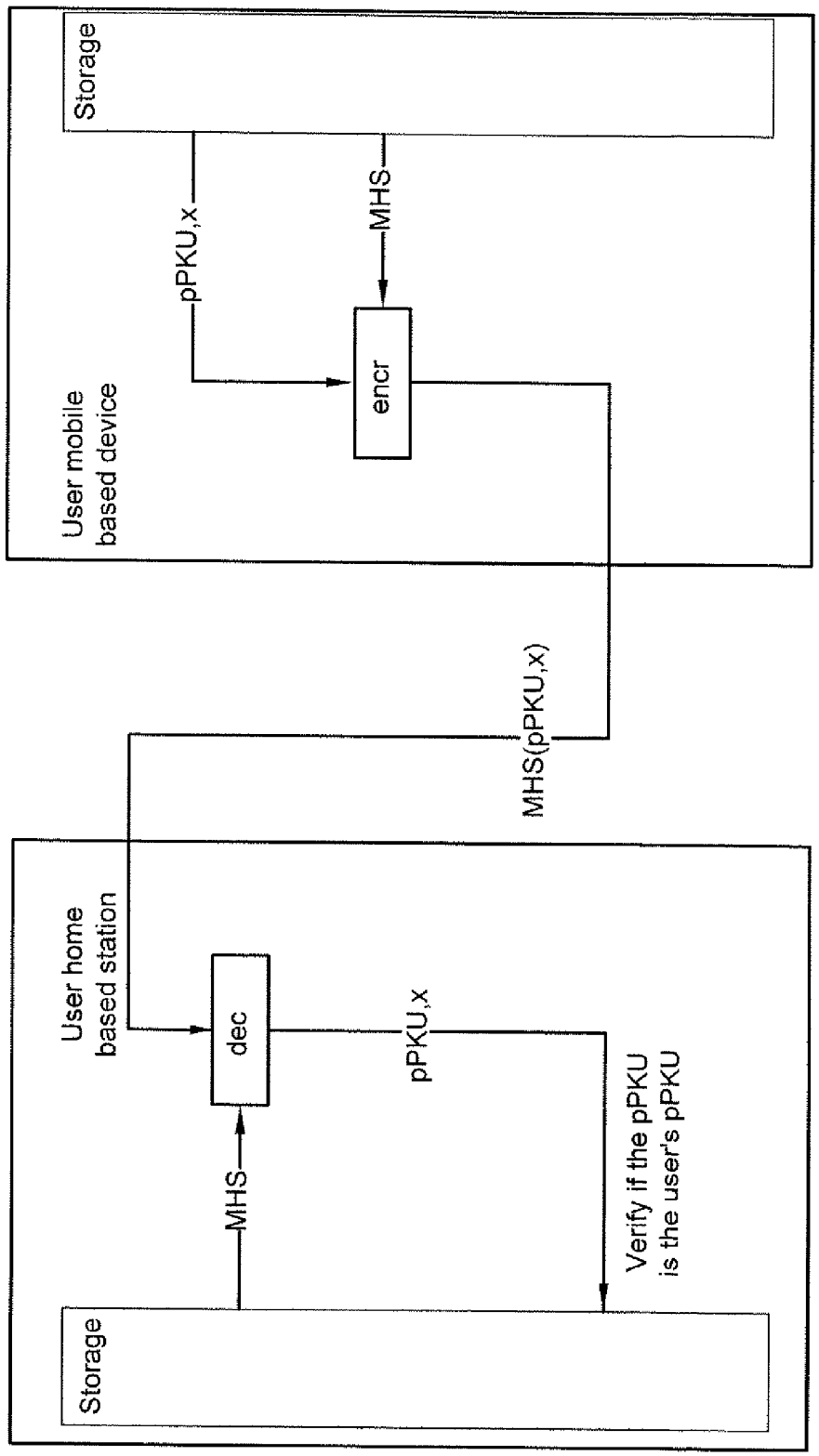
FIG. 30 is an exemplary withdrawal process part 1 according to the seventh, eighth, and ninth embodiment.

Referring to FIG. 30, the user's mobile device encrypts the user's pseudonym public key pPKU and the amount of digital cash x by encryption program using the mobile home-based shared secret key MHS and sends the information MHS(pPKU,x) to the user's home-based station.

Figure 31:
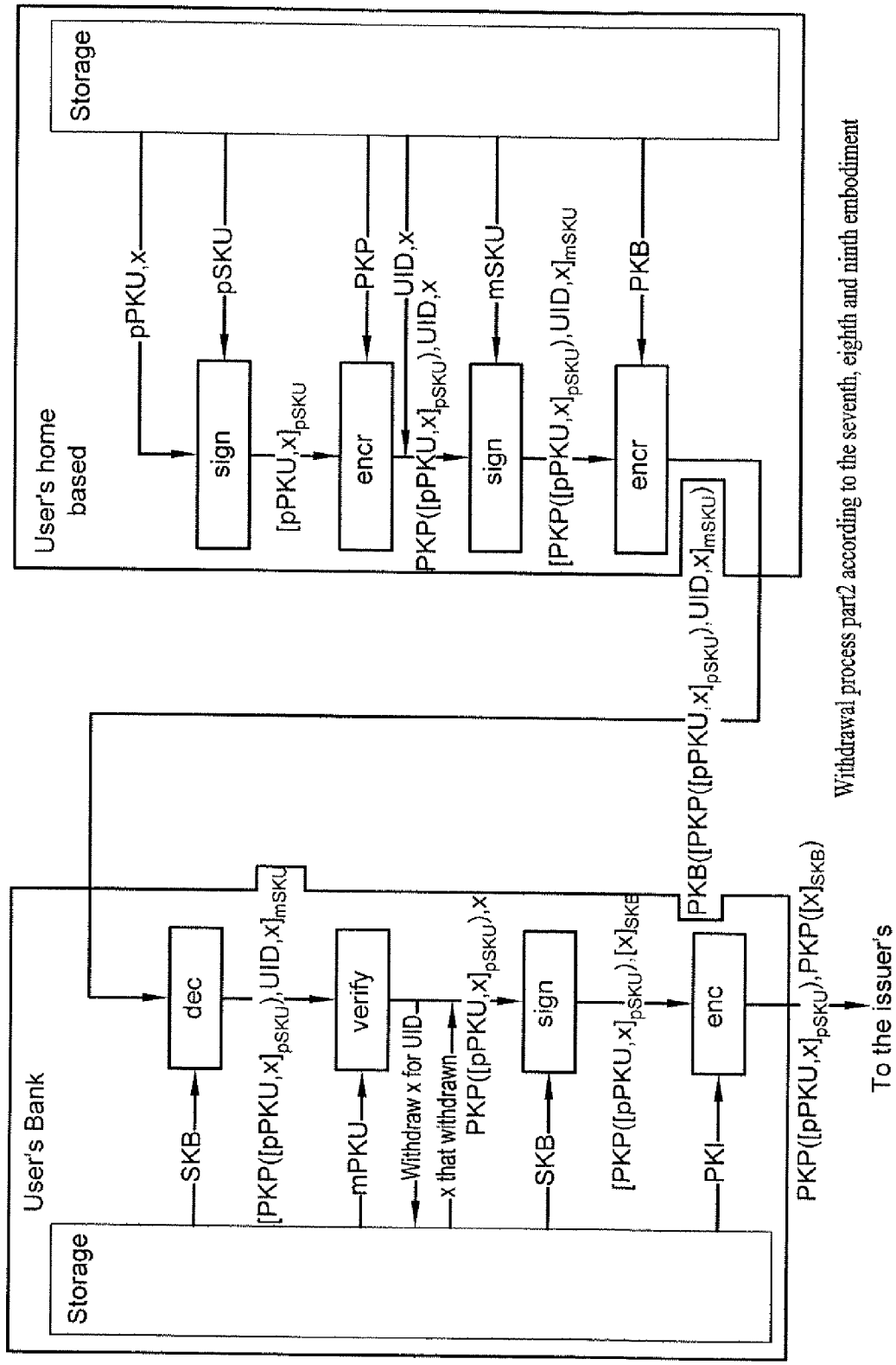
FIG. 31 is an exemplary withdrawal process part 2 according to the seventh, eighth, and ninth embodiment.

The user's home-based station receives the encrypted user's pseudonym public key and the amount of digital cash MHS(pPKU,x) and decrypts the information by decryption program using the mobile —home-based shared secret key MHS and matches the user's pseudonym public key if they are equal the user's mobile device is authenticated by the user's home-based station then, as shown in FIG. 31, the user's home-based station signs the user's pseudonym public key pPKU and the amount of digital cash x by the signature generating program using the user's pseudonym secret key pSKU and encrypts the signed user's pseudonym public key and the amount of digital cash [pPKU,x]pSKU by encryption program using the public key of a cryptographic coprocessor PKP and signs the user real identification UM, the amount of money to be withdrawn x, and PKP([pPKU,x]pSKU) by the signature generating program using the user's master secret key mSKU and encrypts the information by encryption program using the public key of the user's bank PKB then sends PKB([PKP([pPKU,x]pSKU),UID,x]mSKU) to the user's bank.

The user's bank decrypts PKB([PKP([pPKU,x]pSKU),UID,x]mSKU) by decryption program using the bank's secret key and verifies the validity of the signature for authentication by the signature verifying program with the master public key of the user mPKU, if it is valid withdraw the amount of money x from the user account and signs the amount x that is withdrawn from the user account by the signature generating program using the user's bank's secret key SKB and encrypts [x]SKB by encryption program using the public key of the cryptographic coprocessor PKP, then sends information PKP([pPKU,x]pSKU) and PKP([x]SKB) to the digital cash issuer.

Figure 32:
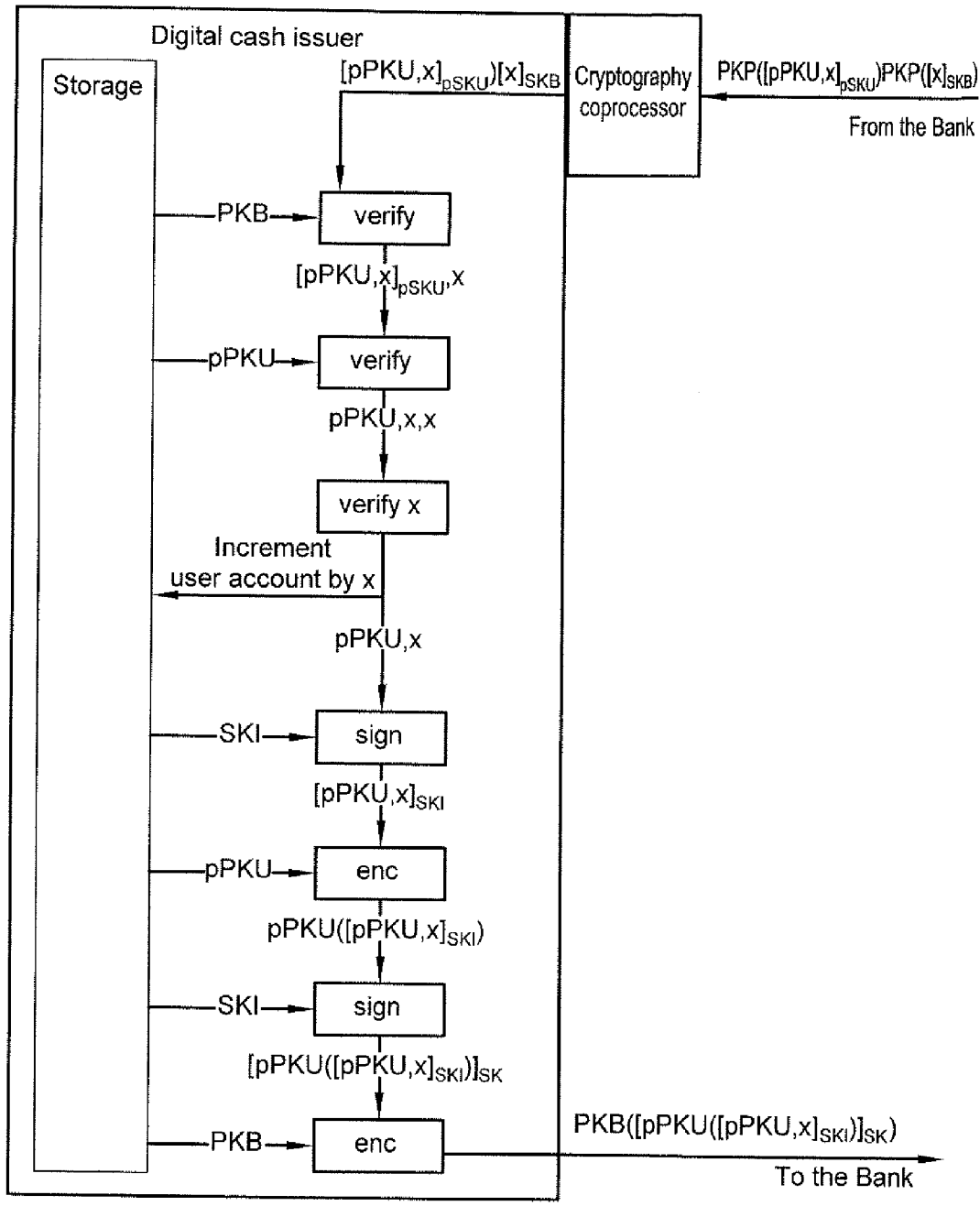
FIG. 32 is an exemplary withdrawal process part 3 according to the seventh, eighth, and ninth embodiment.

Referring to FIG. 32, the digital cash issuer receives PKP([pPKU,x]pSKU) and PKP([x]SKB), then decrypts the information using the secret key of the cryptographic coprocessor, to obtains the signed user's pseudonym public key and the amount of digital cash [pPKU,x]pSKU and the signed amount of withdrawn money from the user account [x]SKB then verifies the signature of the bank by signature verifying program using the public key of the bank PKI3 if it is valid the digital cash issuer verifies the user's signature [pPKU,x]pSKU by signature verifying program using the user's pseudonym public key pPKU to authenticate the user, if it is valid, the issuer verifies the equality of the two amounts x if they are not equal the real identity of the user will be revealed by sending pPKU to the certificate authority, if they are equals, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then signs the pPKU([pPKU,x]SKI) by the signature generating program using the digital cash issuer's secret key SKI then encrypts [pPKU([pPKU,x]SKI)]SKI using encryption program using the public key of the bank PKB then sends PKB([pPKU([pPKU,x]SKI)]SKI) to the user's bank.

Figure 33:
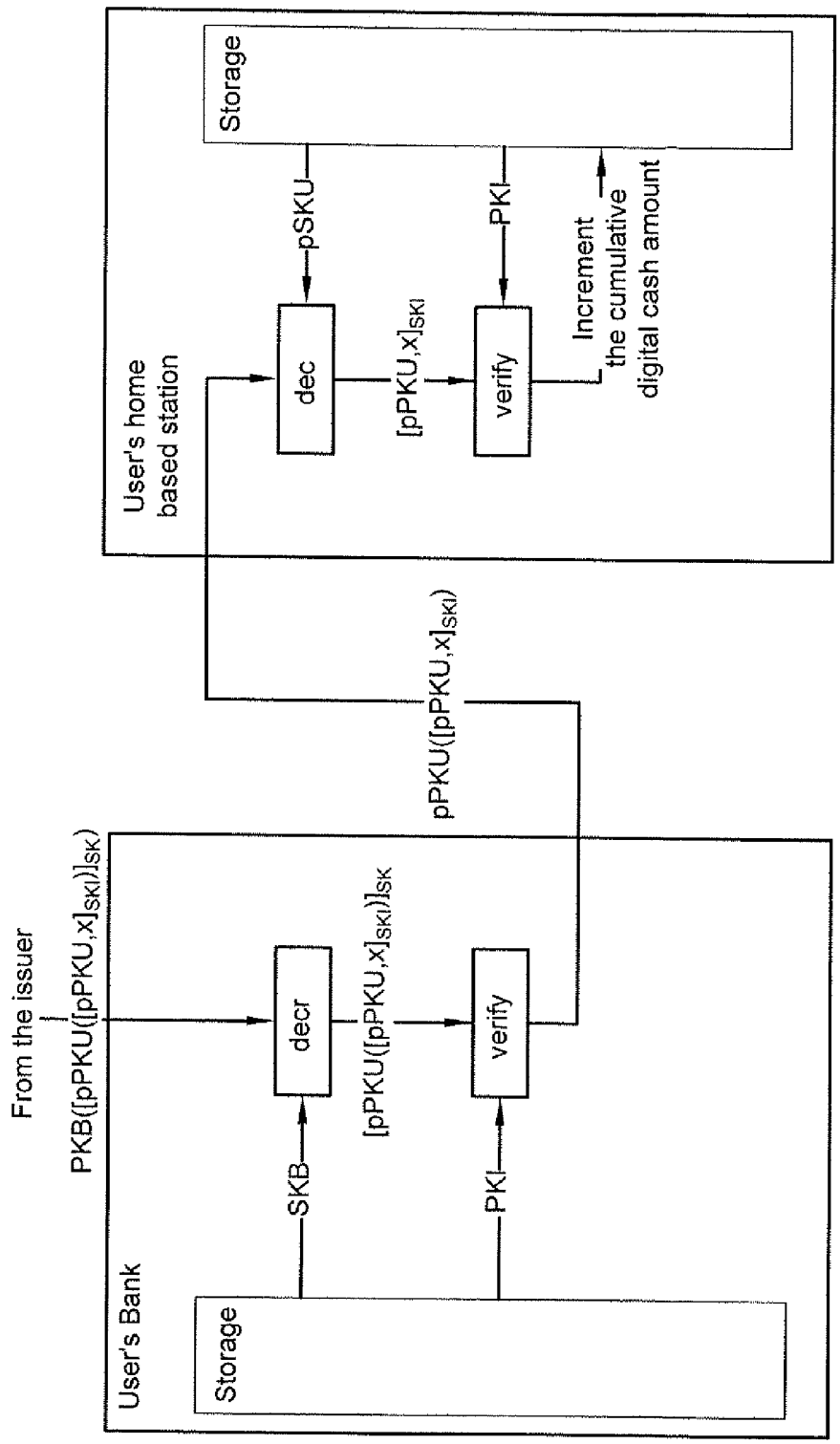
FIG. 33 is an exemplary withdrawal process part 4 according to the seventh, eighth, and ninth embodiment.

Referring to FIG. 33, the user's bank then receives the information PKB([pPKU([pPKU,x]SKI)]SKI) and decrypts it by the decryption program using the user's bank secret key SKB and verifies the digital cash issuer signature by the signature verifying program using the public key of the digital cash issuer PKI if it is valid sends pPKU([pPKU,x]SKI) to the user.

The user's home-based station receives pPKU([pPKU,x]SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user's home-based station.

Figure 34:
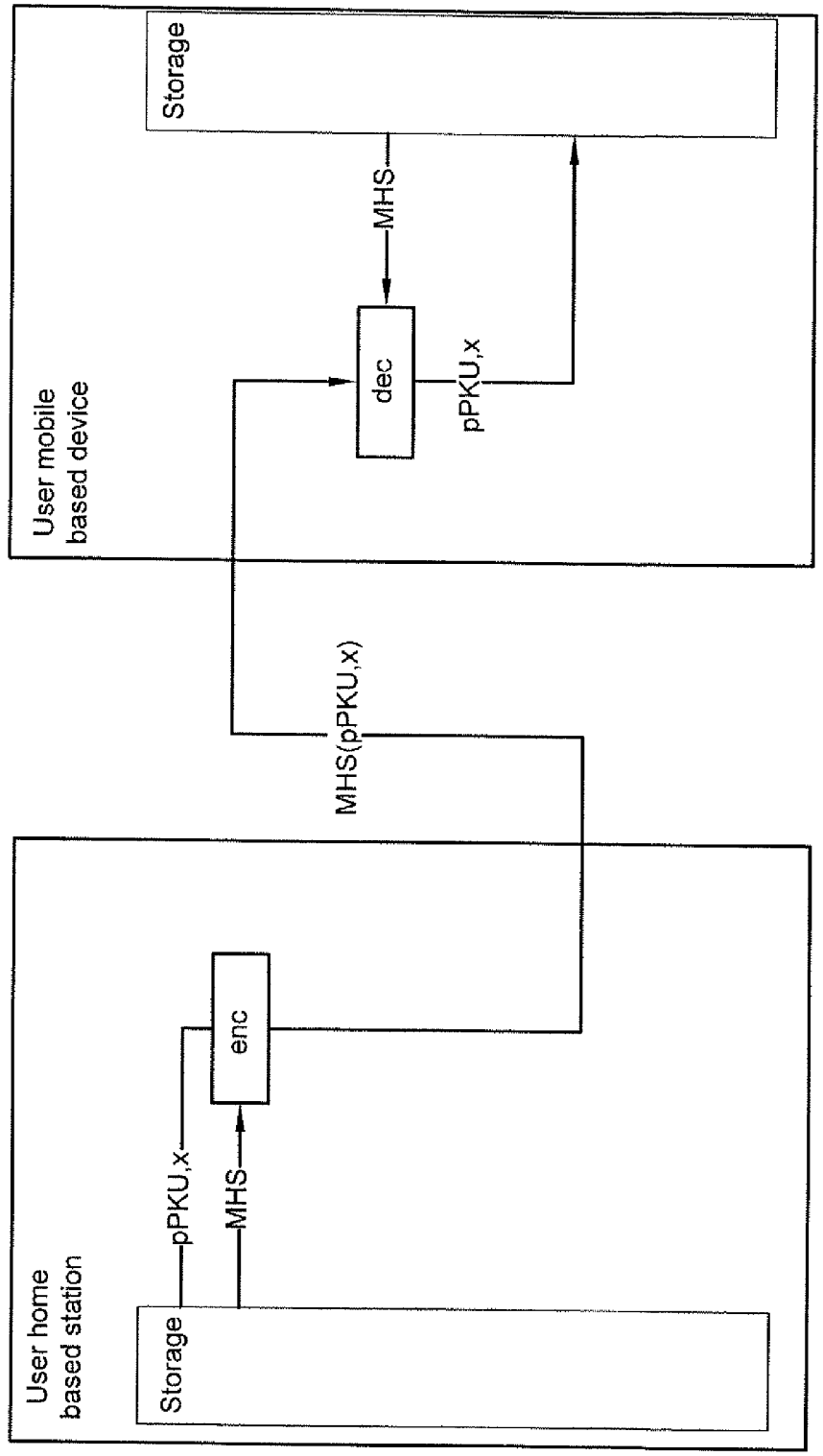
FIG. 34 is an exemplary withdrawal process part 5 according to the seventh, eighth, and ninth embodiment.

Referring to FIG. 34, the user's home-based machine encrypts the value of the new cumulative amount of digital cash x and the user's pseudonym public key pPKU by encryption program using the mobile/home-based shared secret key MHS and sends MHS(pPKU,x) to the user's mobile-based device.

The user's mobile-based device receives the encrypted value of the new cumulative amount of digital cash and the user's pseudonym public key MHS(pPKU,x) decrypts the information by decryption program using the mobile/home-based shared secret key MHS and match the user's pseudonym public key to authenticate the user's home-based station if the user's pseudonym public key matches the user stores the new cumulative amount of digital cash in the storage device of the user's mobile-based device.

Figure 35:
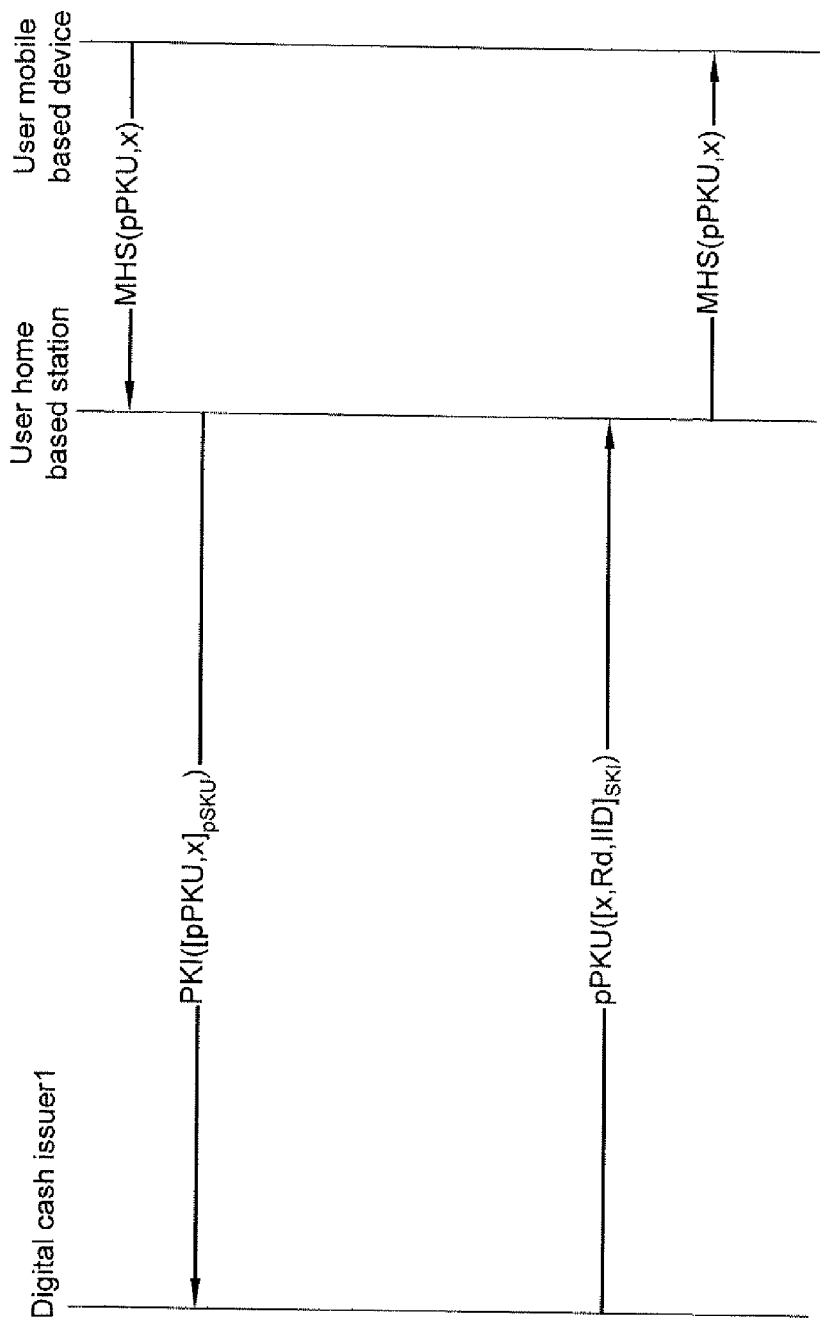
FIG. 35 is an exemplary withdrawal digital cash token protocol according to the seventh embodiment.
Figure 36:
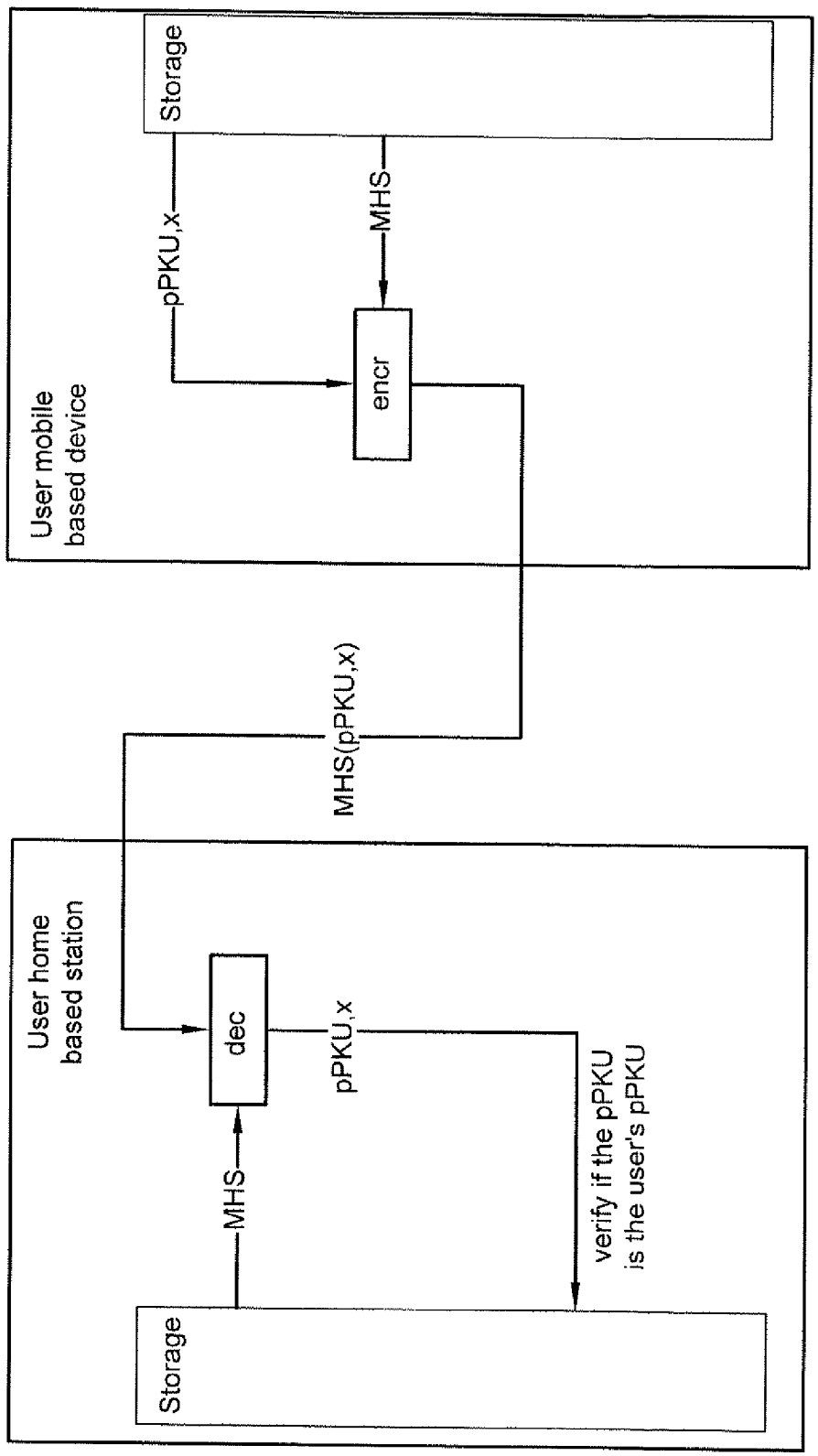
FIG. 36 is an exemplary withdrawal digital cash token process part 1 according to the seventh embodiment.

FIG. 35 shows the diagrammatic representation of the digital cash token withdrawal protocol. Referring to FIG. 36, the user's mobile device encrypts the user's pseudonym public key pPKU and the amount of digital cash x by encryption program using the mobile home-based shared secret key MHS and sends the information MHS(pPKU,x) to the user's home-based station.

Figure 37:
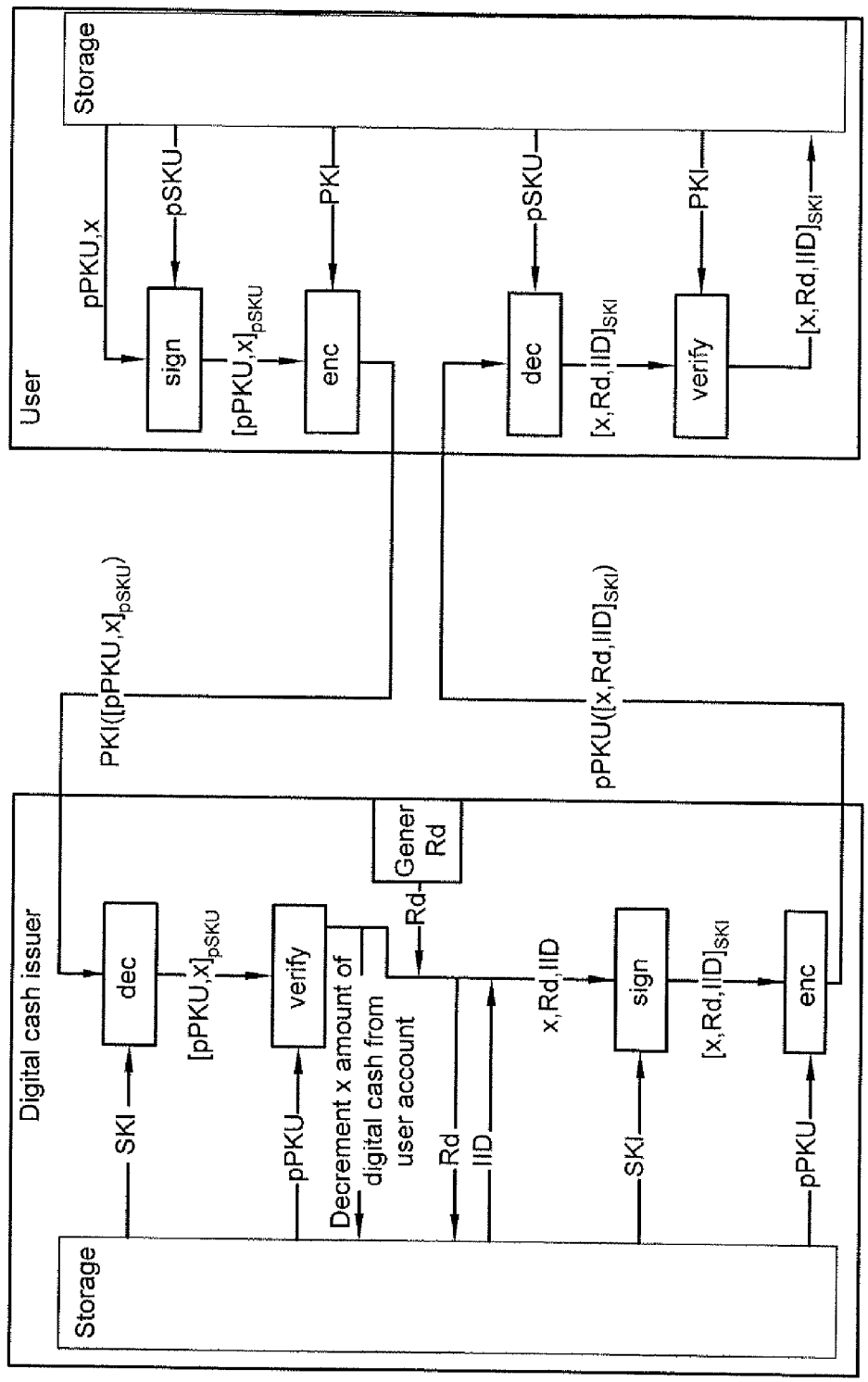
FIG. 37 is an exemplary withdrawal digital cash token process part 2 according to the seventh embodiment.

The user's home-based station receives the encrypted user's pseudonym public key and the amount of digital cash MHS(pPKU,x) and decrypts the information by decryption program using the mobile —home-based shared secret key MMS and matches the user's pseudonym public key if they are equal the user's mobile device is authenticated by the user's home-based then, as shown in FIG. 37, the user's home-based station signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU then decrements the user's virtual account by x then sends pPKU([x, Rd,IID]SKI) to the user's home-based station.

The user's home-based station receives pPKU([x,Rd,IID]SKI), then decrypts the information by the decryption program using the user's pseudonym secret key then verifies the validity of the digital cash issuer signature by the signature verifying program with the digital cash issuer's public key PKI. If the signature is valid, the user's home-based station stores the digital cash token [x,Rd,IID]SKI and the cumulative amount of digital cash is decremented by the amount of the digital cash token x then stores the new cumulative amount of digital cash in the storage device by the user.

Figure 38:
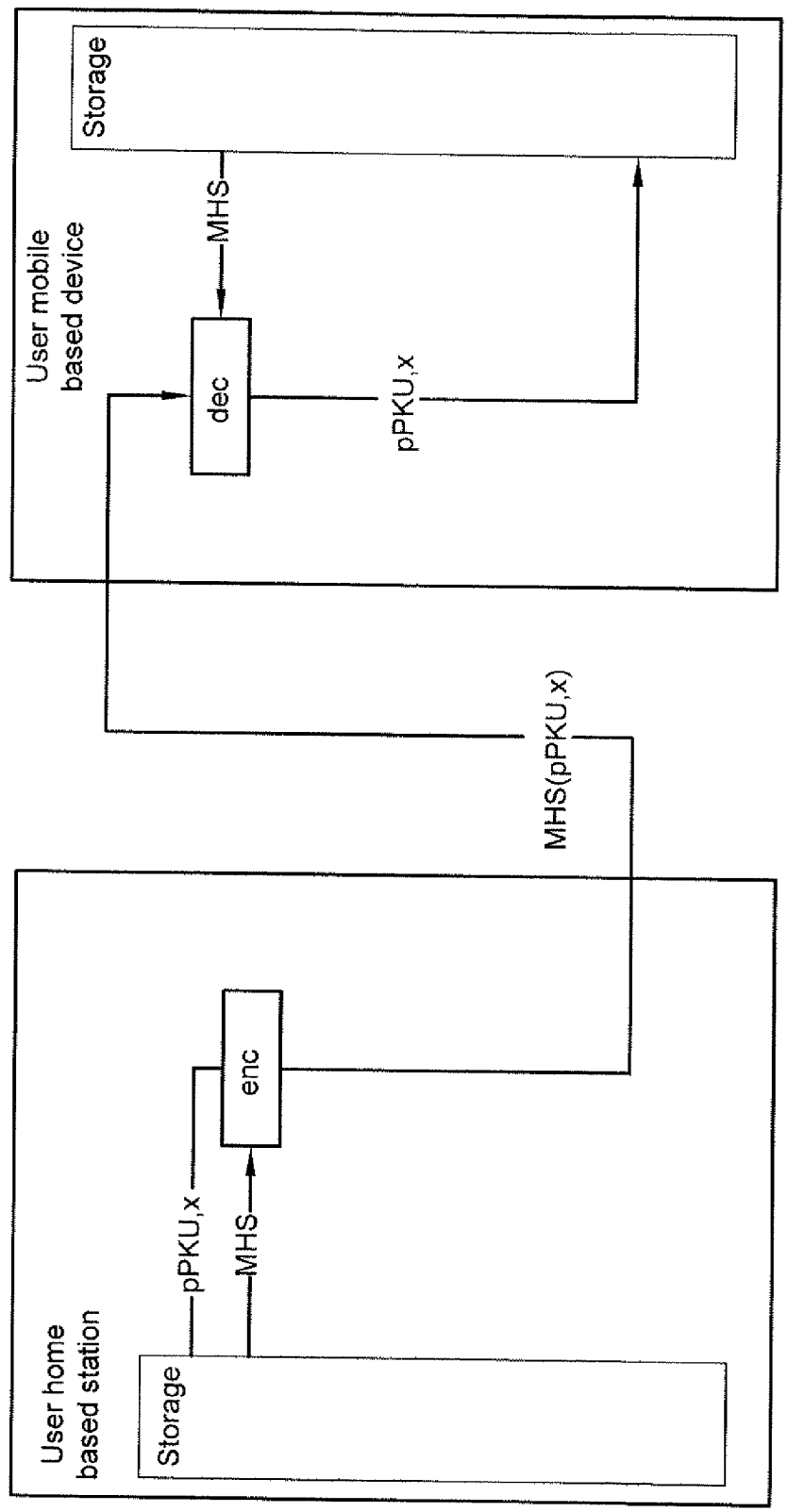
FIG. 38 is an exemplary withdrawal digital cash token process part 3 according to the seventh embodiment.

Referring to FIG. 38, the user's home-based machine encrypts the value of the digital cash token x, the new cumulative amount of digital cash z and the user's pseudonym public key pPKU by encryption program using the mobile/home-based shared secret key MHS and sends MHS(pPKU, z,x) to the user's mobile-based device.

The user's mobile-based device receives the encrypted value of the digital cash token, the new cumulative amount of digital cash z and the user's pseudonym public key MHS (pPKU,z,x) decrypts the information by decryption program using the mobile/home-based shared secret key MHS and match the user's pseudonym public key to authenticate the user's home-based station is the user's pseudonym public key matches the user stores the value of digital cash token and the new cumulative amount of digital cash in the storage device of the user's mobile-based device. The user can easily transfer the issued digital cash token to another user who has certified pseudonym public key.

Figure 39:
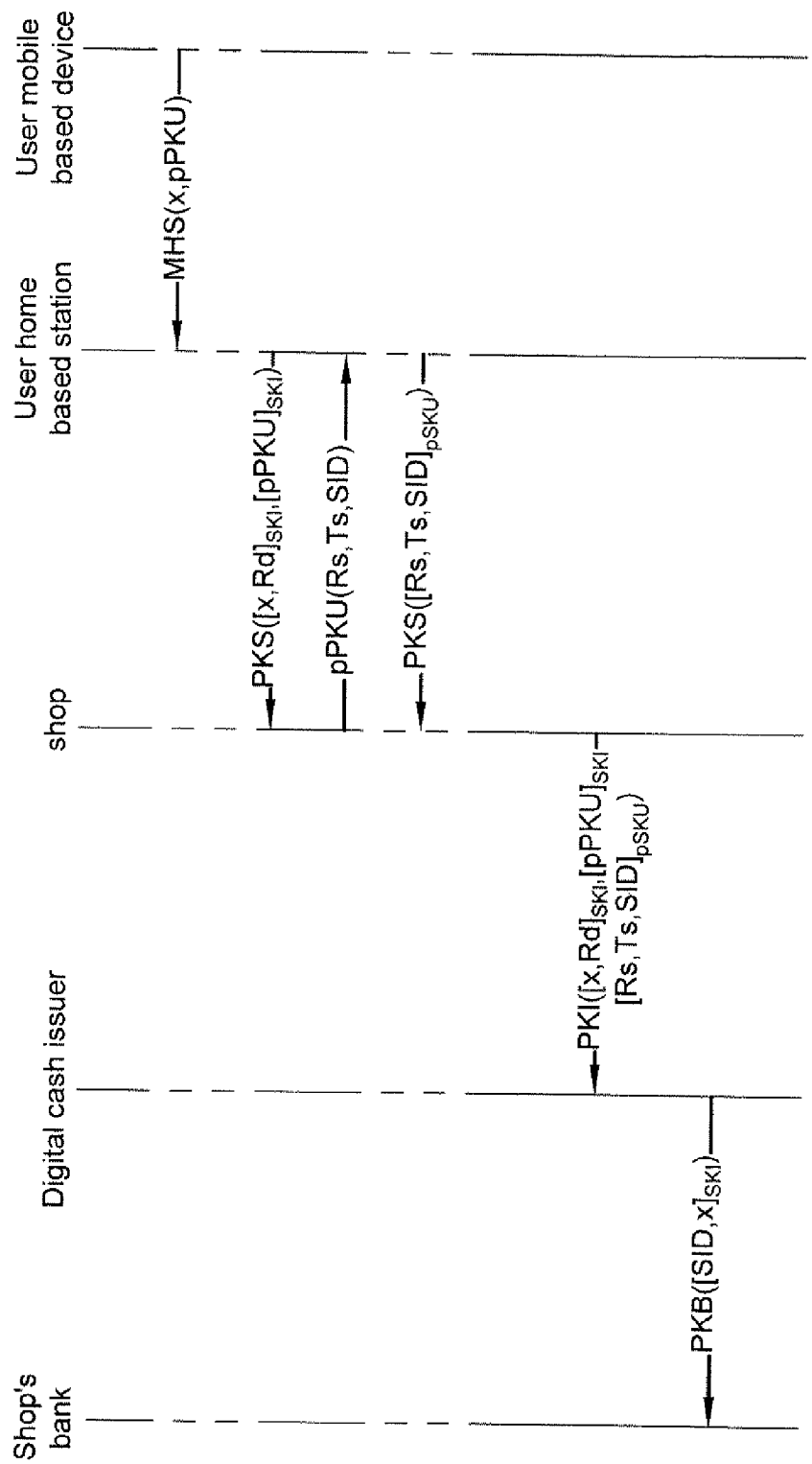
FIG. 39 is an exemplary payment protocol according to the seventh embodiment.

FIG. 39 shows the diagrammatic representation of the payment protocol.

The shop comprises a storage device, a signature verifying program encryption program, decryption program, a signature generating program, a random number generating program and a tune generating program the shop public key PKS is known to all entities.

Figure 40:
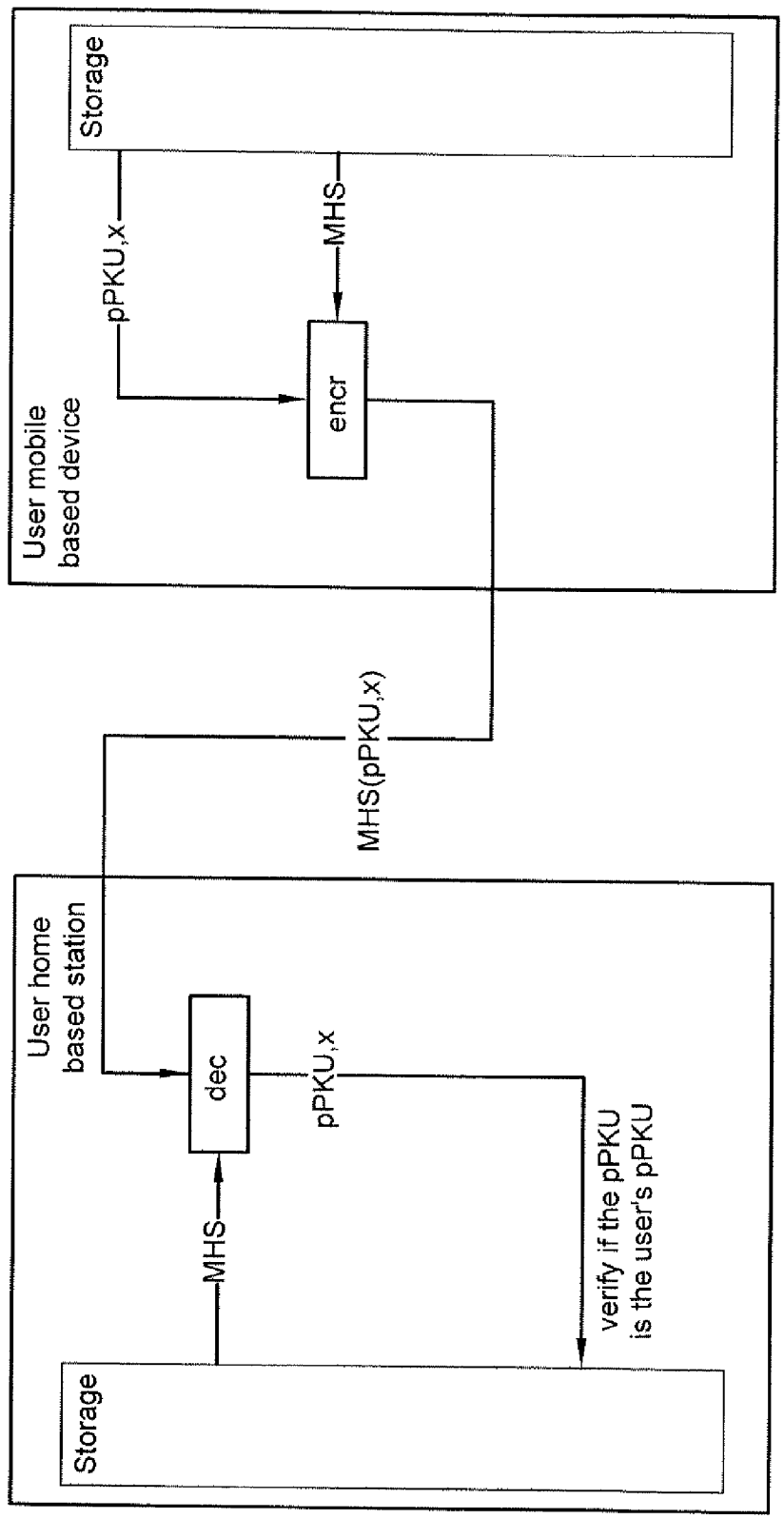
FIG. 40 is an exemplary payment process part 1 according to the seventh embodiment.

Referring to FIG. 40, the user's mobile-based device chooses the value of the digital cash token x and encrypts it also encrypts the user's pseudonym public key pPKU by encryption program using the mobile —home-based shared secret key MHS and sends MEIS(pPKU,x) to the user's home-based station.

The user's home-based station receives MHS(pPKU,x) and decrypts the information by decryption program using the mobile/home-based shared secret key MHS, and match the user's pseudonym public key to authenticate the user's mobile-based device, if the user's pseudonym public key is matches, the user's home-based station find the digital cash token that equivalent to the value that is sent by the user's mobile device.

Figure 41:
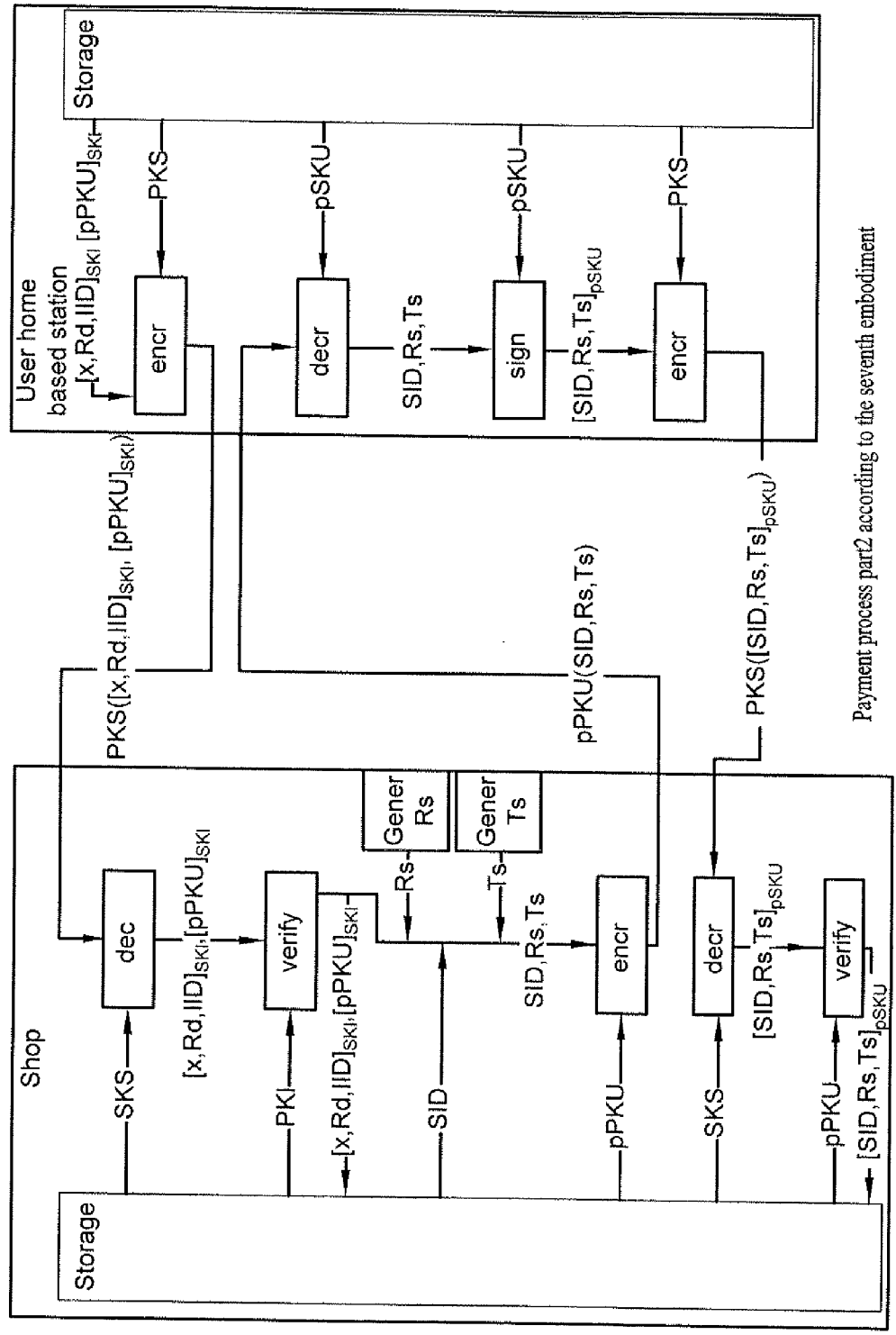
FIG. 41 is an exemplary payment process part 2 according to the seventh embodiment.

Referring to FIG. 41, the user's home-based station encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key because the pseudonym is not associated with digital cash token. This gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypts Rs,Ts, and the shop identification SID by encryption program using the user's pseudonym public key pPKU and sends pPKU(Rs,Ts,SID) to the user's home-based station.

The user's home-based station receives pPKU(Rs,Ts,SID) and decrypts it by decryption program using the user's pseudonym secret key pSKU and signs the random number Rs, the time is, and the shop identification SID by signature generating program using the user's pseudonym secret key pSKU and encrypts the information by encryption program using the public key of the shop PKS then sends PKS([Rs,Ts,SID]pSKU) to the shop.

The shop receives the information PKS([Rs,Ts,SID]pSKU) and decrypts it by decryption program using the shop's secret key SKS and verifies the signature by signature verifying program using the user's pseudonym public key pPKU if it is valid the shop stores the challenge and the shop regards the payment as valid.

Figure 42:
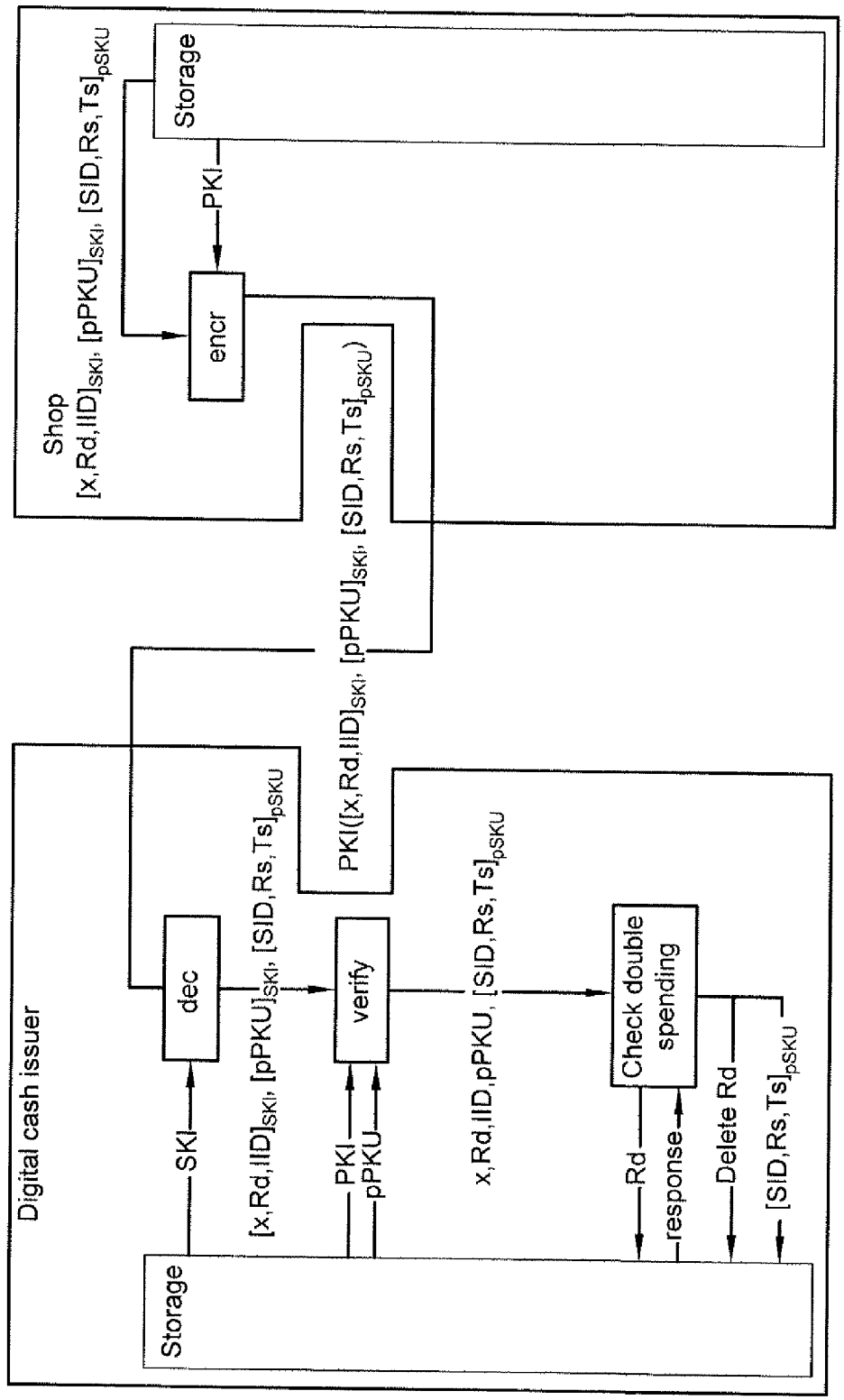
FIG. 42 is an exemplary payment process part 3 according to the seventh embodiment.

Referring to FIG. 42, after period of time the shop encrypts the information that contains the challenge that was signed by the user [Rs,Ts,SID]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID]pSKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by x then the digital cash issuer stores the challenge [Rs,Ts,SID]pSKU in the storage device.

Figure 43:
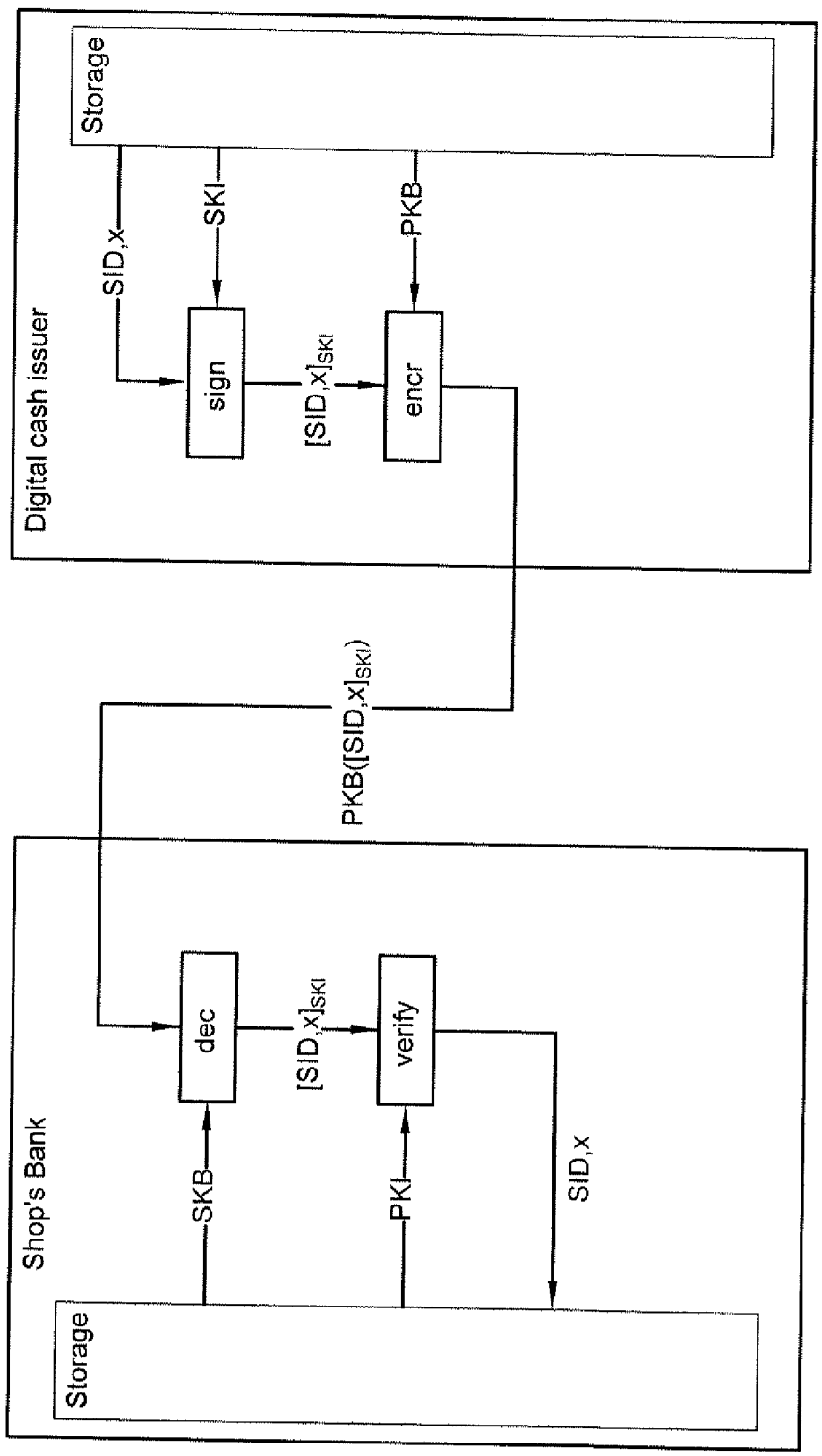
FIG. 43 is an exemplary payment process part 4 according to the seventh embodiment.

Referring to FIG. 43, the digital cash issuer signs the shop identification SID, and the amount x to be deposited for the shop by the signature generating program with the digital cash issuer's secret key SKI and encrypts the information by encryption program using the public key of the shop's bank PKB then sends PKB([SID,x]SKI) to the shop's bank.

The shop's bank receives PKB([SID,x]SKI) and decrypts the information by decryption program using the secret key SKB and verifies the signature by signature verifying program with the public key of the issuer PKI if the signature is valid the shop's bank will add x amount of money in the shop account.

Eighth Embodiment

In the eighth embodiment, a mobile-based device is used by the user and the digital cash issuer, and the digital cash token can be more than the price of the goods.

The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer comprises a storage device, an encryption program, a decryption program, a signature generating program, a signature verifying program, and a random number generating program. The public key PKI is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU]mSKU by encryption program using the public key of the certificate authority and sends PKC([UID,pPKU]mSKU) to the certificate authority as a request for certified pseudonym public key (a request for the issuance of a license).

The certificate authority receives the request (PKC([UID, pPKU]mSKU)) then decrypts it by decryption program using the secret key of the certificate authority SKC and verifies the validity of the user signature by the signature verifying program using the user's master public key mPKU. If it is valid the certificate authority generates a signature (license) [pPKU]SKC for the user's pseudonym public key by the signature generating program using the certificate authority's secret key SKC, and stores the user's pseudonym public key in the storage device in correspondence with the user's master public key mPKU and the user's real identification MD, the certificate authority encrypts the license [pPK]SKC by encryption program using the user's master public key mPKU then sends mPKU([pPKU]SKC) to the user.

The user receives the encrypted license mPKU([pPKU]SKC) then decrypts it by decryption program using the user's master secret key mSKU then verifies the validity of the license [pPKU]SKC by the signature verifying program using the public key of the certificate authority PKC, if it is valid stores the license in the storage device.

Referring to FIG. 7, the user encrypts the license [pPKU]SKC, pseudonym public key pPKU by the encryption program using the public key of the digital cash issuer PKI then sends PKI([pPKU]SKC,pPKU) to the digital cash issuer as a request for registration in the digital cash issuer and for the digital cash issuer license.

The digital cash issuer receives PKI([pPKU]SKC,pPKU) and decrypts this information by decryption program using the secret key of the digital cash issuer SKI. The digital cash issuer searches for pPKU in the storage, this will prevents the uses of other users' pseudonym public key, if this user's pseudonym public key pPKU is not already registered the digital cash issuer verifies the validity of the license [pPKU]SKC by the signature verifying program using the certificate authority's public key PKC, if it is valid the digital cash issuer sets an empty space storage to the user and stores the user's pseudonym public key pPKU in the storage device. The digital cash issuer signs the user's pseudonym public key pPKU by the signature generating program using the secret key of the digital cash issuer SKI and encrypts the information by encryption program using the user's pseudonym public key pPKU then sends pPKU([pPKU]SKI) as a license to the user.

The user receives pPKU([pPKU]SKI), and decrypts this information by the decryption program using the user's pseudonym secret key pSKU then verifies the validity of the digital cash issuer signature by the signature verifying program using the digital cash issuer's public key PKI if it is valid, store the license [pPKU]SKI in the storage device. The user can get more certified pseudonym public key without a limit.

FIG. 29 shows the diagrammatic representation of the withdrawal protocol.

The user's bank comprises a storage device, a signature verifying program encryption program, decryption program and a signature generating program. The bank's public key PKB are known to all entities.

Referring to FIG. 30, the user's mobile device encrypts the user's pseudonym public key pPKU and the amount of digital cash x by encryption program using the mobile home-based shared secret key MHS and sends the information MHS(pPKU,x) to the user's home-based station.

The user's home-based station receives the encrypted user's pseudonym public key and the amount of digital cash MHS(pPKU,x) and decrypts the information by decryption program using the mobile —home-based shared secret key MHS and matches the user's pseudonym public key if they are equal the user's mobile device is authenticated by the user's home-based then, as shown in FIG. 31, the user's home-based station signs the user's pseudonym public key pPKU and the amount of digital cash x by the signature generating program using the user's pseudonym secret key pSKU and encrypts the signed user's pseudonym public key and the amount of digital cash [pPKU,x]pSKU by encryption program using the public key of a cryptographic coprocessor PKP and signs the user real identification UID, the amount of money to be withdrawn x, and PKP([pPKU,x]pSKU) by the signature generating program using the user's master secret key mSKU and encrypts the information by encryption program using the public key of the user's bank PKB then sends PKB([PKP([pPKU,x]pSKU),UID,x]mSKU) to the user's bank.

The user's bank decrypts PKB([PKP([pPKU,x]pSKU), UID,x]mSKU) by decryption program using the bank's secret key and verifies the validity of the signature for authentication by the signature verifying program with the master public key of the user mPKU, if it is valid withdraw the amount of money x from the user account and signs the amount x that is withdrawn from the user account by the signature generating program using the user's bank's secret key SKB and encrypts [x]SKB by encryption program using the public key of the cryptographic coprocessor PKP, then sends information PKP([pPKU,x]pSKU) and PKP([x]SKB) to the digital cash issuer.

Referring to FIG. 32, the digital cash issuer receives PKP ([pPKU,x]pSKU) and PKP([x]SKB), then decrypts the information using the secret key of the cryptographic coprocessor, to obtains the signed user's pseudonym public key and the amount of digital cash [pPKU,x]pSKU and the signed amount of withdrawn money from the user account [x]SKB then verifies the signature of the bank by signature verifying program using the public key of the bank PKB if it is valid the digital cash issuer verifies the user's signature [pPKU,x] pSKU by signature verifying program using the user's pseudonym public key pPKU to authenticate the user, if it is valid, the issuer verifies the equality of the two amounts x if they are not equal the real identity of the user will be revealed by sending pPKU to the certificate authority, if they are equals, the digital cash issuer will increments the user's virtual account by the amount x of digital cash, then signs the pseudonym public key pPKU, digital cash amount x, by the signature generating program using the digital cash issuer's secret key SKI then encrypts the signed pseudonym public key and the amount of the digital cash [pPKU,x]SKI by encryption program using the user's pseudonym public key pPKU then signs the pPKU([pPKU,x]SKI) by the signature generating program using the digital cash issuer's secret key SKI then encrypts [pPKU([pPKU,x]SKI)]SKI using encryption program using the public key of the bank PKB then sends PKB ([pPKU([pPKU,x]SKI)]SKI) to the user's bank.

Referring to FIG. 33, the user's bank then receives the information PKB([pPKU([pPKU,x]SKI)]SKI) and decrypts it by the decryption program using the user's bank secret key SKB and verifies the digital cash issuer signature by the signature verifying program using the public key of the digital cash issuer PKI if it is valid sends pPKU([pPKU,x]SKI) to the user's home-based station.

The user's home-based station receives pPKU([pPKU,x] SKI), then decrypts the information by the decryption program using the user's pseudonym secret key then verifies the validity of the digital cash issuer signature by the signature verifying program with the digital cash issuer's public key PKI. If the signature is valid, the cumulative amount of digital cash is incremented by the amount of digital cash x then stores the new cumulative amount of digital cash in the storage device by the user's home-based station.

Referring to FIG. 34, the user's home-based machine encrypts the value of the new cumulative amount of digital cash x and the user's pseudonym public key pPKU by encryption program using the mobile —home-based shared secret key MHS and sends MHS(pPKU,x) to the user's mobile-based device.

The user's mobile-based device receives the encrypted value of the new cumulative amount of digital cash and the user's pseudonym public key MHS(pPKU,x) decrypts the information by decryption program using the mobile/home-based shared secret key MHS and match the user's pseudonym public key to authenticate the user's home-based station if the user's pseudonym public key matches the user stores the new cumulative amount of digital cash in the storage device of the user's mobile-based device.

FIG. 35 shows the diagrammatic representation of the digital cash token withdrawal protocol. Referring to FIG. 36, the user's mobile device encrypts the user's pseudonym public key pPKU and the amount of digital cash x by encryption program using the mobile/home-based shared secret key MHS and sends the information MHS(pPKU,x) to the user's home-based station.

The user's home-based station receives the encrypted user's pseudonym public key and the amount of digital cash MHS(pPKU,x) and decrypts the information by decryption program using the mobile/home-based shared secret key MHS and matches the user's pseudonym public key if they are equal the user's mobile device is authenticated by the user's home-based then, as shown in FIG. 37, the user's home-based station signs the user's pseudonym public key pPKU and the amount of digital cash x by the signature generating program using the user's pseudonym secret key pSKU then encrypts the signed user's pseudonym public key and the amount of digital cash [pPKU,x]pSKU by encryption program using the digital cash issuer's public key PKI, and then sends PKI([pPKU,x]pSKU) to the digital cash issuer.

The digital cash issuer receives PKI([pPKU,x]pSKU), then decrypts PKI([pPKU,x]pSKU) by decryption program using the digital cash issuer's secret key and verifies the signature of the user by signature verifying program using the user's pseudonym public key pPKU, to authenticate the user, if it is valid, the digital cash issuer will issues digital cash token, which contains the following information: (i) digital cash amount, (ii) random number, (iii) the issuer identity, the digital cash issuer generates random number Rd and stores it in the storage device, then signs digital cash amount x, random number Rd and the issuer identity IID by signature generating program using the digital cash issuer's secret key SKI and encrypts the information by encryption program using the user's pseudonym public key pPKU then decrements the user's virtual account by x then sends pPKU([x, Rd,IID]SKI) to the user's home-based station.

The user's home-based station receives pPKU([x,Rd,IID] SKI), then decrypts the information by the decryption program using the user's pseudonym secret key then verifies the validity of the digital cash issuer signature by the signature verifying program with the digital cash issuer's public key PKI. If the signature is valid, the user's home-based station stores the digital cash token [x,Rd,IID]SKI and the cumulative amount of digital cash is decremented by the amount of the digital cash token x then stores the new cumulative amount of digital cash in the storage device by the user.

Referring to FIG. 39, the user's home-based machine encrypts the value of the digital cash token x, the new cumulative amount of digital cash z and the user's pseudonym public key pPKU by encryption program using the mobile/home-based shared secret key MHS and sends MHS(pPKU, z,x) to the user's mobile-based device.

The user's mobile-based device receives the encrypted value of the digital cash token, the new cumulative amount of digital cash z and the user's pseudonym public key MHS (pPKU,z,x) decrypts the information by decryption program using the mobile —home-based shared secret key MHS and match the user's pseudonym public key to authenticate the user's home-based station if the user's pseudonym public key matches the user stores the value of digital cash token and the new cumulative amount of digital cash in the storage device of the user's mobile-based device. The user can easily transfer the issued digital cash token to another user who has certified pseudonym public key.

Figure 44:
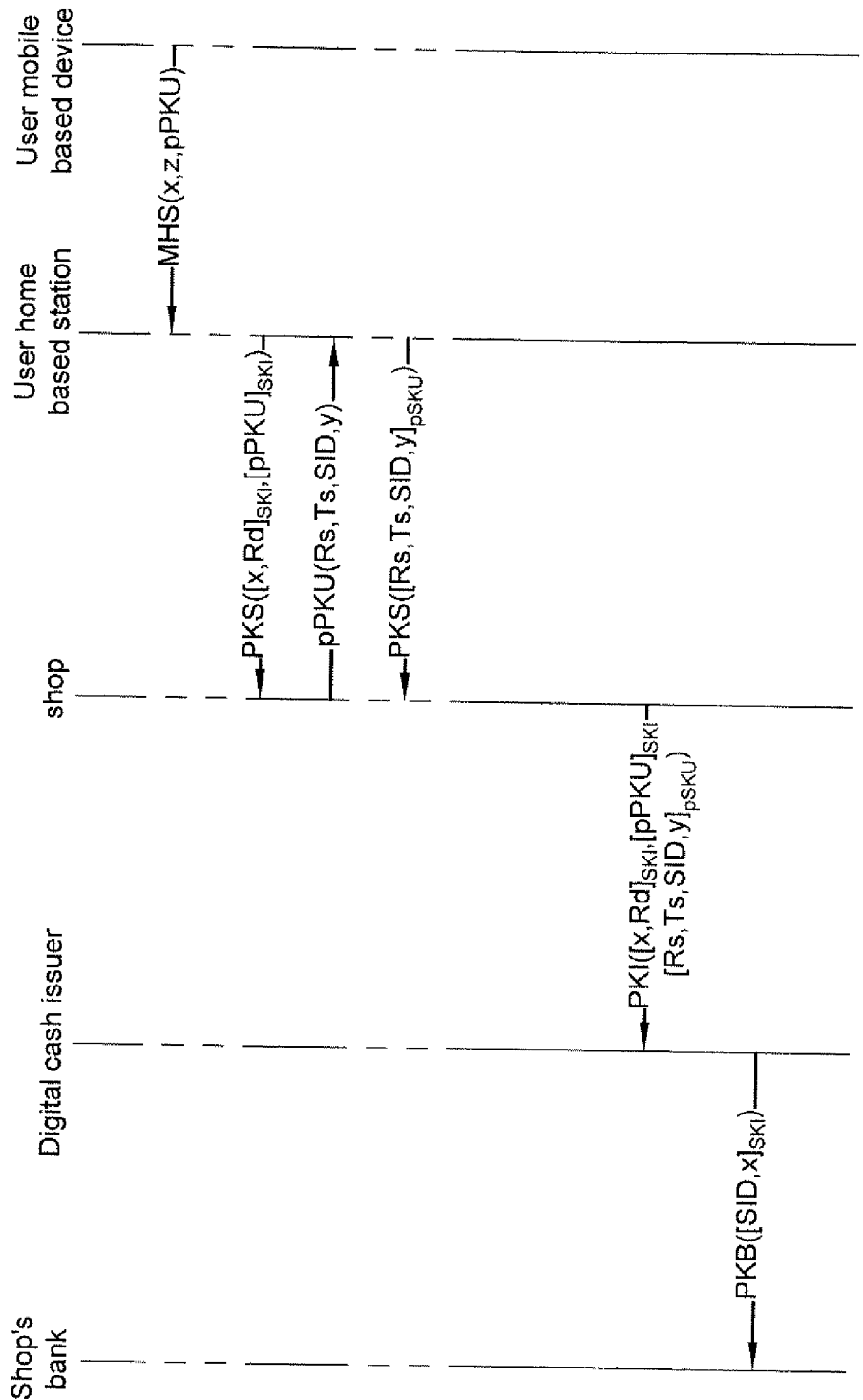
FIG. 44 is an exemplary payment protocol according to the eighth embodiment.

FIG. 44 shows the diagrammatic representation of the payment protocol.

The shop comprises a storage device, a signature verifying program encryption program, decryption program, a signature generating program, a random number generating program and a time generating program the shop public key PKS is known to all entities.

Figure 45:
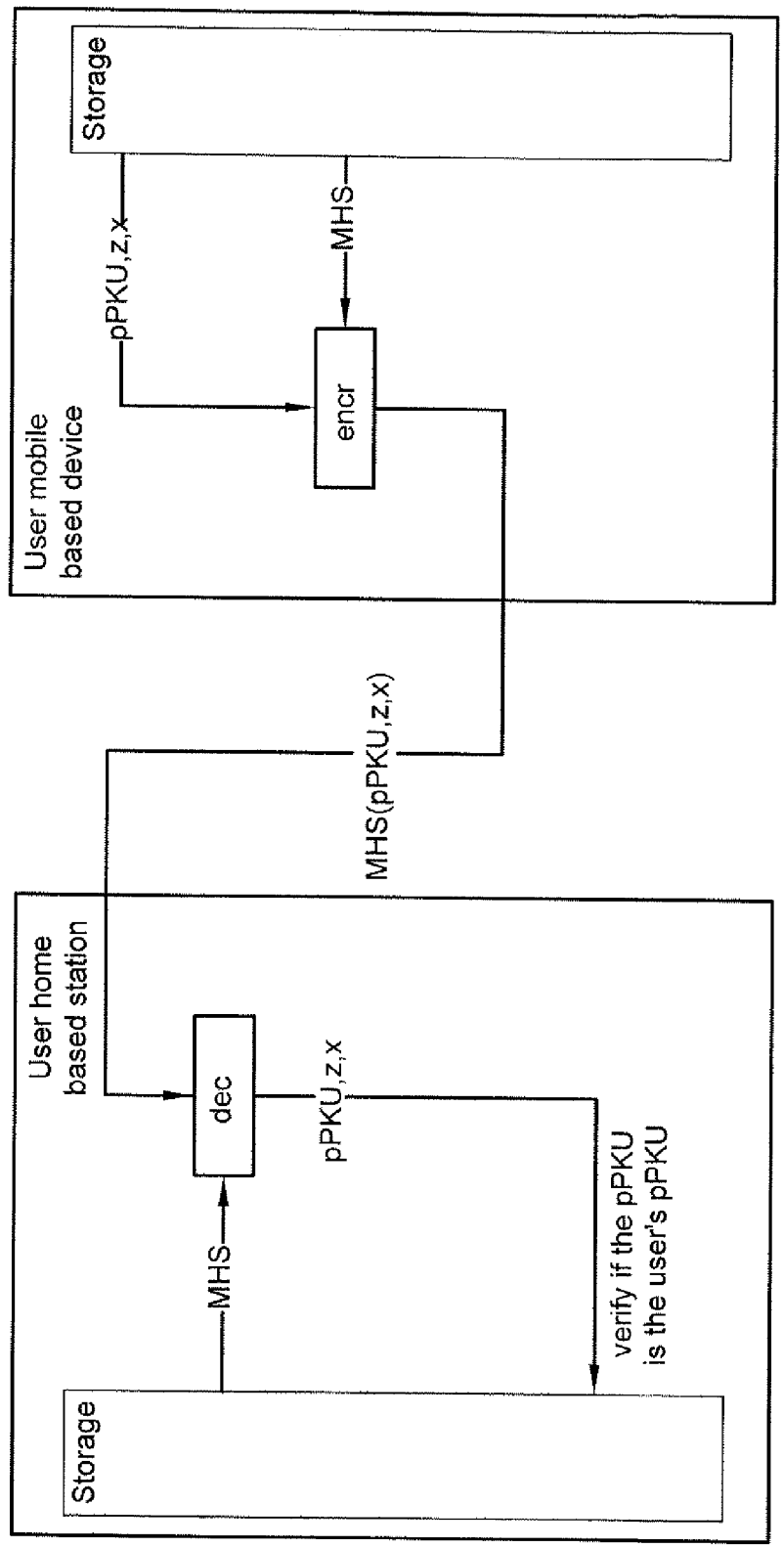
FIG. 45 is an exemplary payment process part 1 according to the eighth embodiment.

Referring to FIG. 45, the user's mobile-based device chooses the value of the digital cash token x and encrypts it also encrypts the user's pseudonym public key pPKU and the price of the good z by encryption program using the mobile/home-based shared secret key MHS and sends MHS(pPKU,z,x) to the user's home-based station.

The user's home-based station receives MHS(pPKU,z,x) and decrypts the information by decryption program using the mobile home-based shared secret key MHS, and match the user's pseudonym public key to authenticate the user's mobile-based device, if the user's pseudonym public key is matches, the user's home-based station find the digital cash token that equivalent to the value that is sent by the user's mobile device.

Figure 46:
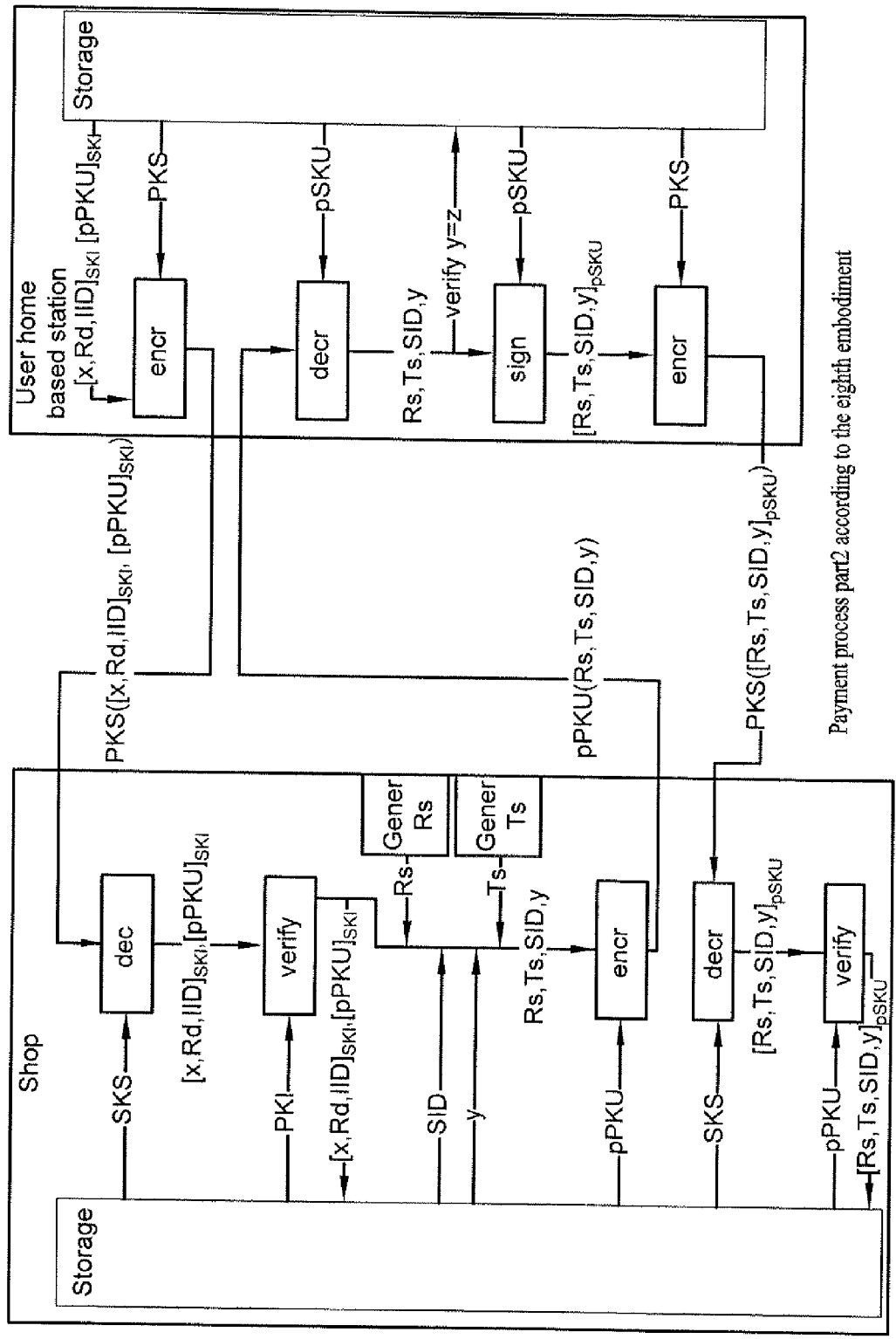
FIG. 46 is an exemplary payment process part 2 according to the eighth embodiment.

Referring to FIG. 46, the user's home-based station encrypts the digital cash token [x,Rd,IID]SKI and the digital cash issuer license [pPKU]SKI by encryption program using the public key of the shop PKS then sends it to the shop as request for payment.

The user can send a payment request using another certified pseudonym public key because the pseudonym is not associated with digital cash token. This gives the flexibility to change the pseudonym at the payment time.

The shop decrypts the encrypted digital cash token and the digital cash issuer license PKS([x,Rd,IID]SKI, [pPKU]SKI) by decryption program using the shop's secret key SKS then verify the signature of the issuer by the signature verifying program with the digital cash issuer public key PKI if the signatures are valid the shop stores the user's digital cash issuer license, the digital cash token and generates a random number Rs by random number generating program and generates the time Ts by the time generating program then encrypt Rs,Ts, the shop identification SID and the price of the good y by encryption program using the user's pseudonym public key pPKU and sends pPKU(Rs,Ts,SID,y) to the user's home-based station.

The user's home-based station receives pPKU(Rs,Ts,SID,y) and decrypts it by decryption program using the user's pseudonym secret key pSKU and verify the equality of the price of the good y and z, if they are equal, signs the random number Rs, the time Ts, the shop identification SID and the price of the good y by signature generating program using the user's pseudonym secret key pSKU and encrypts the information by encryption program using the public key of the shop PKS then sends PKS([Rs,Ts,SID,y]pSKU) to the shop.

The shop receives the information PKS([Rs,Ts,SID,y]pSKU) and decrypts it by decryption program using the shop's secret key SKS and verifies the signature by signature verifying program using the user's pseudonym public key pPKU if it is valid the shop stores the challenge and the shop regards the payment as valid.

Figure 47:
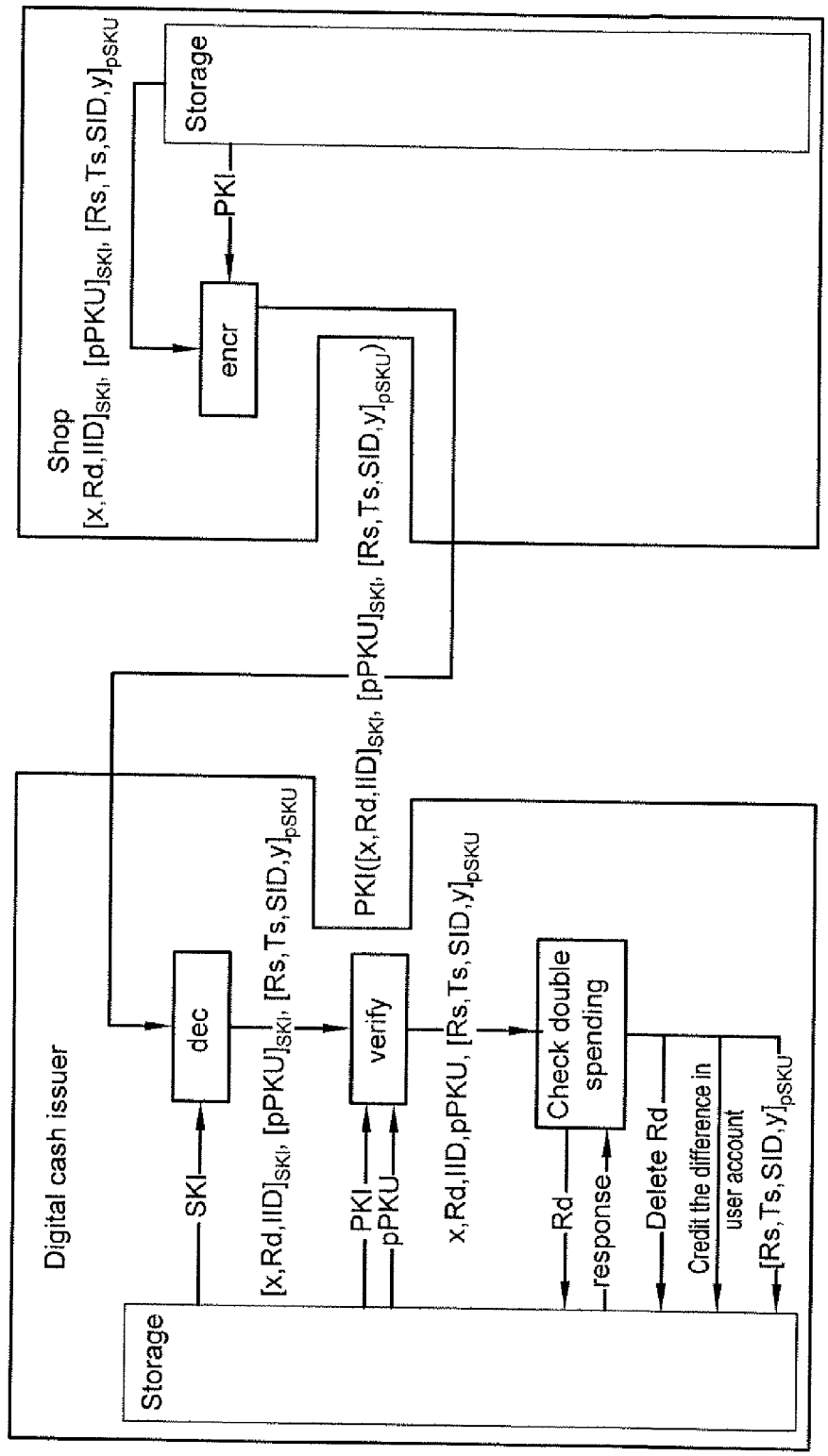
FIG. 47 is an exemplary payment process part 3 according to the eighth embodiment.

Referring to FIG. 47, after period of time the shop encrypts the information that contains the challenge that was signed by the user [Rs,Ts,SID,y]pSKU, the digital cash token [x,Rd,IID]SKI, and the user's digital cash issuer license [pPKU]SKI, by encryption program using the public key of the digital cash issuer PKI and sends the information to the digital cash issuer.

The digital cash issuer decrypts PKI([Rs,Ts,SID,y]pSKU, [x,Rd,IID]SKI, [pPKU]SKI) by decryption program using the digital cash issuer's secret key SKI and verifies the signature by the signature verifying program using the digital cash issuer's public key PKI and the user's pseudonym public key pPKU, if the signatures are valid the issuer check the Rd if the random number Rd does not exist, this mean there is double spending and the real identity will be revealed by sending the user's pseudonym public key pPKU to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU in the storage device.

Figure 48:
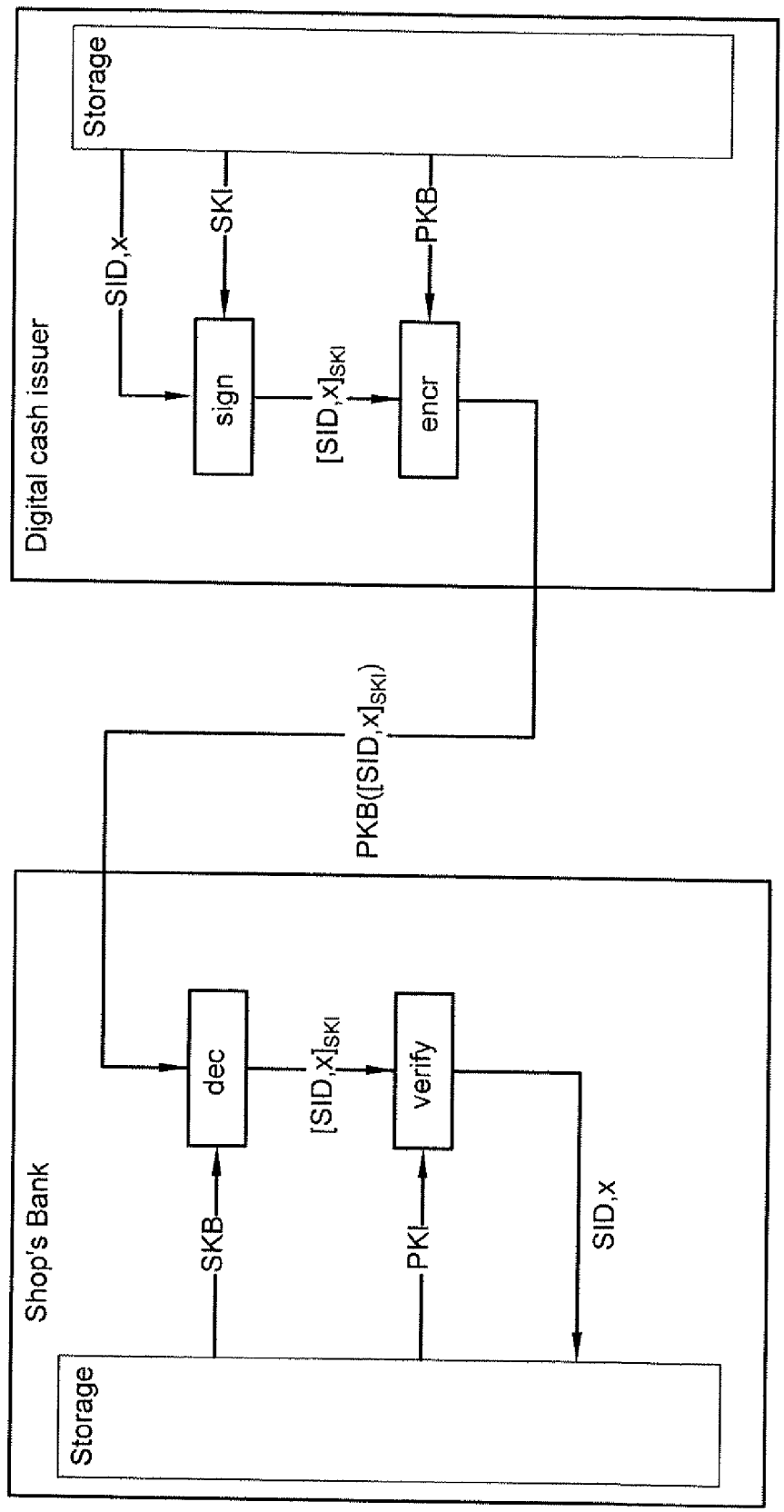
FIG. 48 is an exemplary payment process part 4 according to the eighth embodiment.

Referring to FIG. 48, the digital cash issuer signs the shop identification SID, and the amount x to be deposited for the shop by the signature generating program with the digital cash issuer's secret key SKI and encrypts the information by encryption program using the public key of the shop's bank PKI3 then sends PKB([SID,x]SKI) to the shop's bank.

The shop's bank receives PKB([SID,x]SKI) and decrypts the information by decryption program using the secret key SKIS and verifies the signature by signature verifying program with the public key of the issuer PKI if the signature is valid the shop's bank will add x amount of money in the shop account.

Ninth Embodiment

In the ninth embodiment, a mobile-based device is used by the user, the digital cash token can be more than the price of the goods, and the user can transfer digital cash between two virtual accounts opened by different digital cash issuers to divide digital cash token into smaller tokens as needed.

FIG. 2 shows the diagrammatic representation of the registration protocol. The certificate authority comprises, a storage device, signature verifying program, encryption program, decryption program and a signature generating program. The public key PKC is known to all entities.

The user comprises a storage device, an encryption program, a decryption program, a signature verifying program and a key generating program and a signature generating program. The master public key mPKU is known to all entities.

The issuer1 and the issuer2 comprises a storage device, an encryption program, a decryption program, a signature generating program, a signature verifying program, and a random number generating program. The public key PKI1 and PKI2 is known to all entities.

Referring to FIG. 6, the user generates a pseudonym public key and a pseudonym secret key by the key generating program, then signs the pseudonym public key and the user real identification by the signature generating program using user's master secret key then encrypts [UID,pPKU1]mSKU by encryption program using the public key of the certificate authority and sends PKC([UID,pPKU1]mSKU) to the certificate authority as a request for certified pseudonym public key (a request for the issuance of a license).

The certificate authority receives the request (PKC([UID, pPKU1]mSKU)) then decrypts it by decryption program using the secret key of the certificate authority SKC and verifies the validity of the user signature by the signature verifying program using the user's master public key mPKU. If it is valid the certificate authority generates a signature (license) [pPKU1]SKC for the user's pseudonym public key by the signature generating program using the certificate authority's secret key SKC, and stores the user's pseudonym public key in the storage device in correspondence with the user's master public key mPKU and the user's real identification UID, the certificate authority encrypts the license [pPKU1]SKC by encryption program using the user's master public key mPKU then sends mPKU([pPKU1]SKC) to the user.

The user receives the encrypted license mPKU([pPKU1] SKC) then decrypts it by decryption program using the user's master secret key mSKU then verifies the validity of the license [pPKU1]SKC by the signature verifying program using the public key of the certificate authority PKC, if it is valid stores the license in the storage device.

Referring to FIG. 7, the user encrypts the license [pPKU1] SKC, pseudonym public key PPKU1 by the encryption program using the public key of the digital cash issuer1 PKI1 then sends PKI1([pPKU1]SKC,pPKU1) to the digital cash issuer1 as a request for registration in the digital cash issuer1 and for the digital cash issuer license.

The digital cash issued receives PKI([pPKU1]SKC, pPKU1) and decrypts this information by decryption program using the secret key of the digital cash issuer1 SKI1. The digital cash issuer1 searches for pPKU1 in the storage, this will prevents the uses of other users' pseudonym public key, if this user's pseudonym public key pPKU1 is not already registered the digital cash issuer verifies the validity of the license [pPKU1]SKC by the signature verifying program using the certificate authority's public key PKC, if it is valid the digital cash issuer1 sets an empty space storage to the user and stores the user's pseudonym public key pPKU1 in the storage device. The digital cash issuer1 signs the user's pseudonym public key pPKU1 by the signature generating program using the secret key of the digital cash issuer1 SKI1 and encrypts the information by encryption program using the user's pseudonym public key pPKU1 then sends pPKU1 ([pPKU1]SKI1) as a license to the user.

The user receives pPKU1([pPKU1]SKI1), and decrypts this information by the decryption program using the user's pseudonym secret key pSKU1 then verifies the validity of the digital cash issuer signature by the signature verifying program using the digital cash issuer1's public key PKI1 if it is valid, store the license [pPKU1]SKI1 in the storage device.

The user registers using a second pseudonym public key pPKU2 with the second digital cash issuer2 by the same procedures described above.

FIG. 29 shows the diagrammatic representation of the withdrawal protocol.

The user's bank comprises a storage device, a signature verifying program encryption program, decryption program and a signature generating program. The bank's public key PKB are known to all entities.

Referring to FIG. 30, the user's mobile device encrypts the user's pseudonym public key pPKU1 and the amount of digital cash x by encryption program using the mobile home-based shared secret key MHS and sends the information MHS(pPKU1,x) to the user's horror-based station.

The user's home-based station receives the encrypted user's pseudonym public key and the amount of digital cash MHS(pPKU1,x) and decrypts the information by decryption program using the mobile —home-based shared secret key MHS and matches the user's pseudonym public key if they are equal the user's mobile device is authenticated by the user's home-based then, as shown in FIG. 31, the user's home-based station signs the user's pseudonym public key pPKU1 and the amount of digital cash x by the signature generating program using the user's pseudonym secret key pSKU1 and encrypts the signed user's pseudonym public key and the amount of digital cash [pPKU1,x]pSKU1 by encryption program using the public key of a cryptographic coprocessor PKP and signs the user real identification UID, the amount of money to be withdrawn x, and PKP([pPKU1,x] pSKU1) by the signature generating program using the user's master secret key mSKU and encrypts the information by encryption program using the public key of the user's bank PKB then sends PKB([PKP([pPKU1,x]pSKU1),UID,x] mSKU) to the user's bank.

The user's bank decrypts PKB([PKP([pPKU1,x]pSKU1), UID,x]mSKU) by decryption program using the bank's secret key and verifies the validity of the signature for authentication by the signature verifying program with the master public key of the user mPKU, if it is valid withdraw the amount of money x from the user account and signs the amount x that is withdrawn from the user account by the signature generating program using the user's bank's secret key SKB and encrypts [x]SKB by encryption program using the public key of the cryptographic coprocessor PKP, then sends information PKP([pPKU1,x]pSKU1) and PKP([x] SKB) to the digital cash issuer1.

Referring to FIG. 32, the digital cash issuer1 receives PKP ([pPKU1,x]pSKU1) and PKP([x]SKB), then decrypts the information using the secret key of the cryptographic coprocessor, to obtains the signed user's pseudonym public key and the amount of digital cash [pPKU1,x]pSKU1 and the signed amount of withdrawn money from the user account [x]SKB then verifies the signature of the bank by signature verifying program using the public key of the bank PKB if it is valid the digital cash issuer1 verifies the user's signature [pPKU1,x] pSKU1 by signature verifying program using the user's pseudonym public key pPKU1 to authenticate the user, if it is valid, the issuer1 verifies the equality of the two amounts x if they are not equal the real identity of the user will be revealed by sending pPKU1 to the certificate authority, if they are equals, the digital cash issuer1 will increments the user's virtual account by the amount x of digital cash, then signs the pseudonym public key pPKU1, digital cash amount x, by the signature generating program using the digital cash issuer1's secret key SKI1 then encrypts the signed pseudonym public key and the amount of the digital cash [pPKU1,x]SKI1 by encryption program using the user's pseudonym public key pPKU1 then signs the pPKU1([pPKU1,x]SKI1) by the signature generating program using the digital cash issuer1's secret key SKI1 then encrypts [pPKU1([pPKU1,x]SKI1)] SKI1 using encryption program using the public key of the bank PKB then sends PKB([pPKU1([pPKU1,x]SKI1)] SKI1) to the user's bank.

Referring to FIG. 33, the user's bank then receives the information PKB([pPKU1([pPKU1,x]SKI1)]SKI1) and decrypts it by the decryption program using the user's bank secret key SKB and verifies the digital cash issuer signature by the signature verifying program using the public key of the digital cash issuer1 PKI1 if it is valid sends pPKU1([pPKU1, x]SKI1) to the user's home-based station.

The user's home-based station receives pPKU1([pPKU1,x]SKI1), then decrypts the information by the decryption program using the user's pseudonym secret key then verifies the validity of the digital cash issuer1 signature by the signature verifying program with the digital cash issuer1's public key PKI1. If the signature is valid, the cumulative amount of digital cash is incremented by the amount of digital cash x then stores the new cumulative amount of digital cash in the storage device by the user's home-based station.

Referring to FIG. 34, the user's home-based machine encrypts the value of the new cumulative amount of digital cash x and the user's pseudonym public key pPKU1 by encryption program using the mobile/home-based shared secret key MHS and sends MHS(pPKU1,x) to the user's mobile-based device.

The user's mobile-based device receives the encrypted value of the new cumulative amount of digital cash and the user's pseudonym public key MHS(pPKU1,x) decrypts the information by decryption program using the mobile/home-based shared secret key MHS and match the user's pseudonym public key to authenticate the user's home-based station if the user's pseudonym public key matches the user stores the new cumulative amount of digital cash in the storage device of the user's mobile-based device.

FIG. 35 shows the diagrammatic representation of the digital cash token withdrawal protocol.

Referring to FIG. 36, the user's mobile device encrypts the user's pseudonym public key pPKU1 and the amount of digital cash x by encryption program using the mobile —home-based shared secret key MHS and sends the information MHS(pPKU1,x) to the user's home-based station.

The user's home-based station receives the encrypted user's pseudonym public key and the amount of digital cash MHS(pPKU1,x) and decrypts the information by decryption program using the mobile —home-based shared secret key MHS and matches the user's pseudonym public key if they are equal the user's mobile device is authenticated by the user's home-based then, as shown in FIG. 37, the user's home-based station signs the user's pseudonym public key pPKU1 and the amount of digital cash x by the signature generating program using the user's pseudonym secret key pSKU1 then encrypts the signed user's pseudonym public key and the amount of digital cash [pPKU1,x]pSKU1 by encryption program using the digital cash issuer1's public key PKI1, and then sends PKI1([pPKU1,x]pSKU1) to the digital cash issuer1.

The digital cash issuer1 receives PKI1([pPKU1,x]pSKU1), then decrypts PKI1([pPKU1,x]pSKU1) by decryption program using the digital cash issuer1's secret key and verifies the signature of the user by signature verifying program using the user's pseudonym public key pPKU1, to authenticate the user, if it is valid, the digital cash issuer will issues digital cash token which contains the following information: (i) digital cash amount, (ii) random number, (iii) the issuer identity, the digital cash issuer1 generates random number Rd and stores it in the storage device, then signs digital cash amount x, random number Rd and the issuer identity IID1 by signature generating program using the digital cash issuer1's secret key SKI1 and encrypts the information by encryption program using the user's pseudonym public key pPKU1 then decrements the user's virtual account by x then sends pPKU1([x,Rd,IID1]SKI1) to the user's home-based station.

The user's home-based station receives pPKU1([x,Rd,IID1]SKI1), then decrypts the information by the decryption program using the user's pseudonym secret key then verifies the validity of the digital cash issuer1 signature by the signature verifying program with the digital cash issuer1's public key PKI1. If the signature is valid, the user's home-based station stores the digital cash token [x,Rd,IID1]SKI1 and the cumulative amount of digital cash is decremented by the amount of the digital cash token x then stores the new cumulative amount of digital cash in the storage device by the user's home-based station.

Referring to FIG. 38, the users home-based machine encrypts the value of the digital cash token x, the new cumulative amount of digital cash z and the user's pseudonym public key pPKU by encryption program using the mobile/home-based shared secret key MHS and sends MHS(pPKU,z,x) to the user's mobile-based device.

The user's mobile-based device receives the encrypted value of the digital cash token, the new cumulative amount of digital cash z and the user's pseudonym public key MHS(pPKU,z,x) decrypts the information by decryption program using the mobile —home-based shared secret key MHS and match the user's pseudonym public key to authenticate the user's home-based station if the user's pseudonym public key matches the user stores the value of digital cash token and the new cumulative amount of digital cash in the storage device of the user's mobile-based device. The user can easily transfer the issued digital cash token to another user who has certified pseudonym public key.

Figure 49:
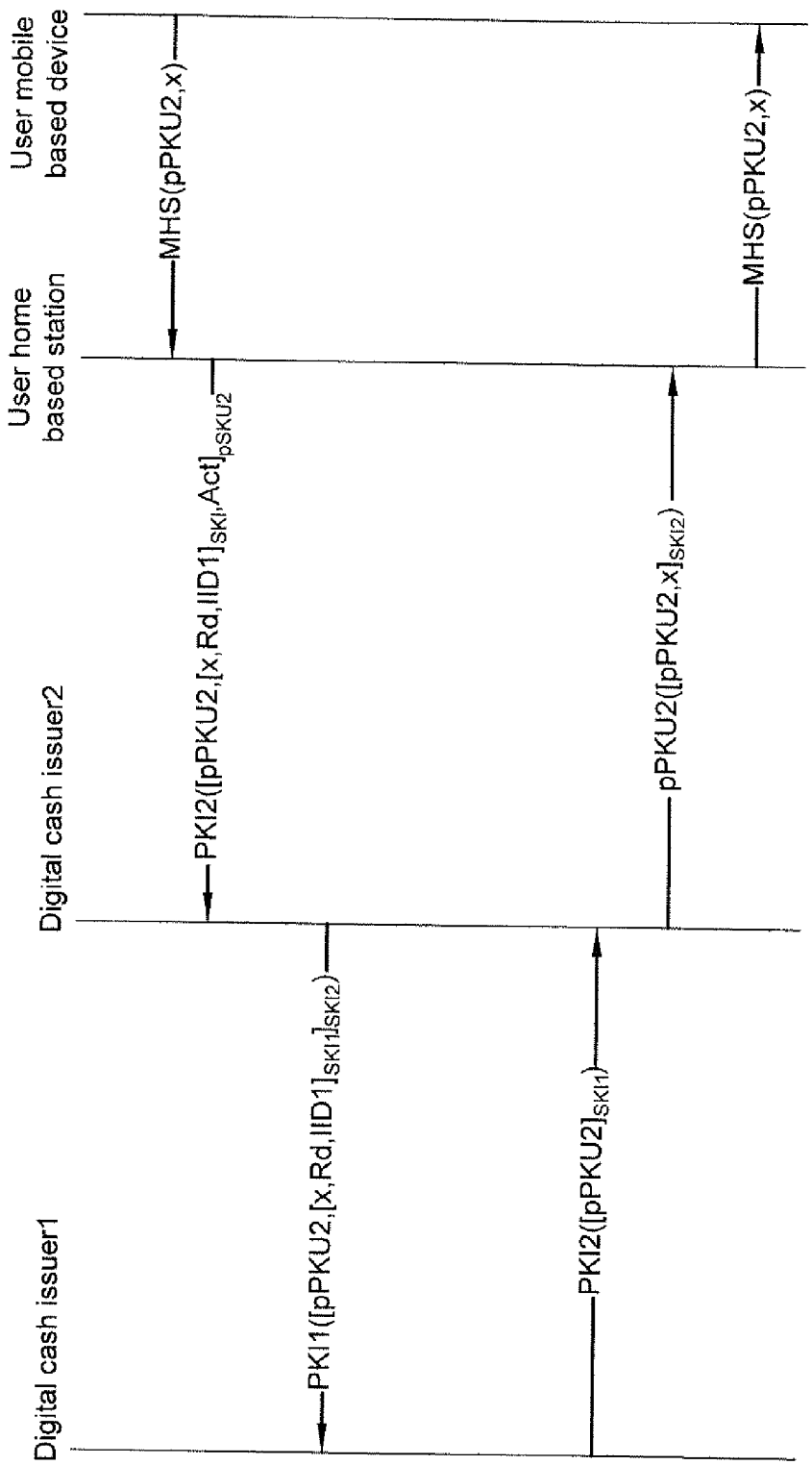
FIG. 49 is an exemplary transferring protocol according to the ninth embodiment.

FIG. 49 shows the diagrammatic representation of the transferring protocol.

Figure 51:
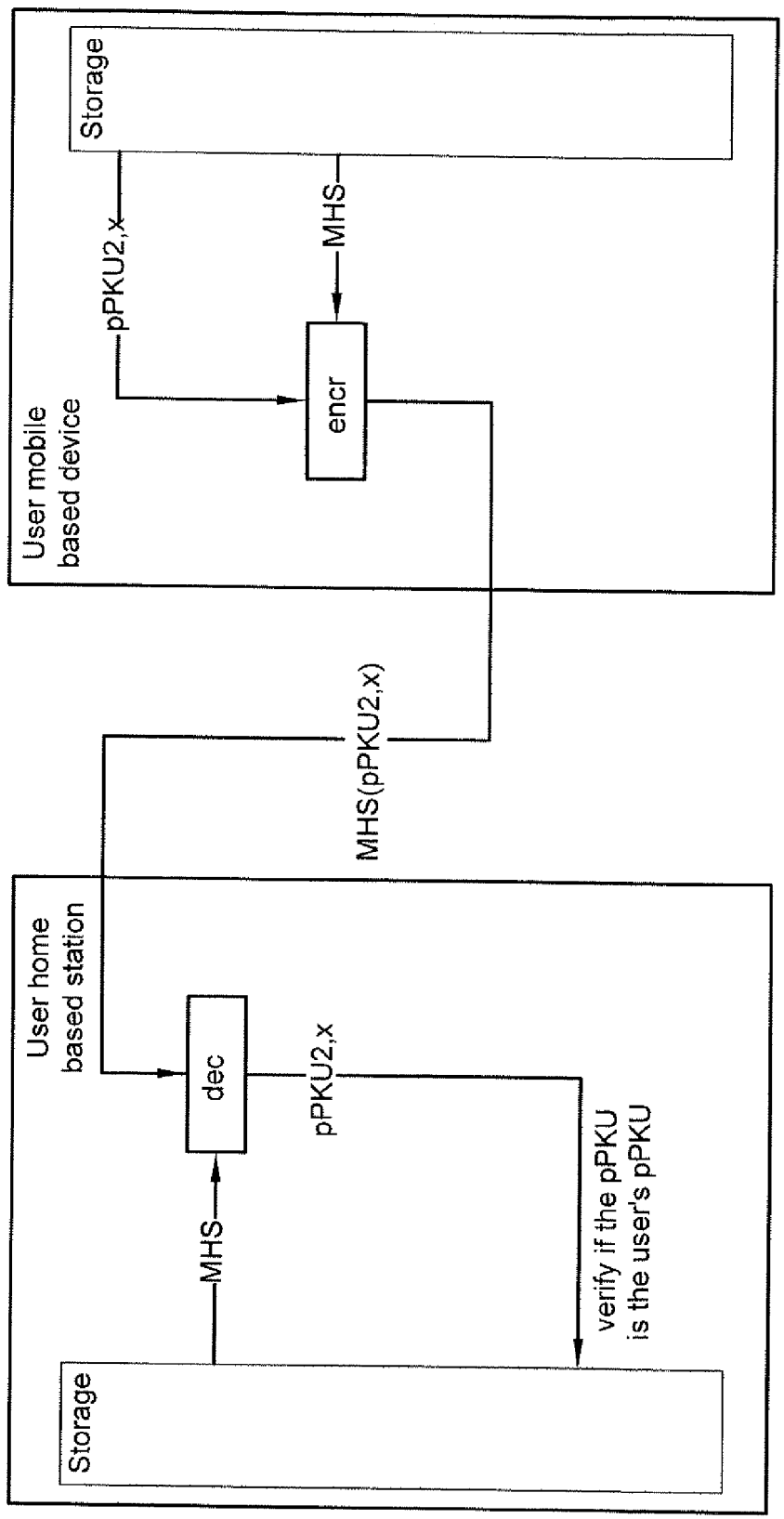
FIG. 51 is an exemplary transferring process part 1 according to the ninth embodiment.

Referring to FIG. 51, the user's mobile-based device chooses the value of the digital cash token x and encrypts it also encrypts the user's pseudonym public key pPKU2 by encryption program using the mobile/home-based shared secret key MHS and sends MHS(pPKU2,x) to the user's home-based station.

The user's home-based station receives MHS(pPKU2,x) and decrypts the information by decryption program using the mobile/home-based shared secret key MRS, and match the user's pseudonym public key to authenticate the user's mobile-based device, if the user's pseudonym public key is matches, the user's home-based station find the digital cash token that equivalent to the value that is sent by the user's mobile device.

Figure 52:
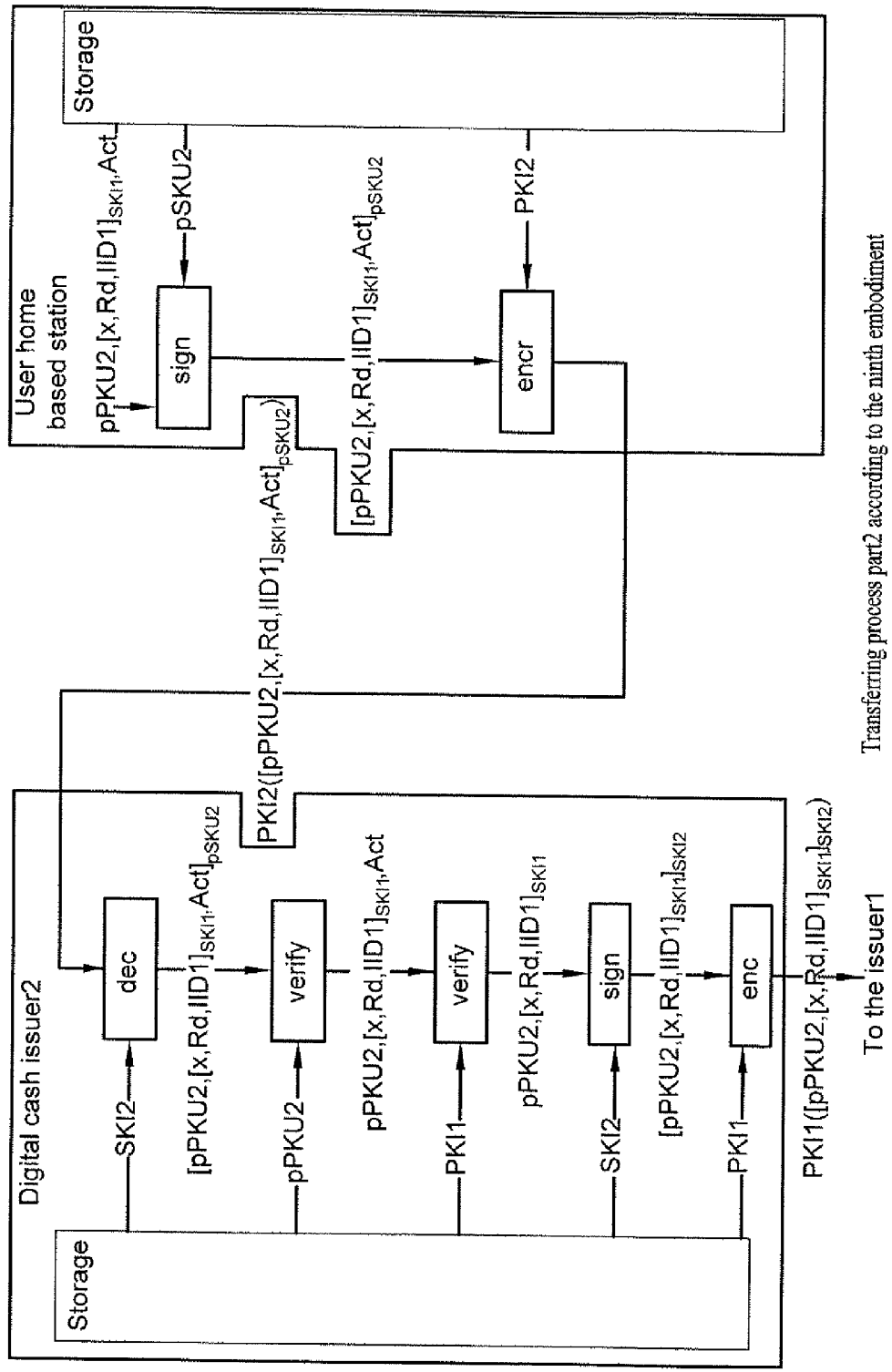
FIG. 52 is an exemplary transferring process part 2 according to the ninth embodiment.

Referring to FIG. 52, the user's home-based station signs the user's pseudonym public key pPKU2, the digital cash token [x,Rd,IID1]SKI1 and the action to be taken Act by signature generating program using the user's secret pseudonym key pSKU2 then encrypts [pPKU2, [x,Rd,IID1]SKI1, Act]pSKU2 by encryption program using the public key of the digital cash issuer2 PKI2 then sends it to the digital cash issuer2 as request for transfer digital cash.

The digital cash issuer2 receives PKI2([pPKU2,[x,Rd,IID1]SKI1,Act]pSKU2), then decrypts the information by decryption program using the digital cash issuer2's secret key and verifies the signature of the user by signature verifying program using the user's pseudonym public key pPKU2, to authenticate the user, if it is valid, the digital cash issuer2 signs the user's pseudonym public key pPKU2 and the digital cash token [x,Rd,IID1]SKI1 by signature generating program using the digital cash issuer2 secret key SKI2 then encrypts [pPKU2,[x,Rd,IID1]SKI1]SKI2 by encryption program using the digital cash issuer1's public key PKI1 then sends PKI1([pPKU2,[x,Rd,IID1]SKI1]SKI2) to the digital cash issuer1

Figure 53:
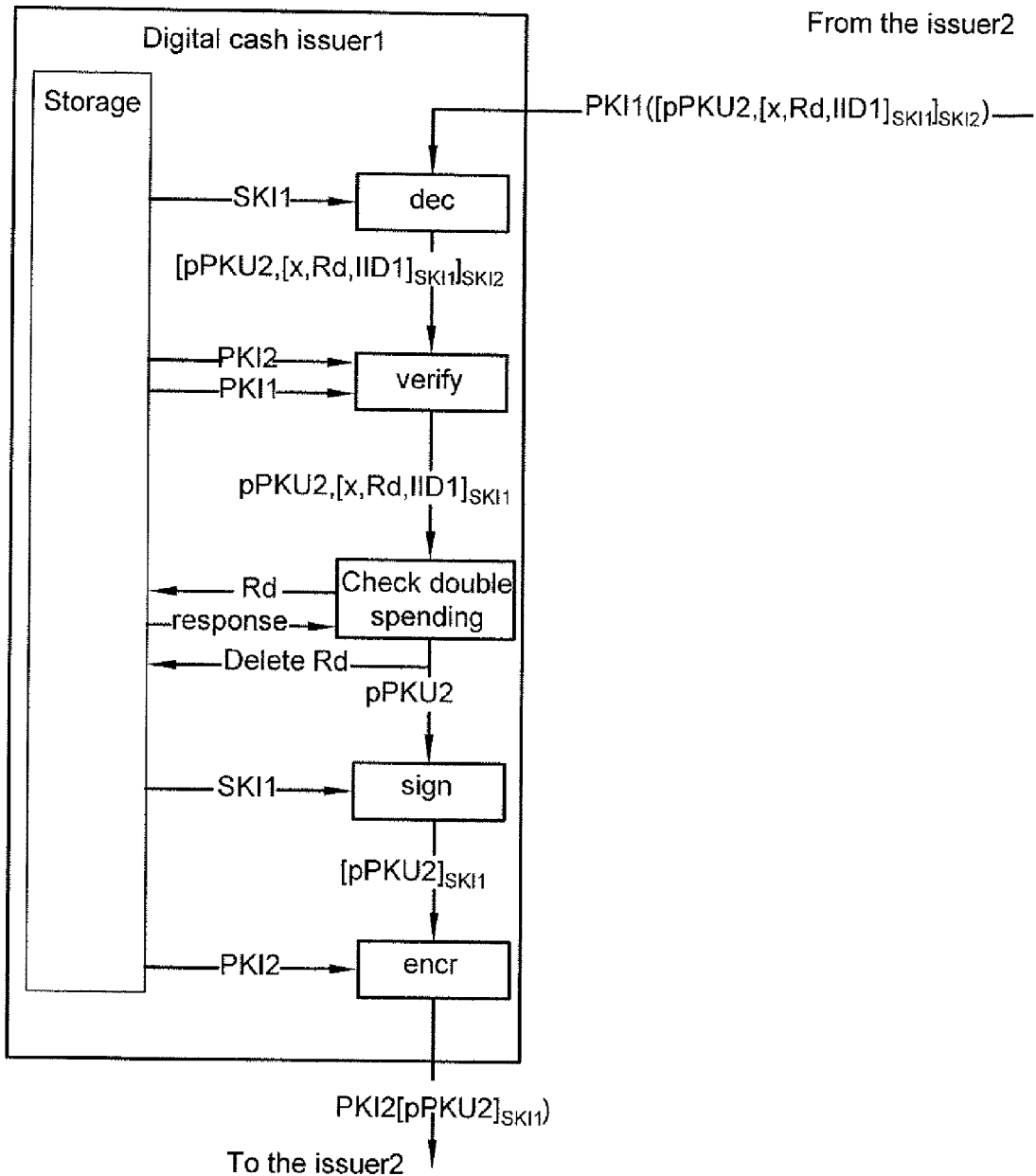
FIG. 53 is an exemplary transferring process part 3 according to the ninth embodiment.

Referring to FIG. 53, the digital cash issuer1 receives PKI1([pPKU2,[x,Rd,IID1]SKI1]SKI2) and decrypts it by decryption program using the digital cash issuer1 secret key SKI1 and verifies the digital cash issuer2 signature by signature verifying program using the digital cash issuer2's public key PKI2 if it is valid, check the Rd if the random number Rd does not exist, this mean there is double spending and the real identity will be revealed by sending the user's pseudonym public key pPKU2 to the certificate authority, if it is not, the digital cash issuer1 signs the pseudonym public key pPKU2 by signature generating program using the digital cash issuer1's secret key SKI1 then encrypts [pPKU2]SKI1 by encryption program using the digital cash issuer2's public key PKI2 and sends it to the digital cash issuer2.

Figure 54:
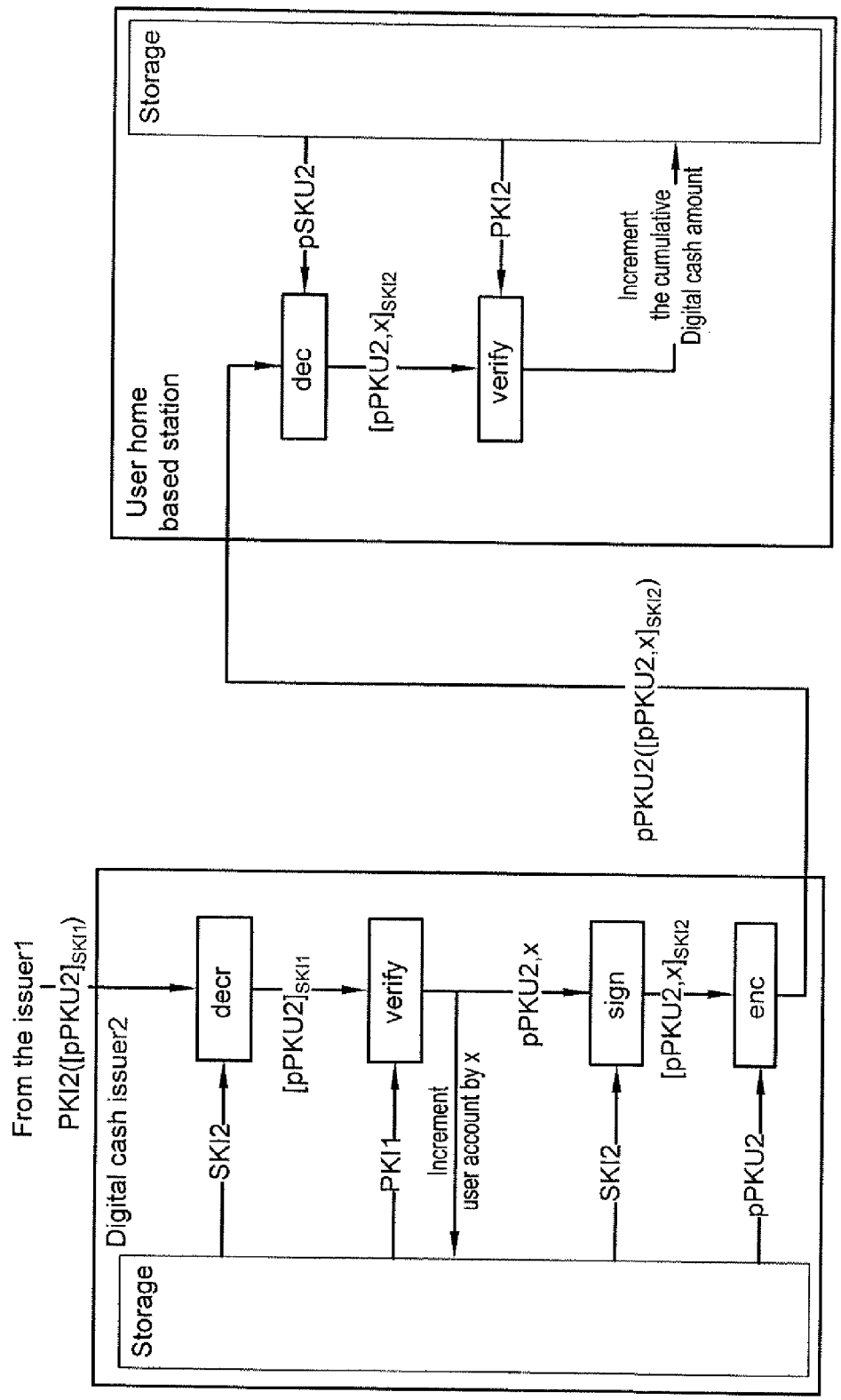
FIG. 54 is an exemplary transferring process part 4 according to the ninth embodiment.

Referring to FIG. 54, the digital cash issuer2 receives PKI2 ([pPKU2]SKI1) and decrypts it by decryption program using the digital cash issuer2 secret key SKI2 and verifies the digital cash issuer1 signature by signature verifying program using the digital cash issuer1's public key PKI1 if it is valid, the digital cash issuer2 increments the user's virtual account by the amount x of digital cash, then signs the pseudonym public key pPKU2, digital cash amount x, by the signature generating program using the digital cash issuer2's secret key SKI2 then encrypts [pPKU2,x]SKI2 by encryption program using the user's pseudonym public key pPKU2 then sends pPKU2 ([pPKU2,x]SKI2) to the user's home-based station.

The user's home-based station receives pPKU2([pPKU2, x]SKI2), then decrypts the information by the decryption program using the user's pseudonym secret key then verities the validity of the digital cash issuer2 signature by the signature verifying program with the digital cash issuer2's public key PKI2. If the signature is valid, the cumulative amount of digital cash is incremented by the amount of digital cash x then stores the new cumulative amount of digital cash in the storage device by the user.

Figure 55:
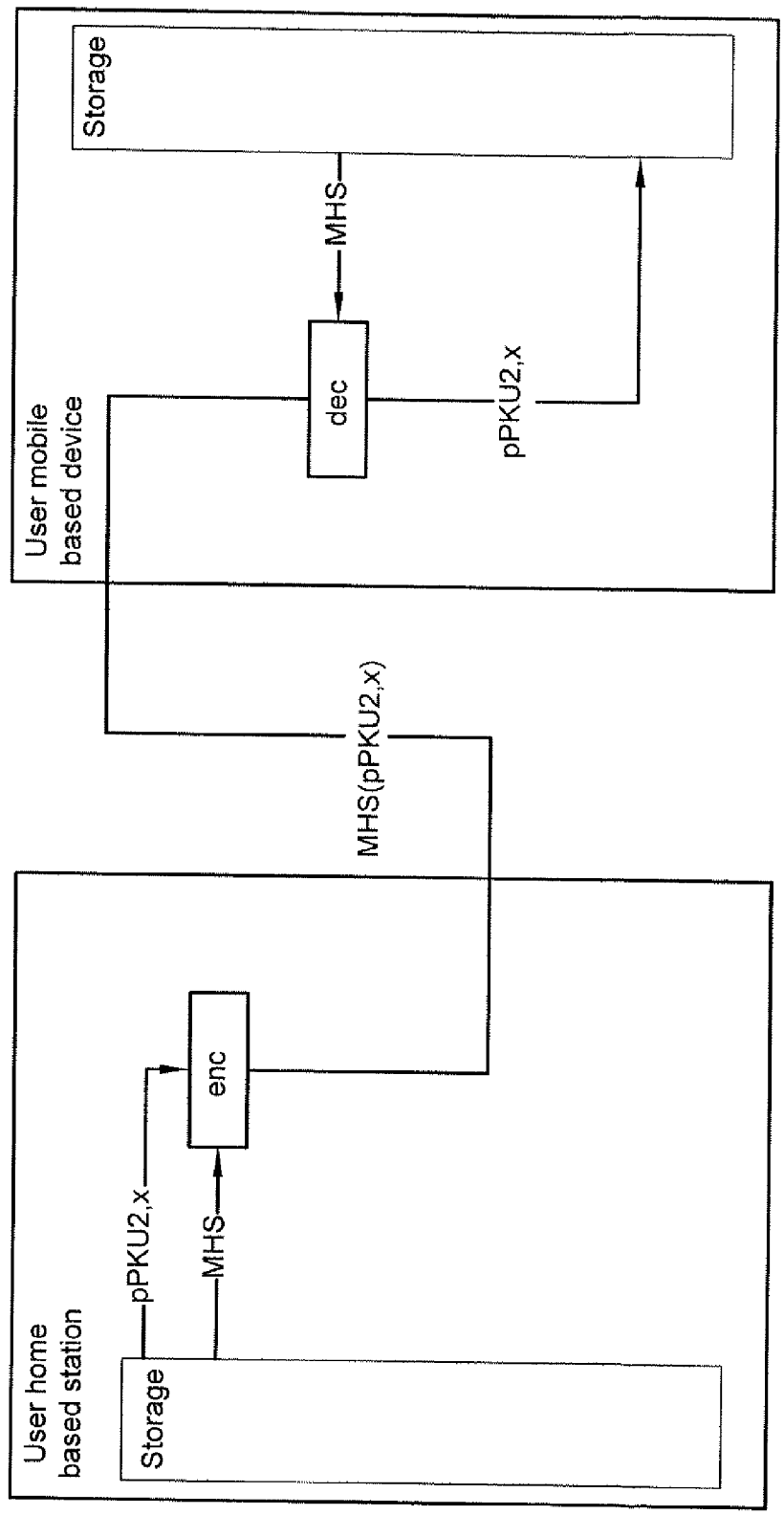
FIG. 55 is an exemplary transferring process part 5 according to the ninth embodiment.

Referring to FIG. 55, the user's home-based machine encrypts the value of the new cumulative amount of digital cash x and the user's pseudonym public key pPKU2 by encryption program using the mobile/home-based shared secret key MHS and sends MHS(pPKU2,x) to the user's mobile-based device.

The user's mobile-based device receives the encrypted value of the new cumulative amount of digital cash and the user's pseudonym public key MHS(pPKU2,x) decrypts the information by decryption program using the mobile/home-based shared secret key MHS and match the user's pseudonym public key to authenticate the user's home-based station if the user's pseudonym public key matches the user stores the new cumulative amount of digital cash in the storage device of the user's mobile-based device.

Figure 50:
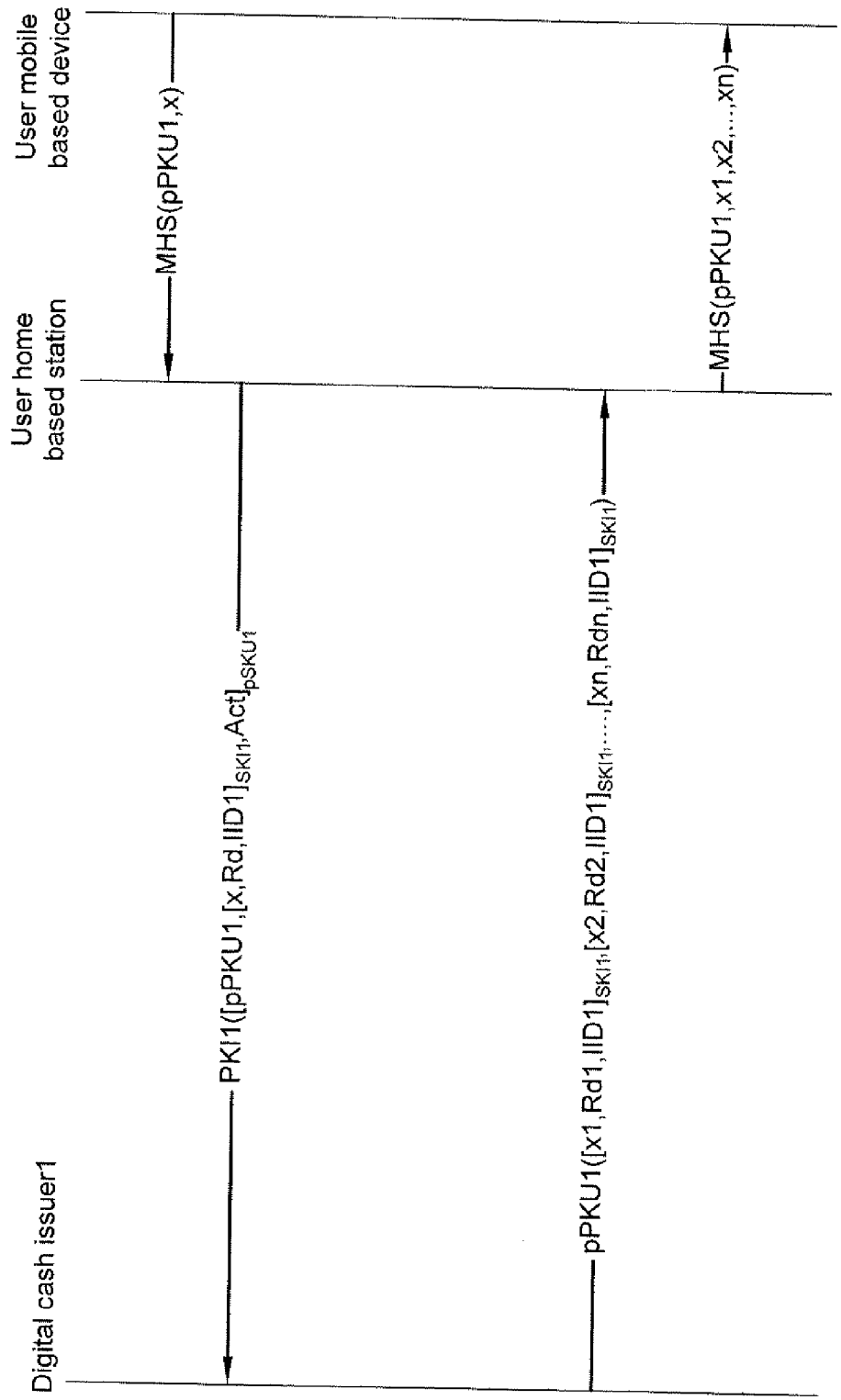
FIG. 50 is an exemplary dividing digital cash token protocol according to the ninth embodiment.

FIG. 50 shows the diagrammatic representation of the dividing digital cash token protocol.

Figure 56:
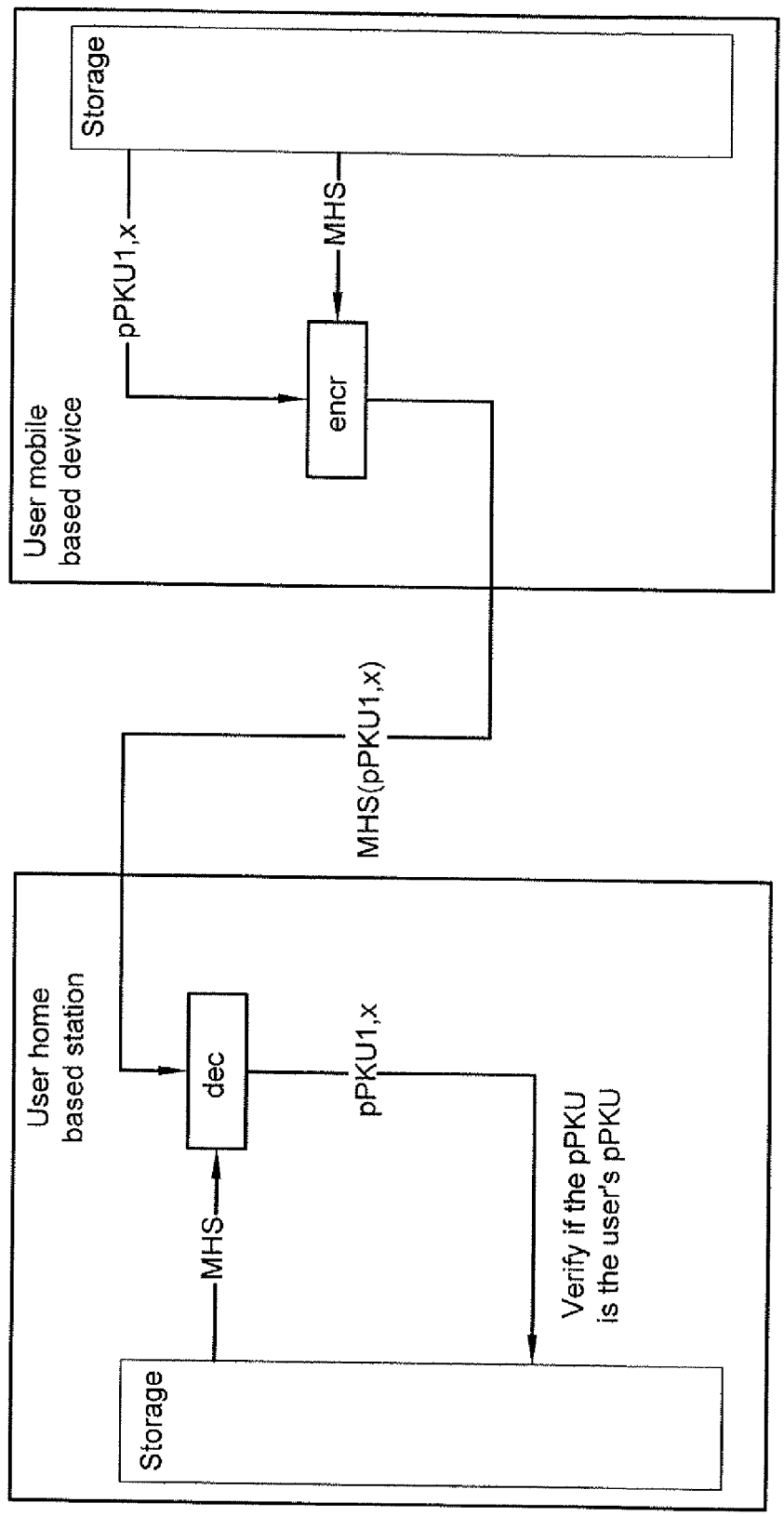
FIG. 56 is an exemplary dividing digital cash token process part 1 according to the ninth embodiment.

Referring to FIG. 56, the user's mobile-based device chooses the value of the digital cash token x and encrypts it also encrypts the user's pseudonym public key pPKU1 by encryption program using the mobile/home-based shared secret key MHS and sends MHS(pPKU1,x) to the user's home-based station.

The user's home-based station receives MHS(pPKU1,x) and decrypts the information by decryption program using the mobile/home-based shared secret key MHS, and match the user's pseudonym public key to authenticate the user's mobile-based device, if the user's pseudonym public key is matches, the user's home-based station find the digital cash token that equivalent to the value that is sent by the user's mobile device.

Figure 57:
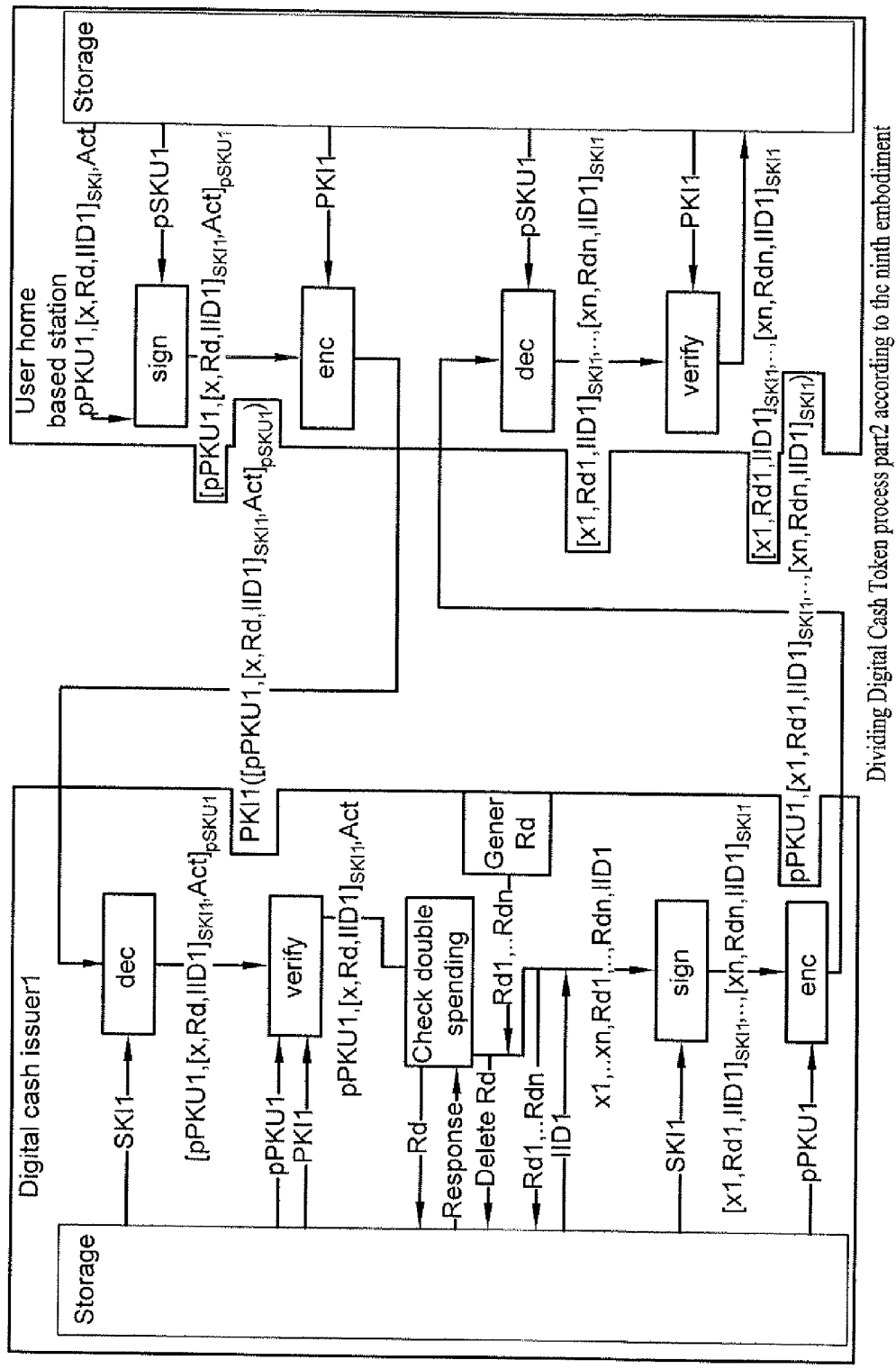
FIG. 57 is an exemplary dividing digital cash token process part 2 according to the ninth embodiment.

Referring to FIG. 57, the user's home-based station signs the user's pseudonym public key pPKU1, the digital cash token [x,Rd,IID1]SKI1 and the action to be taken Act by signature generating program using the user's secret pseudonym key pSKU1 then encrypts [pPKU1, [x,Rd,IID1]SKI1, Act]pSKU1 by encryption program using the public key of the digital cash issuer1 PKI1 then sends it to the digital cash issuer1 as request for transfer digital cash.

The digital cash issuer1 receives PKI1([pPKU1,[x,Rd, IID1]SKI1,Act]pSKU1), then decrypts the information by decryption program using the digital cash issuer1's secret key and verifies the signature of the user by signature verifying program using the user's pseudonym public key pPKU1, to authenticate the user, if it is valid, the digital cash issuer1 check the Rd if the random number Rd does not exist, this mean there is double spending and the real identity will be revealed by sending the user's pseudonym public key pPKU1 to the certificate authority, if it is not, the digital cash issued deletes the random number Rd and will issues smaller digital cash tokens which contains the following information: (i) digital cash amount, (ii) random number, (iii) the issuer identity, the digital cash issued generates random numbers Rd1, Rd2, . . . Rdn and stores them in the storage device, then signs digital cash amounts x1, x2, . . . , xn, random numbers Rd1, Rd2, . . . .Rdn and the issuer identity IID1 by signature generating program using the digital cash issuer1's secret key SKI1 and encrypts the information by encryption program using the user's pseudonym public key pPKU1 then sends pPKU1([x1,Rd1,IID1]SKI1, [x2,Rd2,IID1]SKI1, . . . [xn, Rdn,IID1]SKI1) to the user's home-based station.

The user's home-based station receives pPKU1([x1,Rd1, IID1]SKI1, [x2,Rd2,IID1]SKI1, . . . , [xn,Rdn,IID1]SKI1), then decrypts the information by the decryption program using the user's pseudonym secret key then verifies the validity of the digital cash issuer1 signature by the signature verifying program with the digital cash issuer1's public key PKI1. If the signature is valid, the user stores the digital cash tokens [x1,Rd1,IID1]SKI1, [x2,Rd2,IID1]SKI1, . . . , [xn, Rdn,IID1]SKI1) in the storage device.

Figure 58:
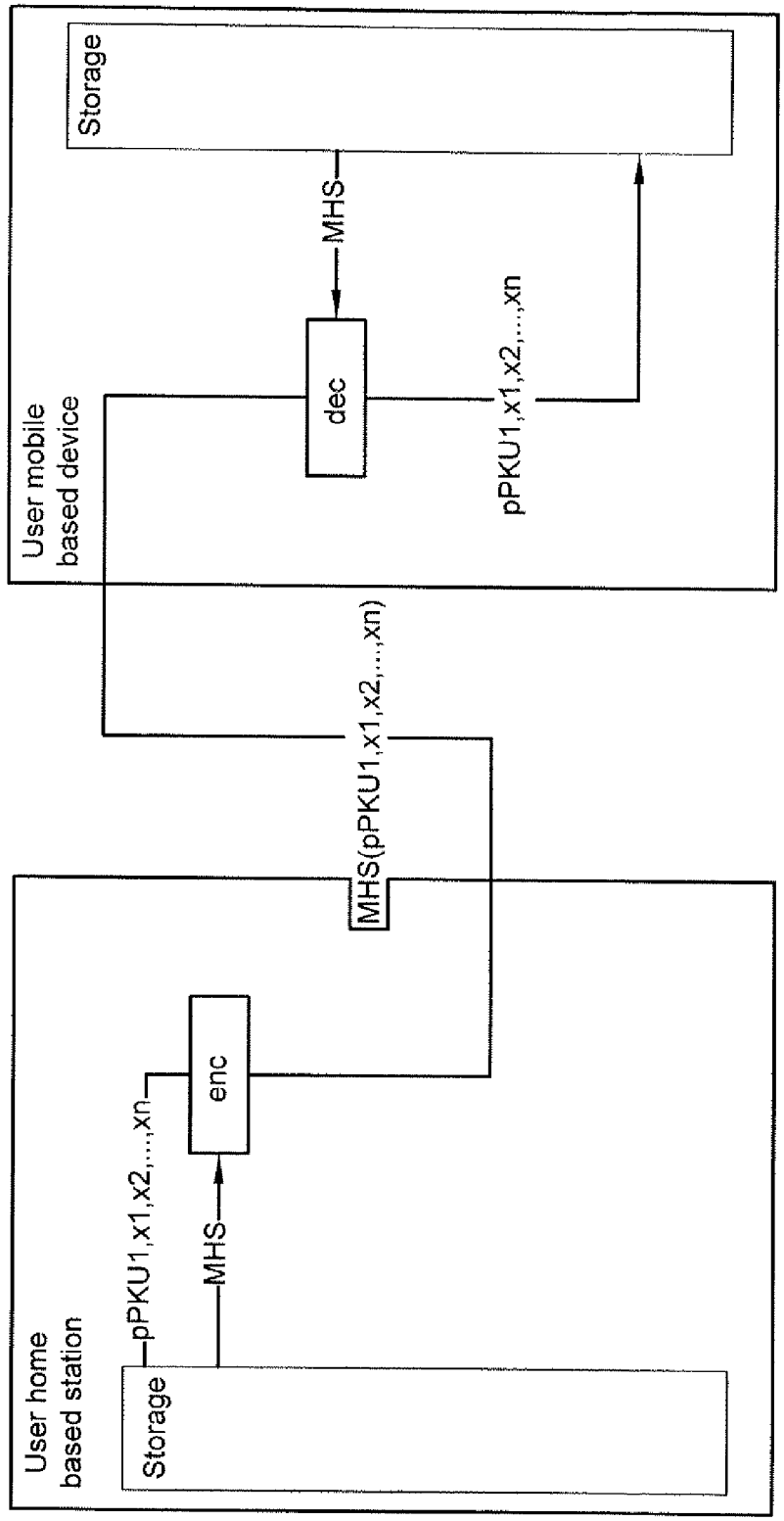
FIG. 58 is an exemplary dividing digital cash token process part 3 according to the ninth embodiment.

Referring to FIG. 58, the user's home-based machine encrypts the value of the digital cash tokens values x1, x2, . . . xn and the user's pseudonym public key pPKU1 by encryption program using the mobile/home-based shared secret key MHS and sends MHS(pPKU1, x1, x2, . . . xn) to the user's mobile-based device.

The user's mobile-based device receives the encrypted value of the digital cash tokens and the user's pseudonym public key MIIS(pPKU1, x1, x2, . . . xn) decrypts the information by decryption program using the mobile/home-based shared secret key MHS and match the user's pseudonym public key to authenticate the user's home-based station if the user's pseudonym public key matches the user stores the values of digital cash tokens in the storage device of the user's mobile-based device. The user can easily transfer the issued digital cash token to another user who has certified pseudonym public key.

FIG. 44 shows the diagrammatic representation of the payment protocol. The shop comprises a storage device, a signature verifying program encryption program, decryption program, a signature generating program, a random number generating program and a time generating program the shop public key PKS is known to all entities.

Referring to FIG. 45, the user's mobile-based device chooses the value of the digital cash token x and encrypts it also encrypts the user's pseudonym public key pPKU1 and the price of the good z by encryption program using the mobile/home-based shared secret key MHS and sends MFIS (pPKU1,z,x) to the user's home-based station.

The user's home-based station receives MHS(pPKU1,z,x) and decrypts the information by decryption program using the mobile —home-based shared secret key MHS, and match the user's pseudonym public key to authenticate the user's mobile-based device, if the user's pseudonym public key is matches, the user's home-based station find the digital cash token that equivalent to the value that is sent by the user's mobile device.

Referring to FIG. 46, the user's home-based station encrypts the digital cash token [x,Rd,IID1]SKI1 and the digital cash issuer license [pPKU1]SKI1 by encryption program using the public key of the shop PKS then sends it to the shop as request for payment.

The user can send a payment request using another certified pseudonym public key because the pseudonym is not associated with digital cash token. This gives the flexibility to change the pseudonym at the payment time.

The shop decrypts the encrypted digital cash token and the digital cash issuer1 license PKS([x,Rd,IID1]SKI1, [pPKU1]SKI1) by decryption program using the shop's secret key SKS then verify the signature of the issuer by the signature verifying program with the digital cash issuer1 public key PKI1 if the signatures are valid the shop stores the user's digital cash issuer1 license, the digital cash token and generates a random number Rs by random number generating program and generates the time Ts by the time generating program then encrypt Rs,Ts, the shop identification SID and the price of the good y by encryption program using the user's pseudonym public key pPKU1 and sends pPKU1(Rs,Ts,SID, y) to the user's home-based station.

The user's home-based station receives pPKU1(Rs,Ts, SID,y) and decrypts it by decryption program using the user's pseudonym secret key pSKU1 and verify the equality of the price of the good y and z, if they are equal, signs the random number Rs, the time Ts, the shop identification SID and the price of the good y by signature generating program using the user's pseudonym secret key pSKU1 and encrypts the information by encryption program using the public key of the shop PKS then sends PKS([Rs,Ts,SID,y]pSKU1) to the shop.

The shop receives the information PKS([Rs,Ts,SID,u] pSKU1) and decrypts it by decryption program using the shop's secret key SKS and verifies the signature by signature verifying program using the user's pseudonym public key pPKU1 if it is valid the shop stores the challenge and the shop regards the payment as valid.

Referring to FIG. 47, after period of time the shop encrypts the information that contains the challenge that was signed by the user [Rs,Ts,SID,y]pSKU1, the digital cash token [x,Rd, IID1]SKI1, and the user's digital cash issuer1 license [pPKU1]SKI1, by encryption program using the public key of the digital cash issuer1 PKI1 and sends the information to the digital cash issuer1.

The digital cash issued decrypts PKI([Rs,Ts,SID,y] pSKU1, [x,Rd,IID1]SKI1, [pPKU1]SKI1) by decryption program using the digital cash issuer1's secret key SKI1 and verifies the signature by the signature verifying program using the digital cash issuer1's public key PKI1 and the user's pseudonym public key pPKU1, if the signatures are valid the issuer1 check the Rd if the random number Rd does not exist, this mean there is double spending and the real identity will be revealed by sending the user's pseudonym public key pPKU1 to the certificate authority, if it is not, the random number is deleted and decrements the user's virtual account by y and credits the difference between the value of the token x and the price of the goods y to the user's virtual account under the pseudonym of the user, then the digital cash issuer stores the challenge [Rs,Ts,SID,y]pSKU1 in the storage device.

Referring to FIG. 48, the digital cash issuer1 signs the shop identification SID, and the amount x to be deposited for the shop by the signature generating program with the digital cash issuer1's secret key SKI1 and encrypts the information by encryption program using the public key of the shop's bank PKB then sends PKB([SID,x]SKI1) to the shop's bank.

The shop's bank receives PKB([SID,x]SKI1) and decrypts the information by decryption program using the secret key SKB and verifies the signature by signature verifying program with the public key of the issuer1 PKI1 if the signature is valid the shop's bank will add x amount of money in the shop account.

It is to be understood that the present invention is not limited to the embodiments described above, but encompasses any and all embodiments within the scope of the following claims.

We claim:

1. A virtual account and token-based digital cash protocol method implementing digital cash for a user having multiple pairs of user keys, at least a first pair of the user keys being linked to the real identity of the user, the first pair including a master public key and a master secret key, and at least a second pair of the user keys being linked to the pseudonym identity of the user, second pair of the user keys including a pseudonym public key and a pseudonym secret key, in a system including exchange of information among a network of servers and a user's computing device, the network of servers including a first digital cash issuer server, a certificate authority server, a bank server, and a shop server, the method comprising the steps of: the user's computing device signing the pseudonym public key and a real identification of the user (UID); the user's computing device then transmitting the signed pseudonym public key and real identification to the certificate authority server as a request for issuance of a license to use the pseudonym public key; the certificate authority server receiving and decrypting the license request; the certificate authority server verifying the authenticity of the user's signature; upon successful authentication of the user's signature, the certificate authority server generating a license for the user's pseudonym public key and storing the user's pseudonym public key in correspondence with the user's master public key and real identification UID; the certificate authority then encrypting and transmitting the license to the user's computing device; the user's computing device receiving and decrypting the license; the user's computing device verifying the authenticity of the certificate authority's signature; upon successful authentication of the user's signature, the user's computing device storing the license in the user's computing device; the user's computing device preparing for transmission to the digital cash issuer user signed information including the user's pseudonym public key, and the user's request amount of digital cash x, user signature of the user signed information being formed using the user's pseudonym secret key; the user's computing device encrypting the user signed information using the digital cash issuer's public key; the user's computing device signing data including a user signed user real identification UID, amount of money to be withdrawn x, the encrypted signed user's pseudonym public key and amount of digital cash, using the user's master secret key, all the user data being encrypted using the public key of the bank; the encrypted user data being transmitted by the user's computing device to the bank server of the user's bank; the bank server decrypting the encrypted user data using a secret key of the bank; the bank server verifying validity of the signature for authentication using the user's master public key; upon successful signature authentication the bank server withdrawing the amount of money x from the user's account; the bank server signing the user data including the encrypted signed user's pseudonym public key and the amount of digital cash and the withdrawn amount of money x, using the bank's secret key; the bank server encrypting the user data using the digital cash issuer's public key; the bank server forwarding the bank encrypted user data to the digital cash issuer; the digital cash issuer receiving the bank encrypted user data and decrypting the bank encrypted user data using the digital cash issuer's secret key; the digital cash issuer performing a bank's signature verification by utilizing the user's bank's public key; upon successful bank's signature verification the digital cash issuer decrypting the user encrypted user data using the digital cash issuer's secret key; the digital cash issuer verifying user's signature by utilizing the user's pseudonym public key; upon successful verification of the user's signature, the digital cash issuer verifying the equality of the two amounts x and if they are not equal revealing real identity of the user; upon successful verification of the equality of the two amounts x, the digital cash issuer incrementing the user's virtual account by amount x of digital cash; the digital cash issuer then signing the pseudonym public key and digital cash amount x using the digital cash issuer's secret key and encrypting the digital cash issuer signed data using the public key of the bank; the digital cash issuer then sending the encrypted digital cash issuer signed data to the bank; the user's bank receiving the encrypted digital cash issuer signed data and decrypting it using the bank's secret key; the user's bank then verifying validity of digital cash issuer signature using public key of the digital cash issuer; upon successful digital cash issuer signature validity verification, the user's bank forwarding the digital cash issuer signed data to the user's computing device in an encrypted manner using the user's pseudonym public key; the user's computing device decrypting the digital cash issuer signed data using the pseudonym private key; the user's computing device then verifying validity of the digital cash issuer's signature by using the digital cash issuer's public key; upon successful verification of the validity of the digital cash issuer's signature, the user's computing device then increments by the amount x the cumulative amount of digital cash stored in the user's computing device; and wherein via the digital cash protocol method the user initiated transfer from the user's bank to the user's virtual cash store on the user's computing device is honored without using blind signatures.

2. The virtual account and token-based digital cash protocol method according to claim 1, wherein said network of servers and said user's computing device continue to utilize public-key encryption cryptography for all communication among said network of servers and said user's computing device, said user's computing device using registered pseudonym public-private key pairs to maintain anonymity during communication with said network of servers to thereby obviate the necessity of blind signature protocols.

3. The virtual account and token-based digital cash protocol method according to claim 2, further comprising the step of said user's computing device transmitting to said digital cash issuer a user signed request for a digital cash token.

4. The virtual account and token-based digital cash protocol method according to claim 3, further comprising the steps of:
said digital cash issuer receiving said signed request of claim 3;
said digital cash issuer decrypting said signed request of claim 3;
said digital cash issuer authenticating said user's signature;
upon successful authentication of said user's signature, said digital cash issuer issuing a digital cash token containing (i) a digital cash amount, (ii) a random number, (iii) the digital cash issuer's identity;
said digital cash issuer then storing said random number in a storage device of said digital cash issuer, signing said digital cash amount x, said random number and said digital cash issuer's identity;
said digital cash issuer then encrypting said amount, random number and digital cash issuer's identity, decrementing said user's virtual account by x and transmitting said encrypted amount, random number, and digital cash issuer's identity to said user's computing device.

5. The virtual account and token-based digital cash protocol method according to claim 4, further comprising the steps of:
said user's computing device receiving and decrypting said digital cash issuer transmitted information of claim 4;
said user's computing device authenticating said digital cash issuer's signature;
upon successful authentication of said digital cash issuer's signature, said user's computing device storing the digital cash token and decrementing the cumulative amount of digital cash by the amount of the digital cash token x then storing the cumulative amount of digital cash in memory storage of the user's computing device.

6. The virtual account and token based digital cash protocol method according to claim 5, further comprising the step of said user's computing device encrypting and transmitting a request for payment to said shop server, said payment request including said digital cash issuer's identity.

7. The virtual account and token-based digital cash protocol method according to claim 6, further comprising the steps of:
said shop's server decrypting said encrypted payment request of claim 6;
said shop's server verifying that said issuer's signature is authentic;
upon successful issuer's signature authentication said shop's server storing a digital cash issuer license of said user and storing said digital cash token;
said shop's server then generating and encrypting a random number $R_s$, a time $T_s$, and the shop identification, SID;
said shop's server then transmitting said random number Rs, said time Ts, and the shop identification, SID to said user's computing device.

8. The virtual account and token-based digital cash protocol method according to claim 7, further comprising the steps of:
said user's computing device receiving and decrypting said shop's server transmission of claim 7;
said user's computing device then signing said random number Rs, said time Ts, and the shop identification, SID; and
said user's computing device encrypting said user's computing device signed said random number Rs, said time Ts, and the shop identification, SID, then transmitting as a challenge said user's computing device signed said random number Rs, said time Ts, and the shop identification, SID back to said shop's server.

9. The virtual account and token-based digital cash protocol method according to claim 8, further comprising the steps of:
said shop's server receiving and decrypting said user's computing device signed transmitted information of claim 8;
said shop's server verifying that said user's signature is authentic;
upon successful user's signature authentication, said shop's server storing said challenge and accepting said payment request as valid;

said shop's server then waiting a predetermined time period and encrypting said challenge, said digital cash token, said user's digital cash issuer license;

said shop's server then forwarding said encrypted challenge, digital cash token, and user's digital cash issuer license to said digital cash issuer.

10. The virtual account and token-based digital cash protocol method according to claim 9, further comprising the steps of:

said digital cash issuer decrypting said encrypted challenge, digital cash token, and user's digital cash issuer license, verifying authenticity of said user's and shop's signatures;

upon successful authentication of said signatures, said digital cash issuer determines whether random number $R_d$ exists in digital cash issuer's storage and based on non-existence of said random number Rd in said digital cash issuer's storage, said digital cash issuer revealing the true identity of said user to said certificate authority;

based on existence of said random number Rd in said digital cash issuer's storage said digital cash issuer deleting said random number Rd, decrementing said user's virtual account by x, and storing said challenge in said storage of said digital cash issuer;

subsequently, said digital cash issuer signing, encrypting, and transmitting said shop identification SID and said amount x to be deposited for said shop to said shop's bank server.

11. The virtual account and token-based digital cash protocol method according to claim 10, further comprising the steps of:

said shop's bank server receiving and decrypting said information transmitted by said digital cash issuer in claim 10;

said shop's bank server verifying the authenticity of said digital cash issuer's signature;

upon successful authentication of said digital cash issuer's signature, said shop's bank server adding said x amount of money to said shop's bank account.

12. The virtual account and token-based digital cash protocol method according to claim 11, further comprising the steps of:

said digital cash issuer server transmitting a digital cash token to said user's computing device, the token exceeding the value of goods being purchased from the shop by the user; and said digital cash issuer server crediting the difference between the value of the digital cash token and the value of the goods being purchased to said user's virtual account under the pseudonym of the user.

13. The virtual account and token-based digital cash protocol method according to claim 12, further comprising the steps of:

said user's computing device registering a second pseudonym public key with a second digital cash issuer server along with a request for registration with the second digital cash issuer; and the second digital cash issuer opening a second virtual account credited with a second amount of digital cash tokens according to a second request for payment forwarded by said user's computing device to the second digital cash issuer server.

14. The virtual account and token-based digital cash protocol method according to claim 13, further comprising the step of transferring digital cash tokens between said primary virtual account and said second virtual account.

15. The virtual account and token-based digital cash protocol method according to claim 14, wherein said at least a second pair of keys linked to a pseudonym identity of the user comprises a third pair of keys linked to a pseudonym identity of the user, the method further comprising the steps of:

said user's computing device sending to said second digital cash issuer an action request with amount to be transferred, the action request being formulated and authenticated using the third pair of keys;

said second cash issuer forwarding said action request with amount to be transferred to said first digital cash issuer;

said first digital cash issuer authenticating said action request with amount to be transferred, and then sending said authenticated action request with amount to be transferred back to said second digital cash issuer; and said second digital cash issuer, upon verification of said first digital cash issuer authentication, incrementing said user's virtual account by the amount of digital cash specified in said action request and causing said new cumulative amount of digital cash to be stored in said user's computing device.

16. The virtual account and token-based digital cash protocol method according to claim 15, further comprising the step of combining crediting and withdrawal from said virtual account using digital cash tokens to divide a digital cash token into several smaller tokens.

17. The virtual account and token-based digital cash protocol method according to claim 16, further comprising the steps of:

said user's computing device sending to said primary digital cash issuer a digital cash token and a divide token action request specifying a number of smaller tokens desired by the user, the action request being formulated and authenticated using said at least a second pair of keys linked to a pseudonym identity of the user;

said first digital cash issuer authenticating said divide token action request;

said first digital cash issuer, upon successful authentication of said divide token action request, registering the smaller tokens and transferring the smaller tokens back to said user's computing device; and said user's computing device, upon authentication of the smaller tokens being transferred from said first digital cash issuer, storing the smaller digital tokens in said user's computing device.

18. The virtual account and token-based digital cash protocol method according to claim 17, further comprising the step of using a cryptography coprocessor as intermediary between all incoming communication from said user's bank's server to any of said digital cash issuers.

19. The virtual account and token-based digital cash protocol method according to claim 17, wherein said user's computing device comprises a combination of a fixed user's computing device and a mobile user's computing device, the mobile user's computing device initiating user requested digital cash transactions, the fixed user's computing device mediating communication between the mobile user's computing device and said network of servers.

* * * * *